United States Patent
Xu et al.

(10) Patent No.: US 11,160,108 B2
(45) Date of Patent: Oct. 26, 2021

(54) CHANNEL ACCESS FOR UNLICENSED CARRIERS IN A RADIO SYSTEM

(71) Applicants: Kai Xu, Herndon, VA (US); Esmael Hejazi Dinan, McLean, VA (US); Hua Zhou, Herndon, VA (US); Alireza Babaei, Fairfax, VA (US); Hyoungsuk Jeon, Centreville, VA (US); Ali Cagatay Cirik, Herndon, VA (US); Kyungmin Park, Herndon, VA (US)

(72) Inventors: Kai Xu, Herndon, VA (US); Esmael Hejazi Dinan, McLean, VA (US); Hua Zhou, Herndon, VA (US); Alireza Babaei, Fairfax, VA (US); Hyoungsuk Jeon, Centreville, VA (US); Ali Cagatay Cirik, Herndon, VA (US); Kyungmin Park, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 213 days.

(21) Appl. No.: 16/579,730

(22) Filed: Sep. 23, 2019

(65) Prior Publication Data

US 2020/0100286 A1 Mar. 26, 2020

Related U.S. Application Data

(60) Provisional application No. 62/736,204, filed on Sep. 25, 2018, provisional application No. 62/734,562, filed on Sep. 21, 2018.

(51) Int. Cl.
*H04W 74/08* (2009.01)
*H04W 72/04* (2009.01)
(Continued)

(52) U.S. Cl.
CPC .... *H04W 74/0808* (2013.01); *H04W 72/0446* (2013.01); *H04W 72/1268* (2013.01); *H04W 16/14* (2013.01)

(58) Field of Classification Search
CPC ......... H04W 74/0808; H04W 74/0816; H04W 72/0446; H04W 72/14; H04W 72/1268
See application file for complete search history.

(56) References Cited

U.S. PATENT DOCUMENTS

| 10,212,738 B2 | 2/2019 | Kim et al. |
| 10,251,201 B2 | 4/2019 | Cheng et al. |

(Continued)

OTHER PUBLICATIONS

3GPP TSG RAN WG1 Meeting #92BIS; R1-1804766; Sanya, China, Apr. 16-20, 2018; Agenda Item: 7.6.2; Source: Charter Communications; Title: Frame Structure Design for NR-U; Document for: Discussion/Approval.

(Continued)

*Primary Examiner* — Elton Williams
(74) *Attorney, Agent, or Firm* — Philip R. Smith; Kavon Nasabzadeh; Jacob L. Mangan

(57) ABSTRACT

A wireless device may receive one or more messages comprising configuration parameters of a cell. A reference duration for contention window adjustment may be determined based on the configuration parameters. The reference duration may be from a beginning of a channel occupancy of a first transmission burst and until an end of a first slot. The at least one physical uplink shared channel (PUSCH) may be transmitted. A contention window value may be determined based on a plurality of new data indicators (NDIs) received in a plurality of uplink grants corresponding to a plurality of first transport blocks transmitted by the wireless device during the reference duration. The wireless device may perform a listen before talk procedure based on the contention window value. One or more second transport (Continued)

blocks may be transmitted based on the listen before talk procedure indicating a clear channel.

20 Claims, 38 Drawing Sheets

(51) Int. Cl.
*H04W 72/12* (2009.01)
*H04W 16/14* (2009.01)

(56) References Cited

U.S. PATENT DOCUMENTS

| | | | |
|---|---|---|---|
| 10,257,764 | B2 | 4/2019 | Oh et al. |
| 10,285,067 | B2 | 5/2019 | Ahn et al. |
| 2016/0345326 | A1 | 11/2016 | Yerramalli et al. |
| 2018/0063871 | A1 | 3/2018 | Cheng et al. |
| 2018/0242360 | A1 | 8/2018 | Noa et al. |
| 2021/0160919 | A1* | 5/2021 | Wang .......... H04W 74/08 |

OTHER PUBLICATIONS

3GPP TS 36.213 V14.7.0 (Jun. 2018); 3rd Generation Partnership Project; Technical Specification Group Radio Access Network; Evolved Universal Terrestrial Radio Access (E-UTRA); Physical layer procedures (Release 14).
3GPP TS 37.213 V15.0.0 (Jun. 2018); 3rd Generation Partnership Project; Technical Specification Group Radio Access Network; Physical layer procedures for shared spectrum channel access (Release 15).
3GPP TS 38.211 V15.2.0 (Jun. 2018); 3rd Generation Partnership Project; Technical Specification Group Radio Access Network; NR; Physical channels and modulation (Release 15).
3GPP TS 38.212 V15.2.0 (Jun. 2018); 3rd Generation Partnership Project; Technical Specification Group Radio Access Network; NR; Multiplexing and channel coding (Release 15).
3GPP TS 38.213 V15.2.0 (Jun. 2018); 3rd Generation Partnership Project; Technical Specification Group Radio Access Network; NR; Physical layer procedures for control (Release 15).
3GPP TS 38.214 V15.2.0 (Jun. 2018); 3rd Generation Partnership Project; Technical Specification Group Radio Access Network; NR; Physical layer procedures for data (Release 15).
3GPP TS 38.321 V15.2.0 (Jun. 2018); 3rd Generation Partnership Project; Technical Specification Group Radio Access Network; NR; Medium Access Control (MAC) protocol specification (Release 15).
3GPP TS 38.331 V15.2.1 (Jun. 2018); 3rd Generation Partnership Project; Technical Specification Group Radio Access Network; NR; Radio Resource Control (RRC) protocol specification (Release 15).
3GPP TSG RAN WG1 Meeting #94 R1-1808061; Gothenburg, Sweden, Aug. 20-Aug. 24, 2018; Agenda Item: 7.2.2.4.1; Source: Huawei, HiSilicon; Title: Coexistence and channel access for NR unlicensed band operations.
3GPP TSG RAN WG1 Meeting #94 R1-1808237; Gothenburg, Sweden, Aug. 20-24, 2018; Source: vivo Title: Discussion on the channel access procedures Agenda Item: 7.2.2.4.1.
3GPP TSG RAN WG1 Meeting #94; R1-1808274 Gothenburg, Sweden, Aug. 20-24, 2018; Agenda item: 7.2.2.4.1; Source: MediaTek Inc.; Title: On channel access procedure in NR-U.
3GPP TSG RAN WG1 Meeting #94 R1-1808293 Gothenburg, Sweden, Aug. 20-24, 2018; Agenda item: 7.2.2.4.1; Source: Fujitsu; Title: On channel access procedure for NR-U.
3GPP TSG RAN WG1 Meeting #94; R1-1808321 Gothenburg, Sweden, Aug. 20-24, 2018; Title:Discussion on channel access mechanism for NR-U; Source: ZTE; Agenda Item: 7.2.2.4.1; Document for: Discussion and Decision.
3GPP TSG RAN WG1 Meeting #94 R1-1808335 Gothenburg, Sweden, Aug. 20-24, 2018; Agenda Item: 7.2.2.4.1; Source: Sony; Title: Considerations on channel access for NR unlicensed operations; Revision of: R1-1806569.

3GPP TSG RAN WG1 #94; R1-1808359 Gothenburg, Sweden, Aug. 20-Aug. 24, 2018; Agenda item: 7.2.2.4.1; Source: NEC; Title:Discussion on subband based channel access procedures for NR-U.
3GPP TSG RAN WG1 Meeting #94; R1-1808395 Gothenburg, Sweden, Aug. 20-24, 2018; Source: CATT; Title: Channel Access Procedures for NR Unlicensed Operations; Agenda Item: 7.2.1.4.1.
3GPP TSG RAN WG1 Meeting #94; R1-1808507 Gothenburg, Sweden, Aug. 20-24, 2018; Agenda Item: 7.2.2.4.1; Source: LG Electronics; Title: Channel access procedure for NR unlicensed operation.
3GPP TSG RAN WG1 Meeting #94; R1-1808543 Gothenburg, Sweden, Aug. 20-24, 2018; Agenda Item: 7.2.2.2; Source: Lenovo, Motorola Mobility; Title: Frame structure for NR-U operation.
3GPP TSG RAN WG1 Meeting #94; R1-1808611 Gothenburg, Sweden, Aug. 20-24, 2018; Agenda Item: 7.2.2.4.1; Source: Apple Inc.; Title: Channel Access Procedures for NR-U.
3GPP TSG RAN WG1 Meeting #94; R1-1808685 Gothenburg, Sweden, Aug. 20-24, 2018 ; Agenda Item: 7.2.2.4.1; Source: Intel Corporation; Title: Enhancements to channel access mechanism for NR-unlicensed.
3GPP TSG-RAN WG1 Meeting #94; R1-1808768 Gothenburg, Sweden, Aug. 20-24, 2018; Agenda item: 7.2.2.4.1; Source: Samsung ; Title: Channel access procedures for NR-U.
3GPP TSG RAN WG1 Meeting #94; R1-1808819 Gothenburg, Sweden, Aug. 20-24, 2018; Agenda item: 7.2.2.4.1; Source: Nokia, Nokia Shanghai Bell; Title: Channel access and co-existence for NR-U operation.
3GPP TSG RAN WG1 Meeting #94; R1-1808899 Gothenburg, Sweden, Aug. 20-24, 2018; Source: OPPO; Title: Channel access mechanisms on NR-U ; Agenda Item: 7.2.2.4.1.
3GPP TSG RAN WG1 Meeting #94; R1-1809063 Gothenburg, Sweden, Aug. 20-24, 2018; Agenda Item: 7.2.2.4.1; Source: AT&T; Title: Enhancements for NR-U Channel Access Procedures.
3GPP TSG RAN WG1 Meeting #94; R1-1809089 Gothenburg, Sweden, Aug. 20-24, 2018; Agenda Item: 7.2.2.4.1; Source: InterDigital Inc.; Title: Channel access procedure and coexistence in NR-U.
3GPP TSG RAN WG1 Meeting #94; R1-1809111 Gothenburg, Sweden, Aug. 20-24, 2018; Source: Sharp; Title: Channel access procedures for NR unlicensed operation; Agenda Item: 7.2.2.4.1.
3GPP TSG RAN WG1 Meeting #94; R1-1809154 Gothenburg, Sweden, Aug. 20-24, 2018; Source: NTT Docomo, Inc.; Title: Channel access procedures for NR-U operation; Agenda Item: 7.2.2.4.1.
3GPP TSG-RAN WG1 Meeting #94; R1-1809204 Gothenburg, Sweden, Aug. 20-24, 2018; Agenda Item: 7.2.2.4.1; Source: Ericsson; Title: Channel access mechanisms for NR-U.
3GPP TSG-RAN WG1 Meeting #94; R1-1809248 Gothenburg, Sweden, Aug. 20-24, 2018; Agenda Item: 7.2.2.4.1; Source: ASUSTeK; Title: Channel access procedure in NR-U.
3GPP TSG RAN WG1 Meeting #94; R1-1809296 Gothenburg, Sweden, Aug. 20-24, 2018; Agenda item: 7.2.2.4.1; Source: Broadcom; Title: Discussion on proposed channel access schemes for NR-Unlicensed.
3GPP TSG RAN WG1 Meeting #94; R1-1809300 Gothenburg, Sweden, Aug. 20-24, 2018; Agenda Item: 7.2.2.4.1; Source: Lenovo, Motorola Mobility; Title: Extensions for Channel Access Procedures.
3GPP TSG RAN WG1 Meeting #94; R1-1809325 Gothenburg, Sweden, Aug. 20-24, 2018; Source: Wilus Inc.; Title: Discussion on channel access procedure for NR-U operation; Agenda item: 7.2.2. 4.1.
3GPP TSG-RAN WG1 Meeting #94; R1-1809381 Gothenburg, Sweden, Aug. 20-24, 2018; Agenda item: 7.2.2.4.1 Channel Access Procedures; Title: Design considerations on channel accessing; Source: Convida Wireless.
3GPP TSG RAN WG1 Meeting #94; R1-1809479 Gothenburg, Sweden; Aug. 20-24, 2018;Agenda item:7.2.2.4.1; Source:Qualcomm Incorporated; Title: Channel access procedures for NR unlicensed.

* cited by examiner

User Plane Protocol Stack

Control Plane Protocol Stack

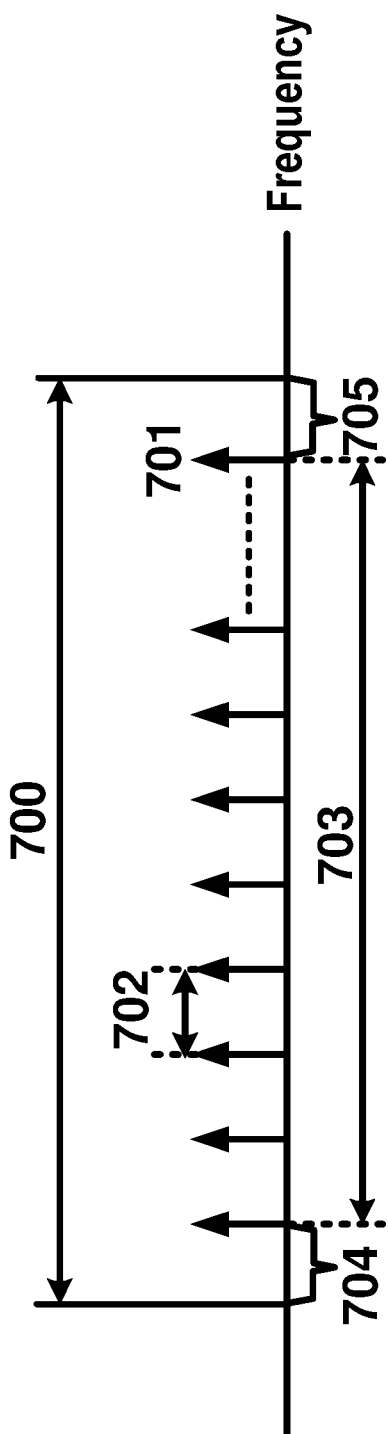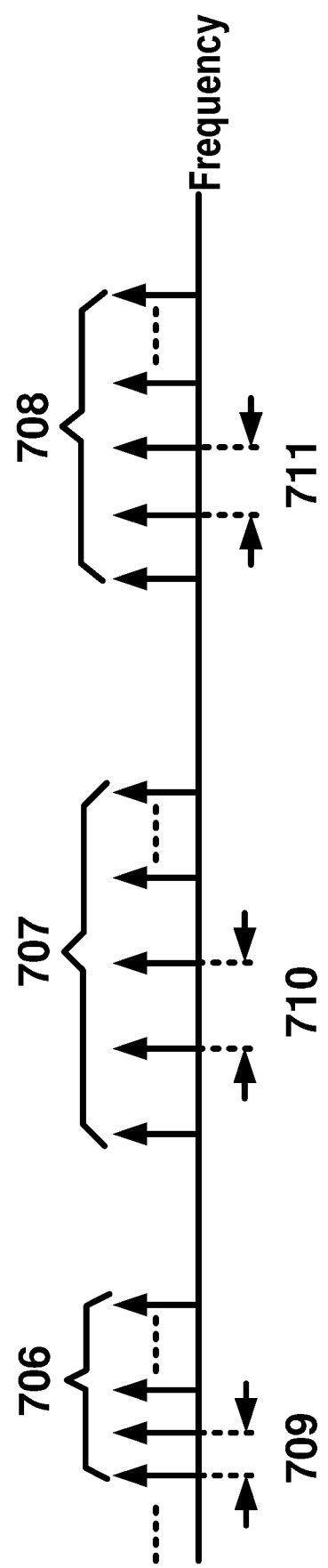

| Channel Access Priority Class ($p$) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3,7} |
| 2 | 2 | 7 | 15 | 4 ms | {7,15} |
| 3 | 3 | 15 | 1023 | 6ms or 10 ms | {15,31,63,127,255,511,1023} |
| 4 | 7 | 15 | 1023 | 6ms or 10 ms | {15,31,63,127,255,511,1023} |

FIG. 16

CHANNEL ACCESS FOR UNLICENSED CARRIERS IN A RADIO SYSTEM

CROSS-REFERENCE TO RELATED APPLICATIONS

This application claims the benefit of U.S. Provisional Application No. 62/734,562, filed Sep. 21, 2018, and U.S. Provisional Application No. 62/736,204, filed Sep. 25, 2018, which are hereby incorporated by reference in their entirety.

BRIEF DESCRIPTION OF THE SEVERAL VIEWS OF THE DRAWINGS

Examples of several of the various embodiments of the present disclosure are described herein with reference to the drawings.

FIG. 7A and FIG. 7B are diagrams depicting example sets of OFDM subcarriers as per an aspect of an embodiment of the present disclosure.

FIG. 16 is a diagram of an example channel access priority Class as per an aspect of an embodiment of the present disclosure.

DETAILED DESCRIPTION OF EMBODIMENTS

Figure 1:
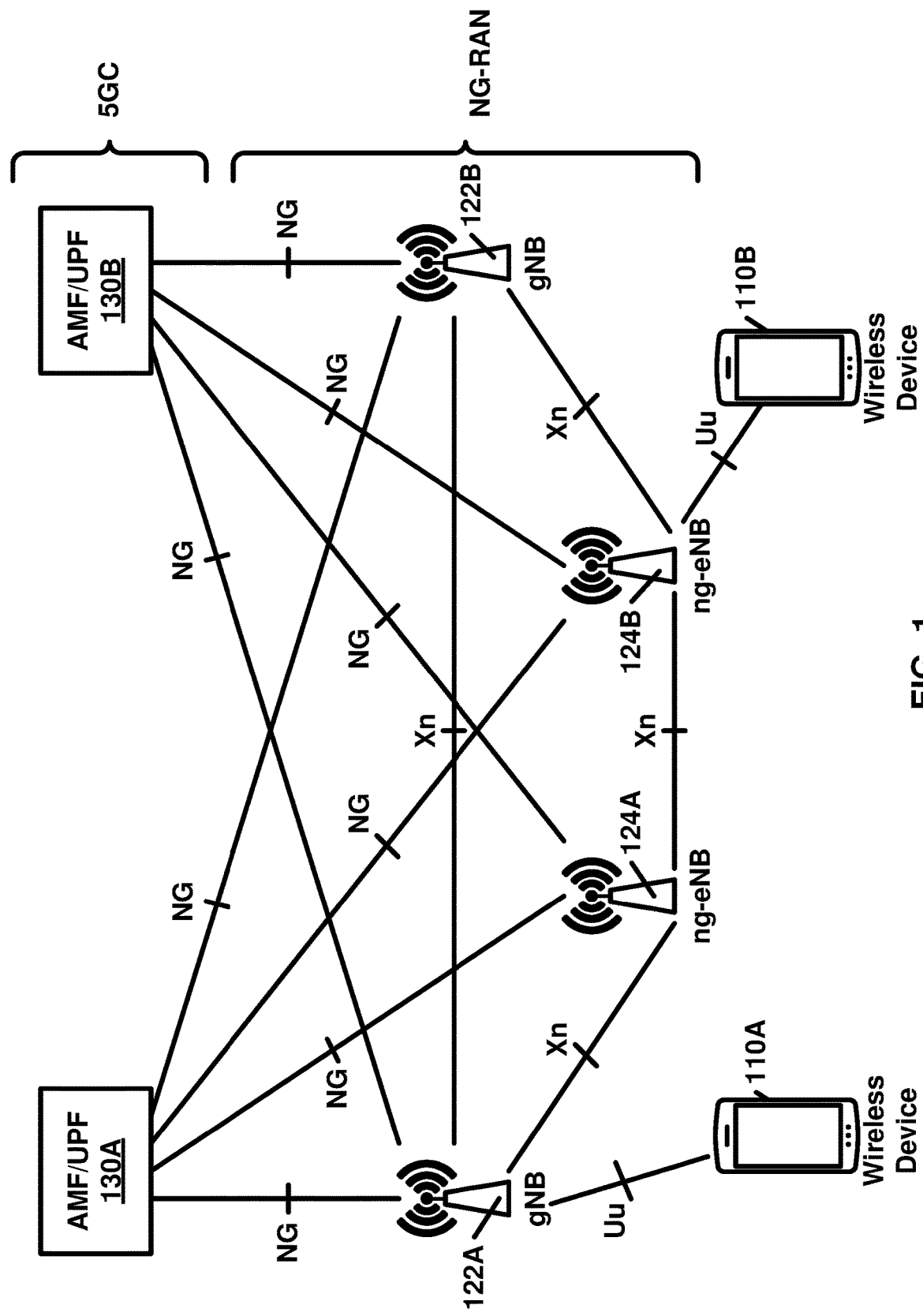
FIG. 1 is a diagram of an example RAN architecture as per an aspect of an embodiment of the present disclosure.

Example embodiments of the present disclosure enable operation of listen before talk and channel access. Embodiments of the technology disclosed herein may be employed in the technical field of multiple numerologies and unlicensed carrier systems. More particularly, the embodiments of the technology disclosed herein may relate contention window adjustment for unlicensed carriers and channel access with multiple numerologies.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (wireless device) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, wireless device context management, wireless device mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode wireless device reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
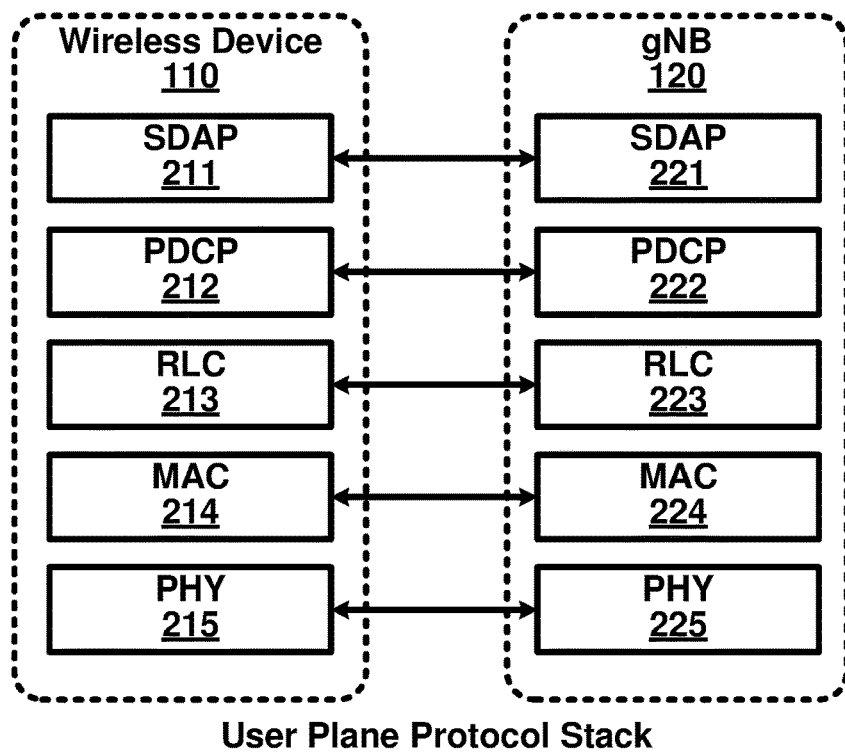
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one wireless device by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
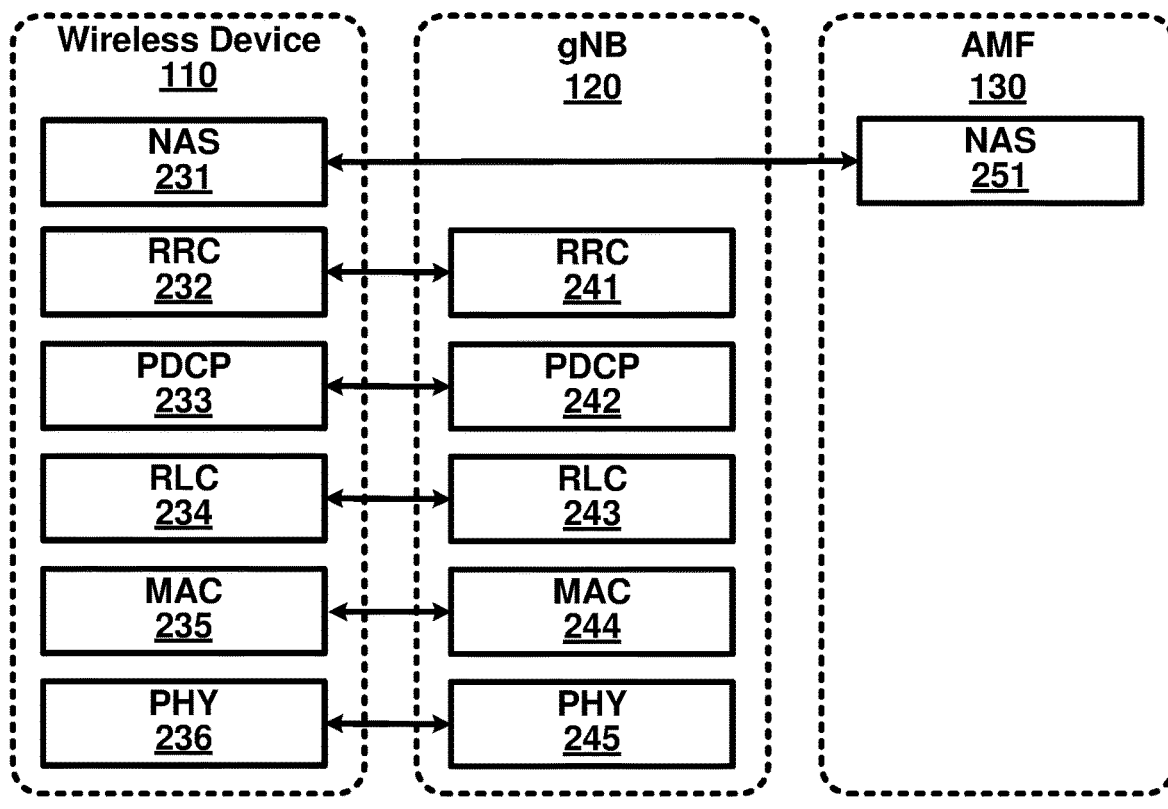
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the wireless device and RAN, security functions including key management, establishment, configuration, maintenance and release of Signaling Radio Bearers (SRBs) and Data Radio Bearers (DRBs), mobility functions, QoS management functions, wireless device measurement reporting and control of the reporting, detection of and recovery from radio link failure, and/or NAS message transfer to/from NAS from/to a wireless device. In an example, NAS control protocol (e.g. 231 and 251) may be terminated in the wireless device and AMF (e.g. 130) on a network side and may perform functions such as authentication, mobility management between a wireless device and a AMF for 3GPP access and non-3GPP access, and session management between a wireless device and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
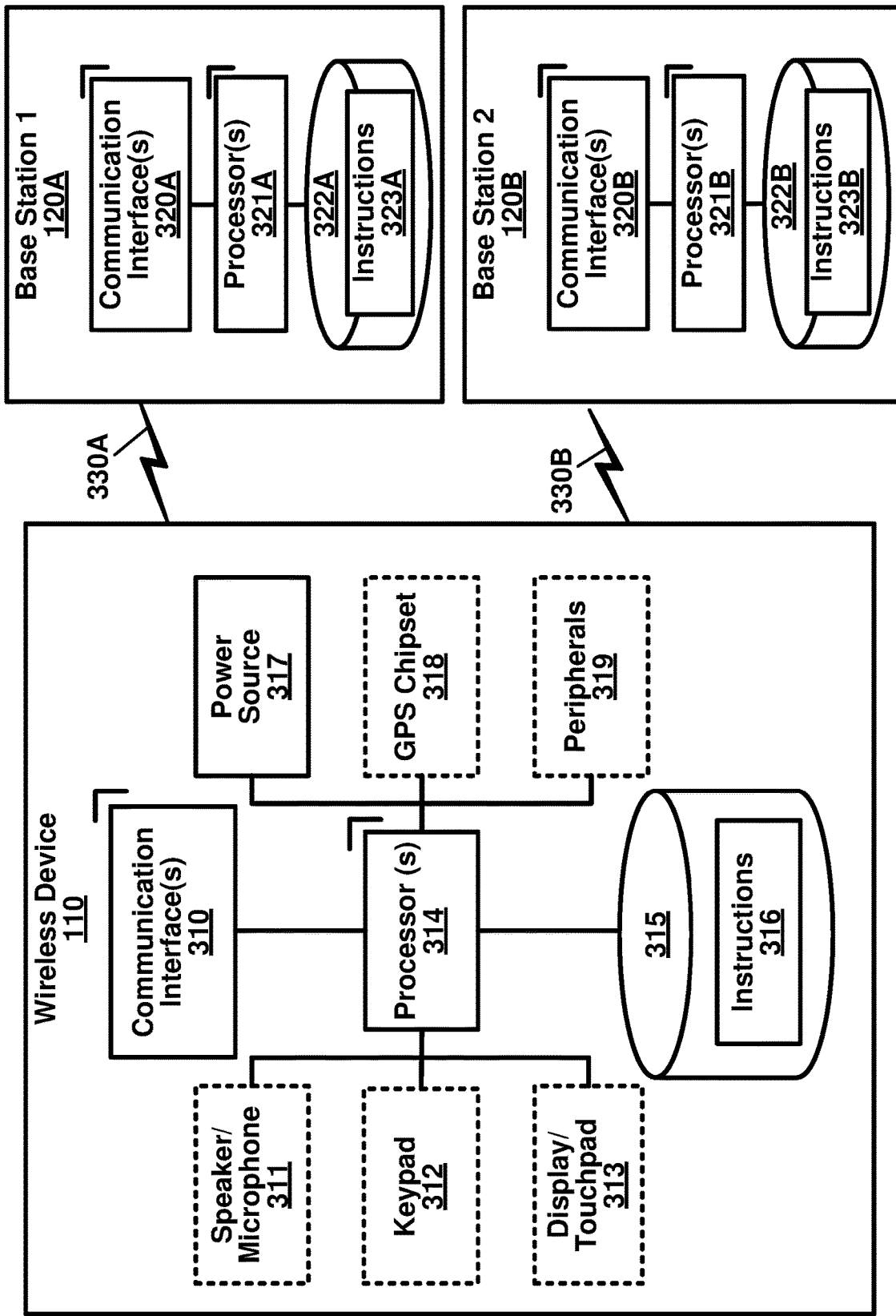
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110.

A wireless device may be called an wireless device. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a wireless device AS context for the wireless device. In an RRC Connected state of a wireless device, a base station (e.g. NG-RAN) may perform at least one of: establishment of 5GC-NG-RAN connection (both C/U-planes) for the wireless device; storing a wireless device AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g., to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to reestablish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

Figure 4A:
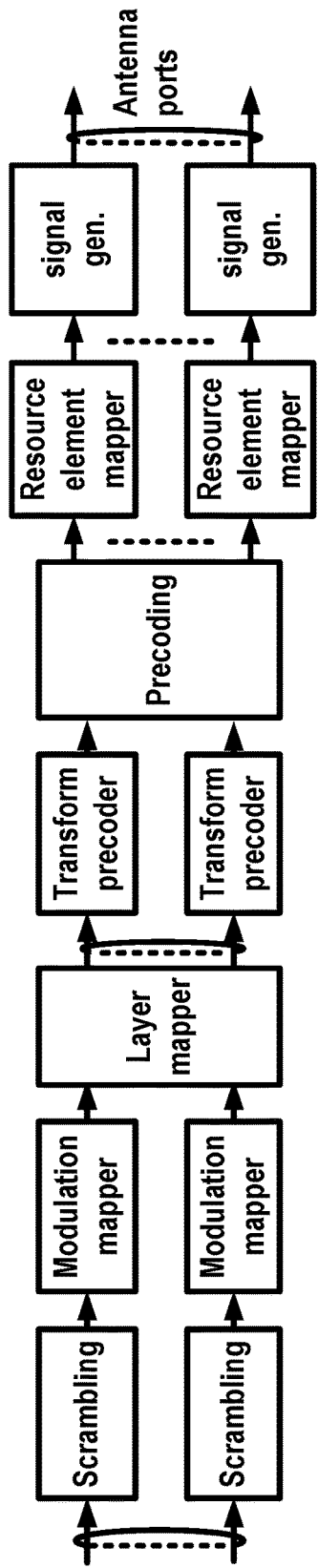
FIG. 4A, FIG. 4B, FIG. 4C and FIG. 4D are example diagrams for uplink and downlink signal transmission as per an aspect of an embodiment of the present disclosure.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

Figure 4D:
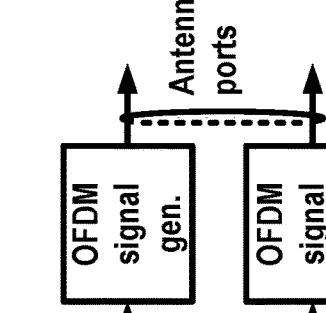
Figure 4B:
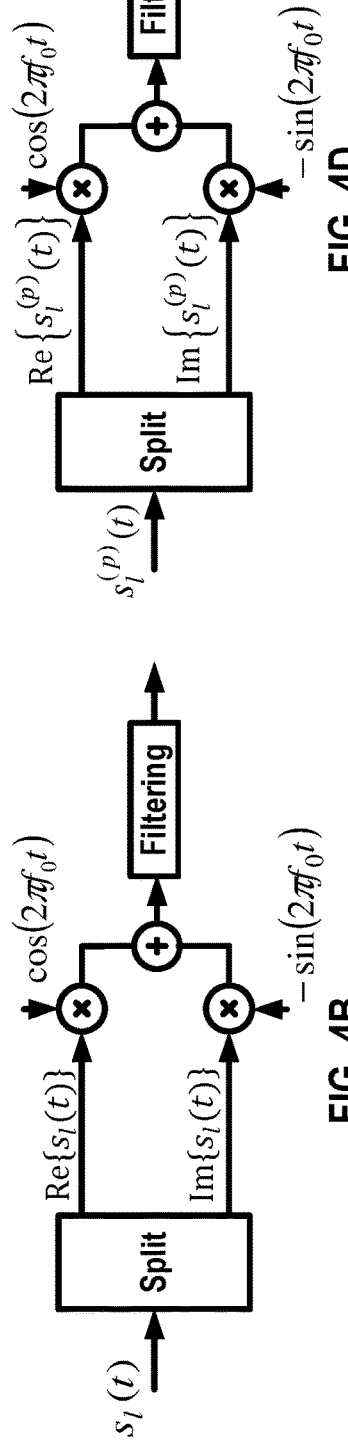

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

Figure 4C:
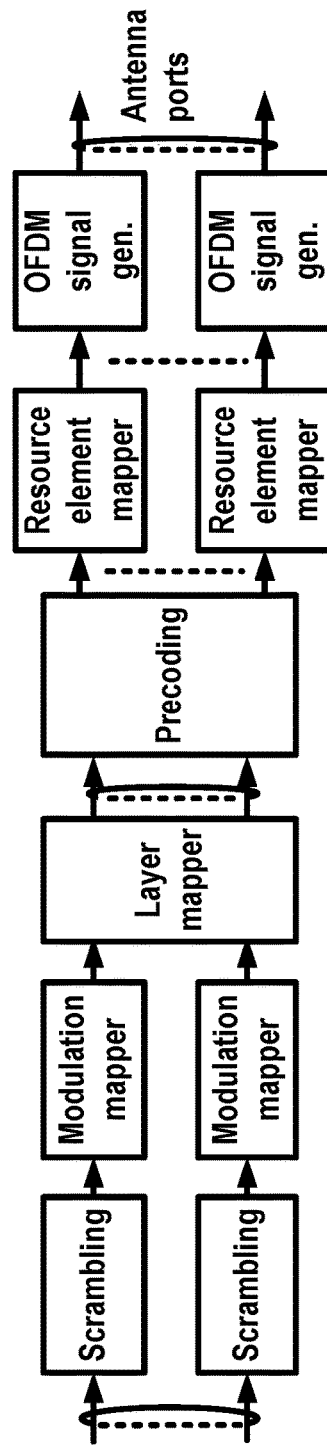

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
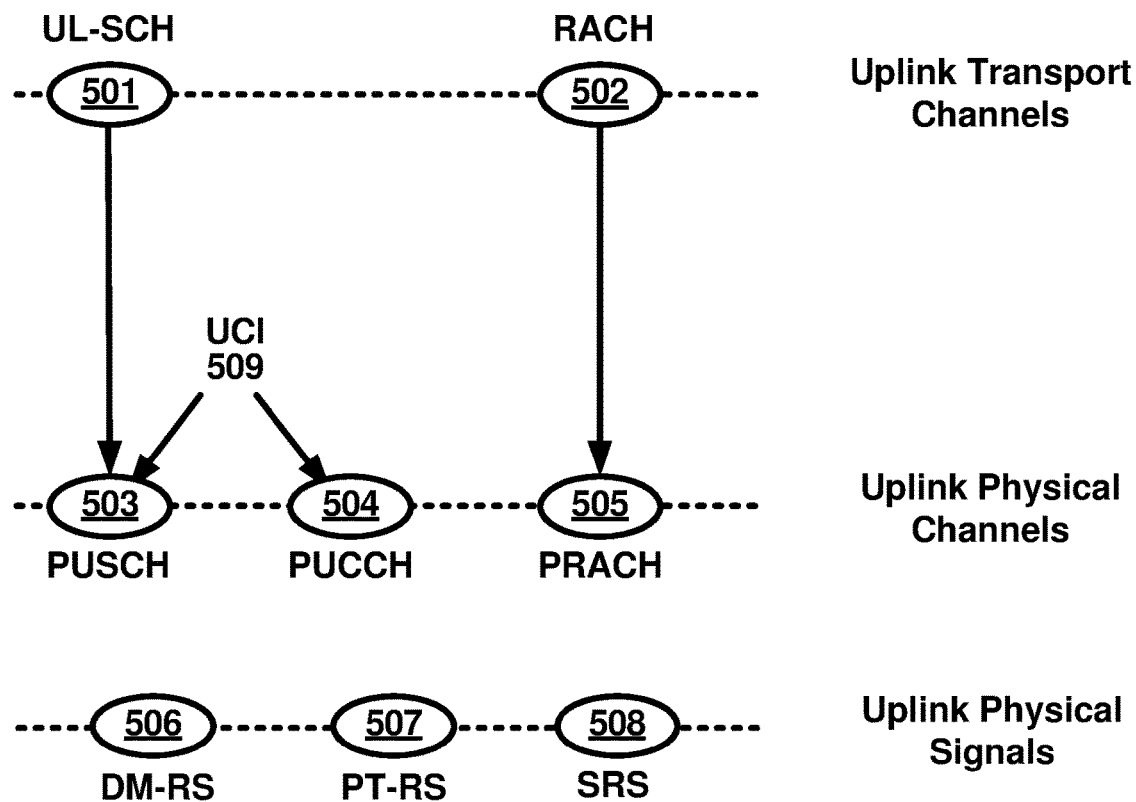
FIG. 5A is a diagram of an example uplink channel mapping and example uplink physical signals as per an aspect of an embodiment of the present disclosure.
Figure 5B:
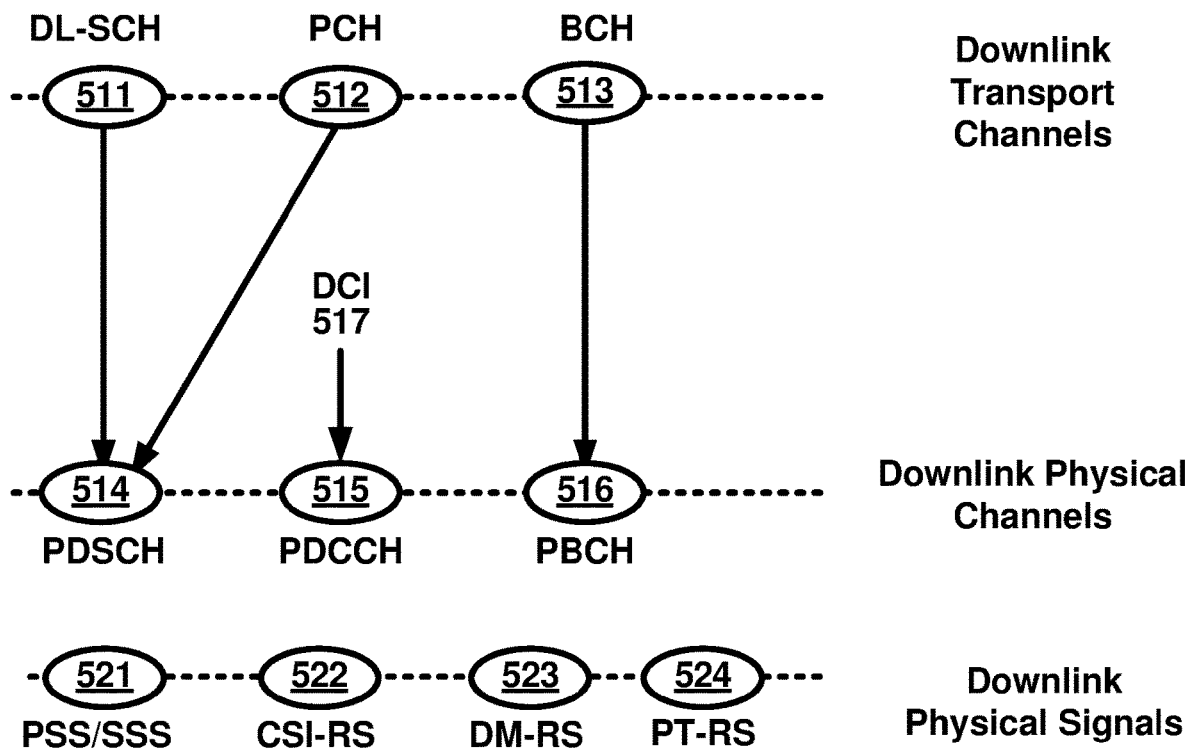
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a wireless device to a base station. For example, Physical Downlink Control CHannel (PDCCH) 515 may carry DCI 517 from a base station to a wireless device. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/ Negative Acknowledgement (NACK), and/or scheduling request. The DCI 517 on PDCCH 515 may indicate at least one of following: one or more downlink assignments and/or one or more uplink scheduling grants In uplink, a wireless device may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a wireless device. For example, the one or more RSs may be at least one of Primary Synchronization Signal (PSS)/Secondary Synchronization Signal (SSS) 521, CSI-RS 522, DM-RS 523, and/or PT-RS 524.

In an example, a wireless device may transmit one or more uplink DM-RSs 506 to a base station for channel estimation, for example, for coherent demodulation of one or more uplink physical channels (e.g., PUSCH 503 and/or PUCCH 504). For example, a wireless device may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a wireless device with a maximum number of front-loaded DM-RS symbols for PUSCH and/or PUCCH. For example, a wireless device may schedule a single-symbol DM-RS and/or double symbol DM-RS based on a maximum number of front-loaded DM-RS symbols, wherein a base station may configure the wireless device with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be wireless device-specifically configured. For example, a presence and/or a pattern of uplink PT-RS 507 in a scheduled resource may be wireless device-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A wireless device may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a wireless device.

In an example, a wireless device may transmit SRS 508 to a base station for channel state estimation to support uplink channel dependent scheduling and/or link adaptation. For example, SRS 508 transmitted by a wireless device may allow for a base station to estimate an uplink channel state at one or more different frequencies. A base station scheduler may employ an uplink channel state to assign one or more resource blocks of good quality for an uplink PUSCH transmission from a wireless device. A base station may semi-statistically configure a wireless device with one or more SRS resource sets. For an SRS resource set, a base station may configure a wireless device with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A wireless device may transmit one or more SRS resources in different SRS resource sets simultaneously. A new radio network may support aperiodic, periodic and/or semi-persistent SRS transmissions. A wireless device may transmit SRS resources based on one or more trigger types, wherein the one or more trigger types may comprise higher layer signaling (e.g., RRC) and/or one or more DCI formats (e.g., at least one DCI format may be employed for a wireless device to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a wireless device may be configured to transmit SRS 508 after a transmission of PUSCH 503 and corresponding uplink DM-RS 506.

In an example, a base station may semi-statistically configure a wireless device with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A wireless device may assume that one or more SS/PBCH blocks transmitted with a same block index may be quasi co-located, e.g., with respect to Doppler spread, Doppler shift, average gain, average delay, and spatial Rx parameters. A wireless device may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a wireless device may assume a band-specific sub-carrier spacing for an SS/PBCH block unless a radio network has configured a wireless device to assume a different sub-carrier spacing.

In an example, downlink CSI-RS 522 may be employed for a wireless device to acquire channel state information. A radio network may support periodic, aperiodic, and/or semi-persistent transmission of downlink CSI-RS 522. For example, a base station may semi-statistically configure and/or reconfigure a wireless device with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a wireless device with 32 ports. A base station may semi-statistically configure a wireless device with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a wireless device may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a wireless device may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a wireless device may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a wireless device with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be wireless device-specifically configured. For example, a presence and/or a pattern of downlink PT-RS 524 in a scheduled resource may be wireless device-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A wireless device may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a wireless device.

Figure 6:
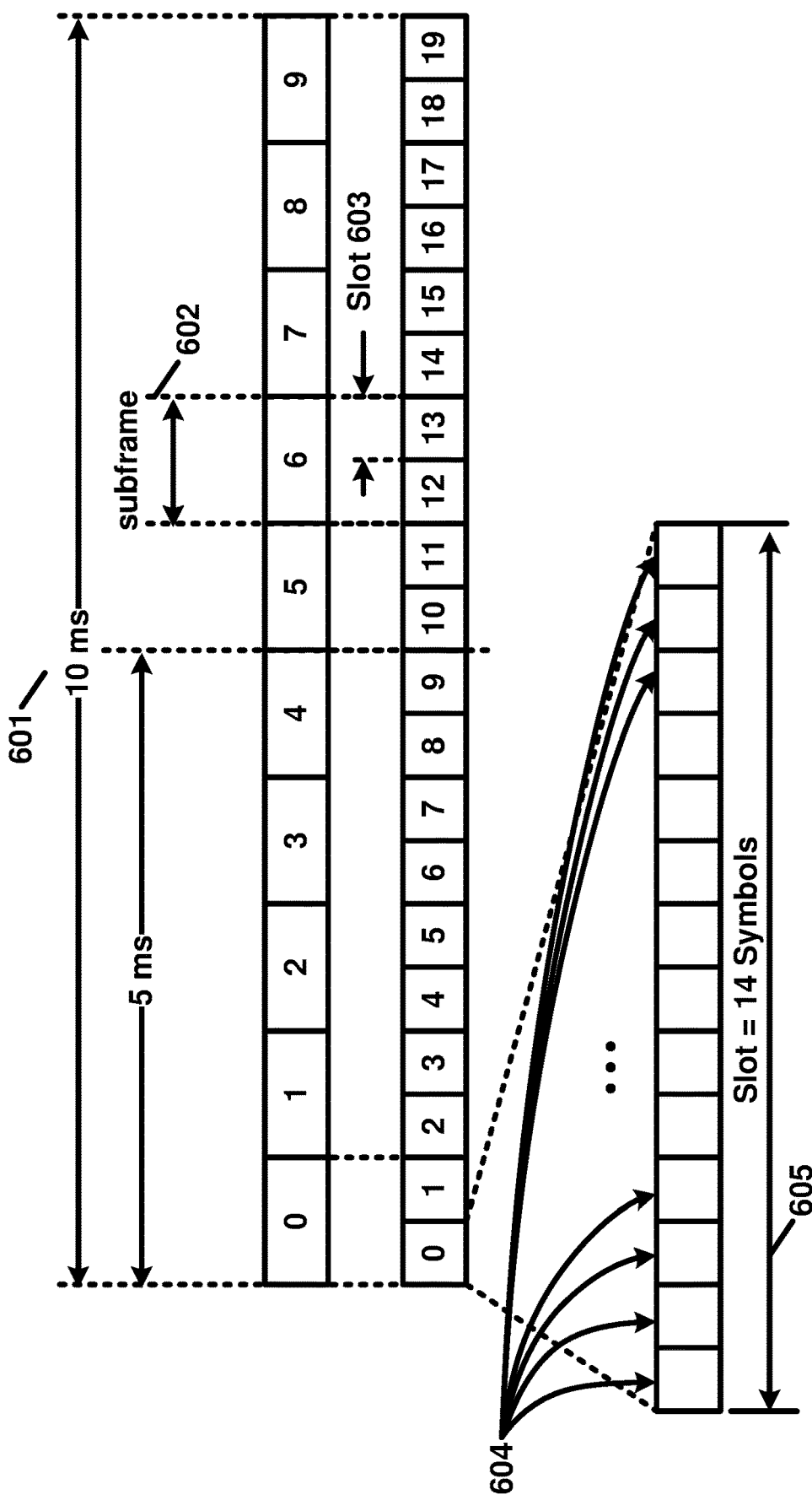
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a wireless device on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

In an example, a gNB and a wireless device may communicate with multiple CCs when configured with CA. In an example, different component carriers may have different bandwidth and/or subcarrier spacing, if CA is supported. In an example, a gNB may transmit a first type of service to a wireless device on a first component carrier. The gNB may transmit a second type of service to the wireless device on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
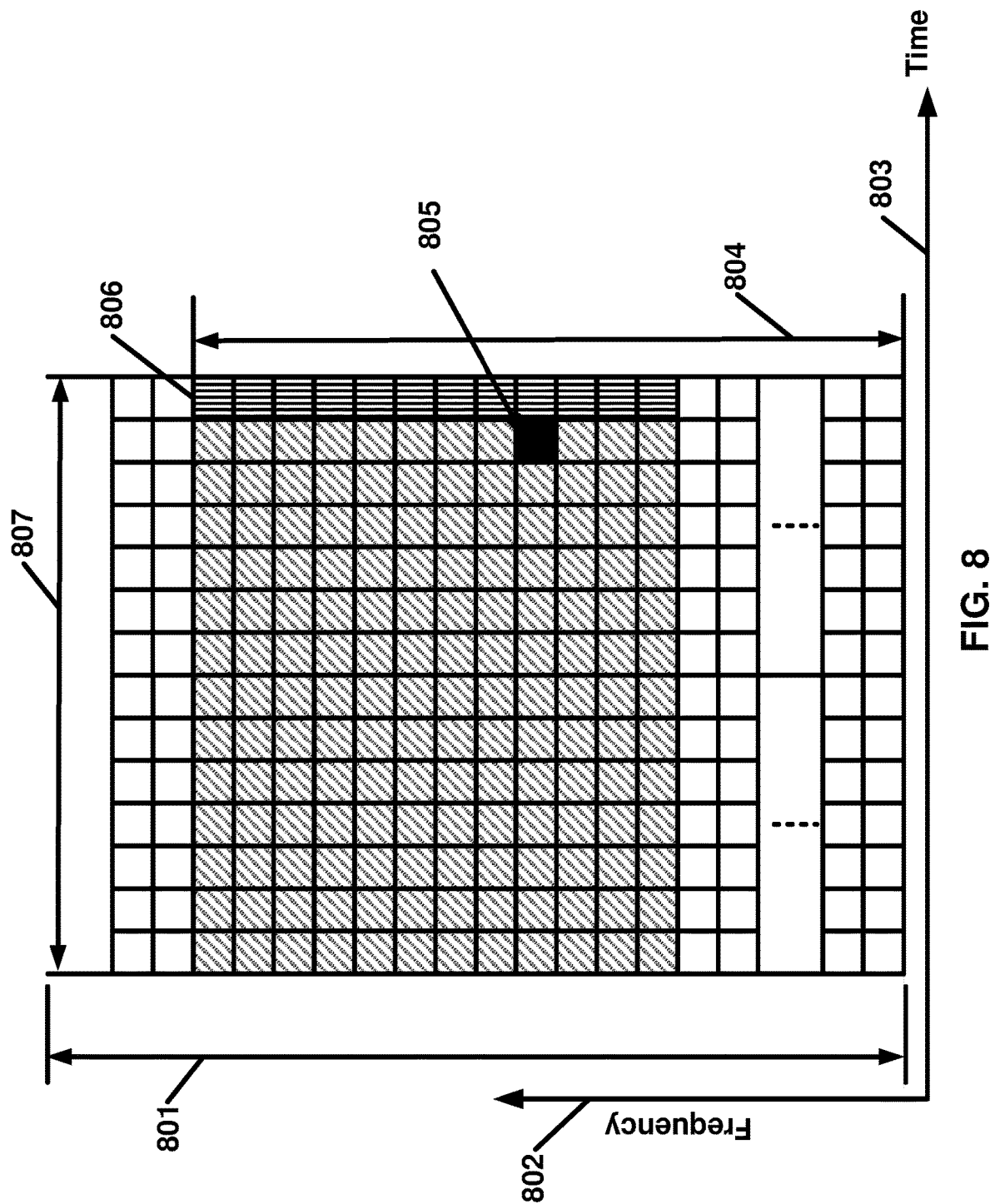
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a wireless device may assume no transmission is intended for the wireless device. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a wireless device-specific search space. In an example, a wireless device specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
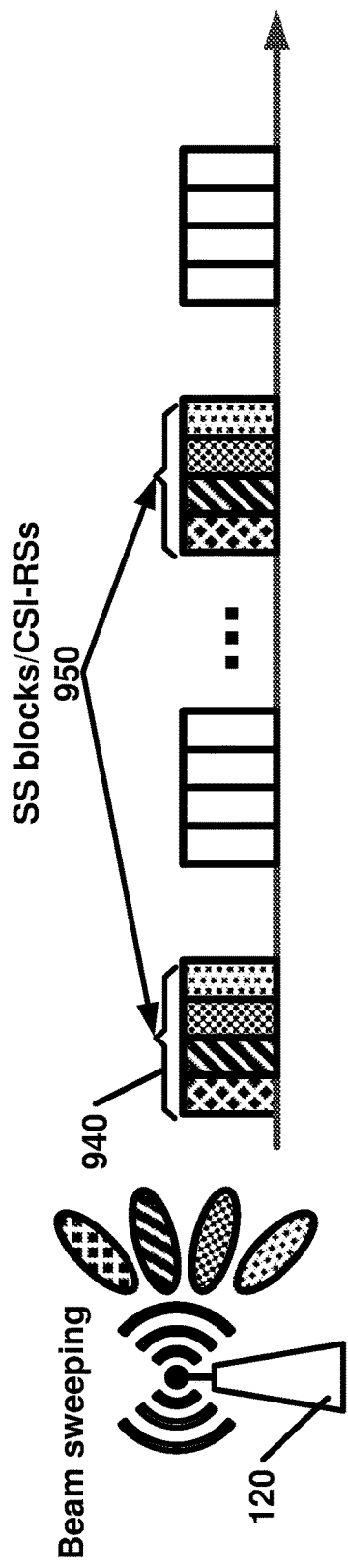
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
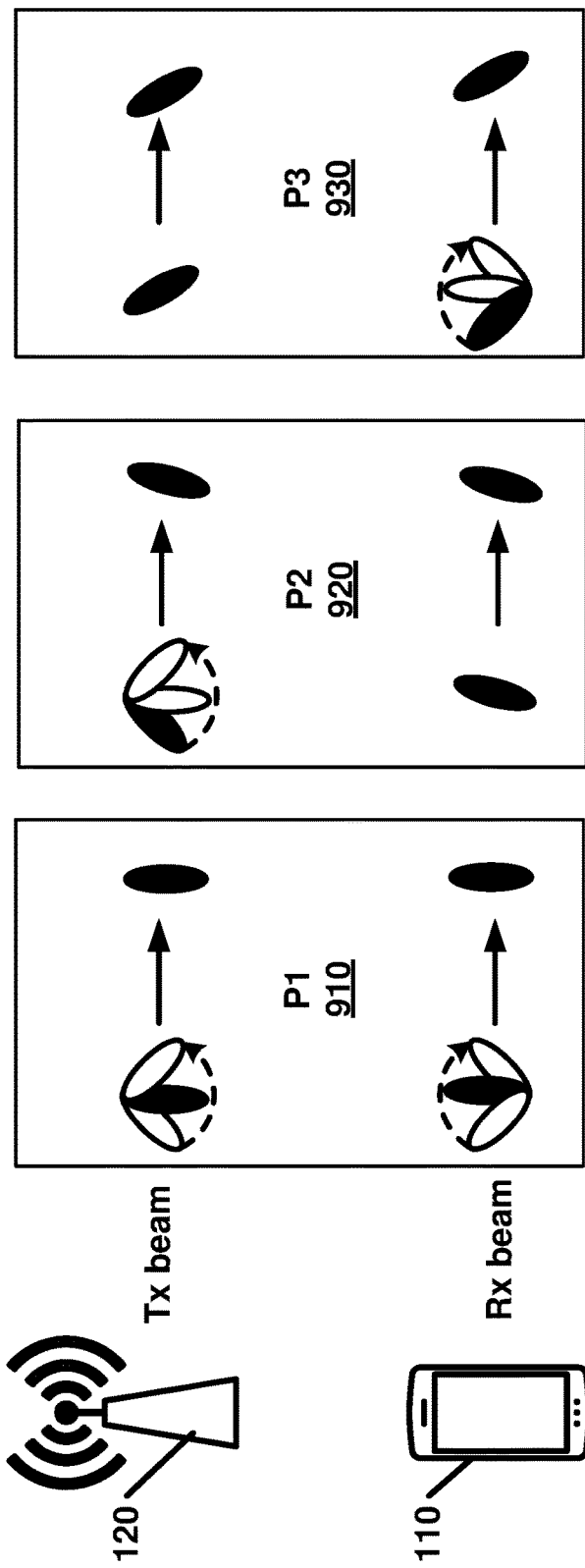
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P−1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by a wireless device employing a BA may not be large. For example, a receive and/or transmit bandwidths may not be as large as a bandwidth of a cell. Receive and/or transmit bandwidths may be adjustable. For example, a wireless device may change receive and/or transmit bandwidths, e.g., to shrink during period of low activity to save power. For example, a wireless device may change a location of receive and/or transmit bandwidths in a frequency domain, e.g. to increase scheduling flexibility. For example, a wireless device may change a subcarrier spacing, e.g. to allow different services.

In an example embodiment, a subset of a total cell bandwidth of a cell may be referred to as a Bandwidth Part (BWP). A base station may configure a wireless device with one or more BWPs to achieve a BA. For example, a base station may indicate, to a wireless device, which of the one or more (configured) BWPs is an active BWP.

Figure 10:
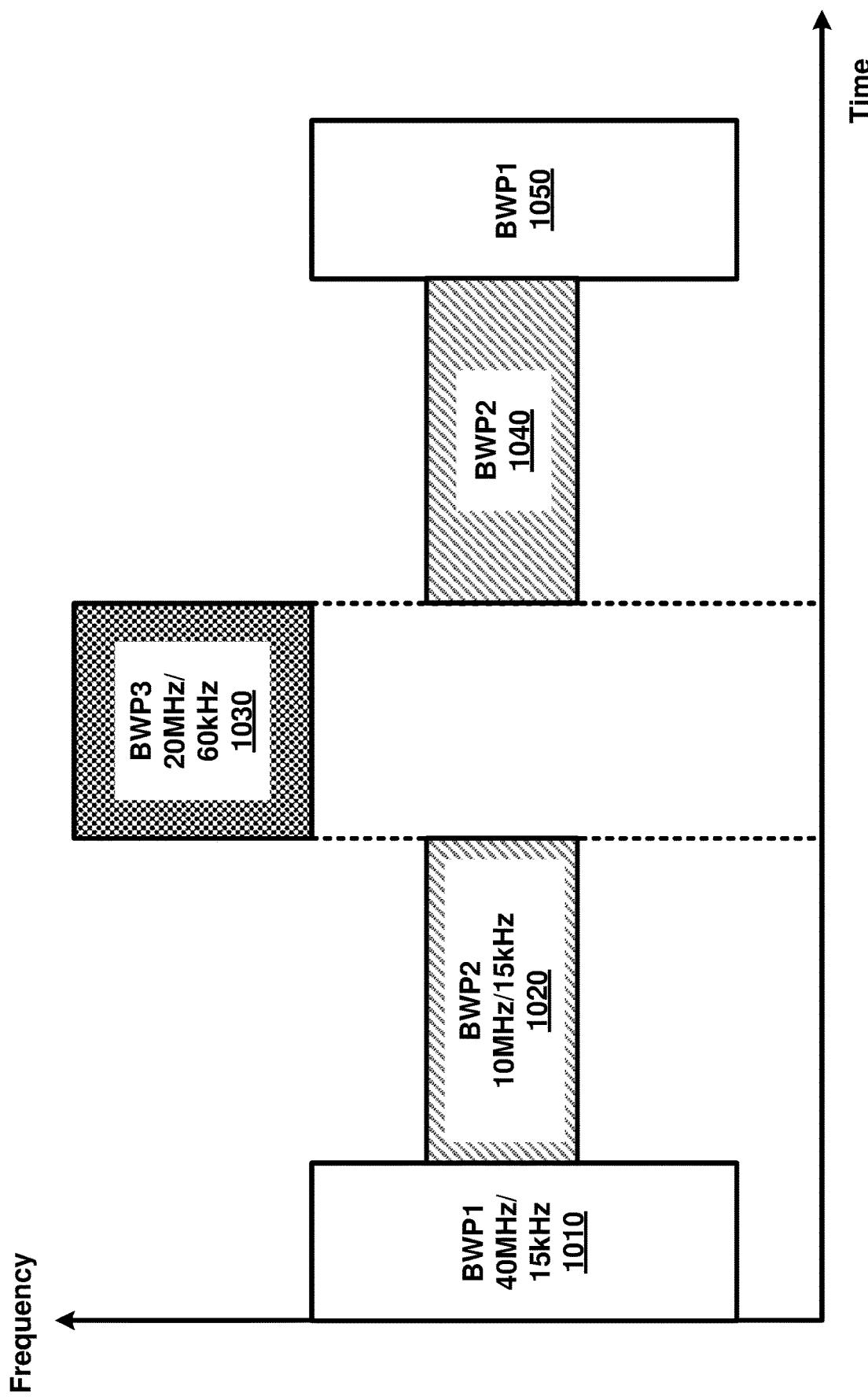
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a wireless device, configured for operation in one or more BWPs of a cell, may be configured by one or more higher layers (e.g. RRC layer) for a cell a set of one or more BWPs (e.g., at most four BWPs) for receptions by the wireless device (DL BWP set) in a DL bandwidth by at least one parameter DL-BWP and a set of one or more BWPs (e.g., at most four BWPs) for transmissions by a wireless device (UL BWP set) in an UL bandwidth by at least one parameter UL-BWP for a cell.

To enable BA on the PCell, a base station may configure a wireless device with one or more UL and DL BWP pairs. To enable BA on SCells (e.g., in case of CA), a base station may configure a wireless device at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

In an example, for unpaired spectrum operation, a wireless device may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a wireless device for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a wireless device with one or more control resource sets for at least one type of common search space and/or one wireless device-specific search space. For example, a base station may not configure a wireless device without a common search space on a PCell, or on a PSCell, in an active DL BWP.

For an UL BWP in a set of one or more UL BWPs, a base station may configure a wireless device with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a wireless device with a default DL BWP among configured DL BWPs. If a wireless device is not provided a default DL BWP, a default BWP may be an initial active DL BWP.

In an example, a base station may configure a wireless device with a timer value for a PCell. For example, a wireless device may start a timer, referred to as BWP inactivity timer, when a wireless device detects a DCI indicating an active DL BWP, other than a default DL BWP, for a paired spectrum operation or when a wireless device detects a DCI indicating an active DL BWP or UL BWP, other than a default DL BWP or UL BWP, for an unpaired spectrum operation. The wireless device may increment the timer by an interval of a first value (e.g., the first value may be 1 millisecond or 0.5 milliseconds) if the wireless device does not detect a DCI during the interval for a paired spectrum operation or for an unpaired spectrum operation. In an example, the timer may expire when the timer is equal to the timer value. A wireless device may switch to the default DL BWP from an active DL BWP when the timer expires.

In an example, a base station may semi-statistically configure a wireless device with one or more BWPs. A wireless device may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a wireless device may switch an active BWP from BWP1 1010 to BWP2 1020 in response to an expiry of BWP inactivity timer. For example, a wireless device may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a wireless device is configured for a secondary cell with a default DL BWP among configured DL BWPs and a timer value, wireless device procedures on a secondary cell may be same as on a primary cell using the timer value for the secondary cell and the default DL BWP for the secondary cell.

In an example, if a base station configures a wireless device with a first active DL BWP and a first active UL BWP on a secondary cell or carrier, a wireless device may employ an indicated DL BWP and an indicated UL BWP on a secondary cell as a respective first active DL BWP and first active UL BWP on a secondary cell or carrier.

Figure 11A:
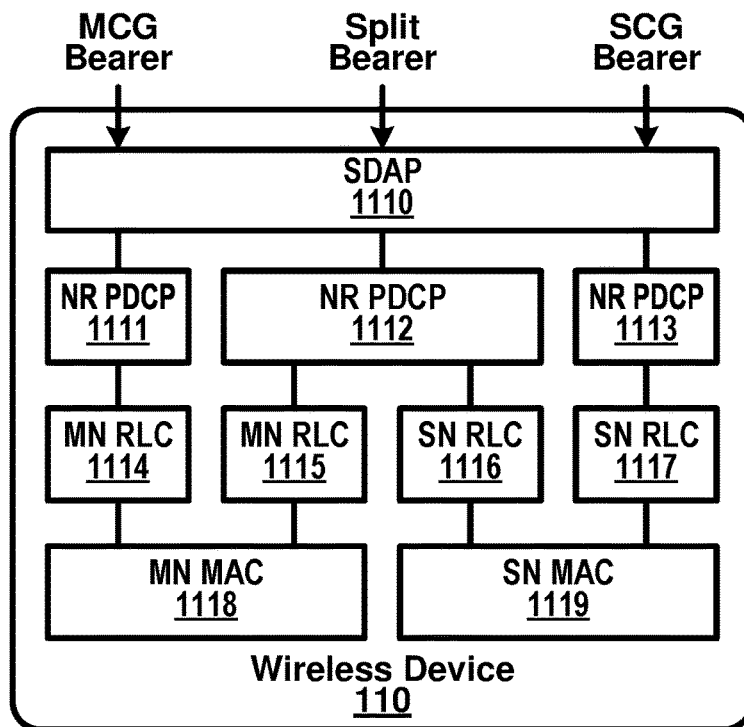
FIG. 11A, and FIG. 11B are diagrams of an example multi connectivity as per an aspect of an embodiment of the present disclosure.
Figure 11B:
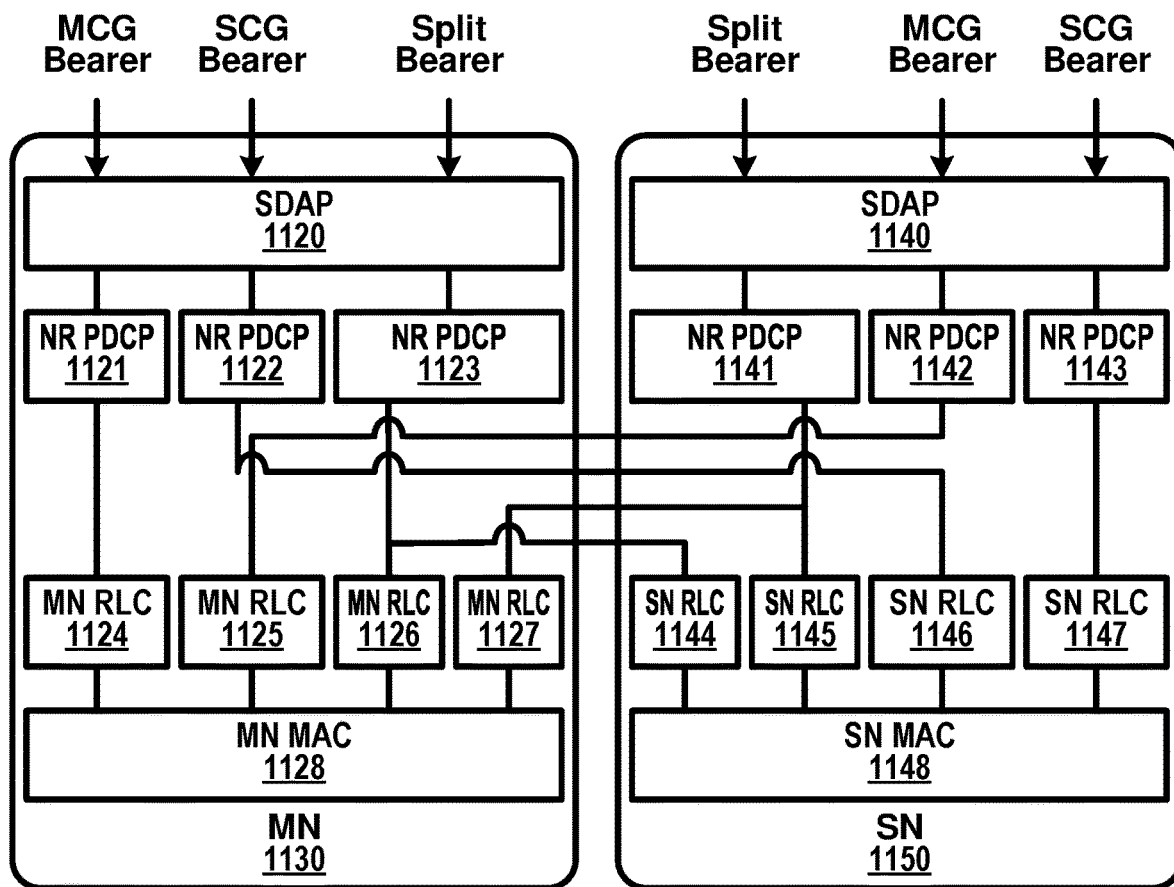

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. wireless device) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a wireless device capability coordination, a master base station may provide (a part of) an AS configuration and wireless device capabilities to a secondary base station; a master base station and a secondary base station may exchange information about a wireless device configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
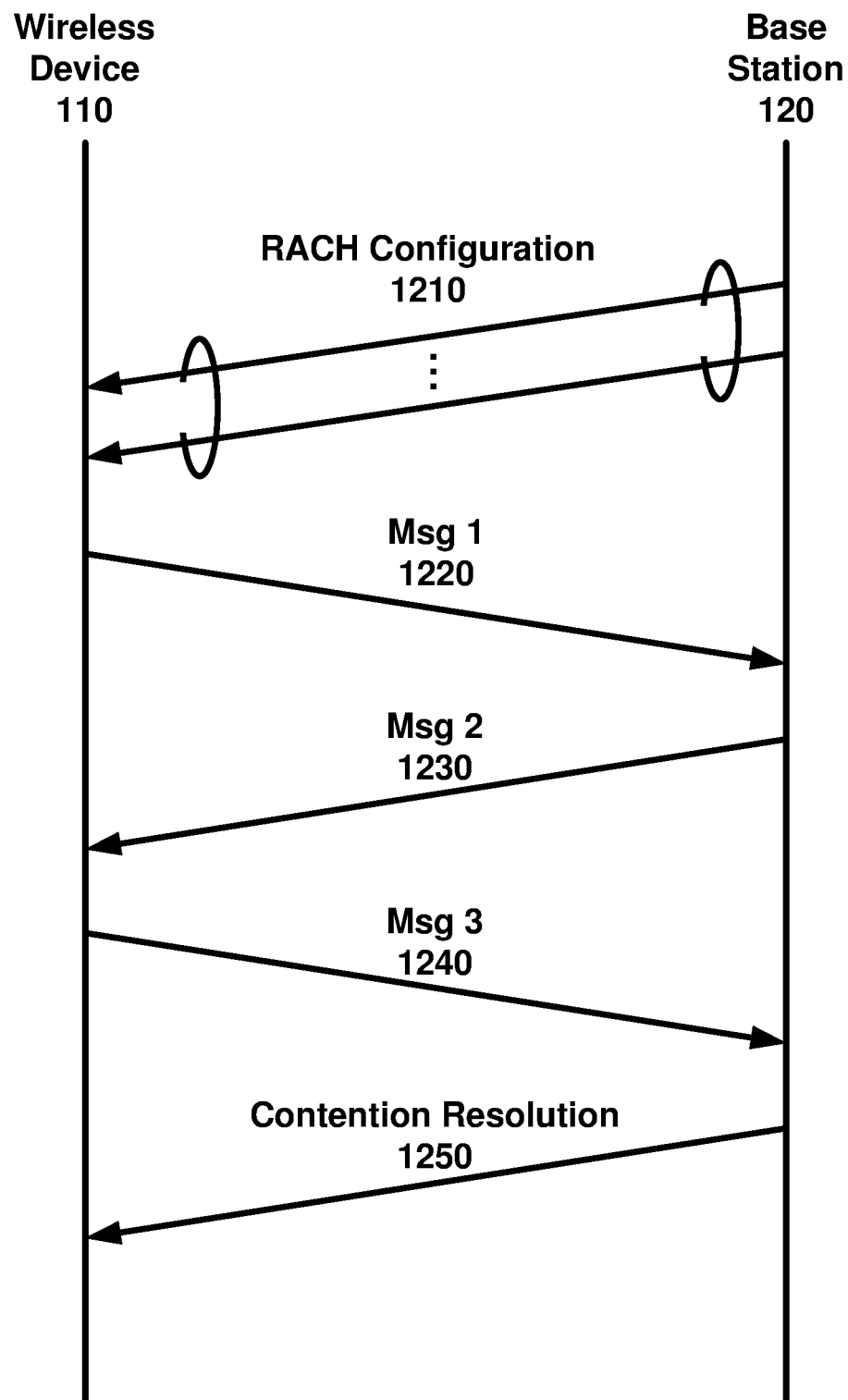
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a wireless device, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a wireless device may select a SS block with a RSRP above the RSRP threshold. If random access preambles group B exists, a wireless device may select one or more random access preambles from a group A or a group B depending on a potential Msg3 1240 size. If a random access preambles group B does not exist, a wireless device may select the one or more random access preambles from a group A. A wireless device may select a random access preamble index randomly (e.g. with equal probability or a normal distribution) from one or more random access preambles associated with a selected group. If a base station semi-statistically configures a wireless device with an association between random access preambles and SS blocks, the wireless device may select a random access preamble index randomly with equal probability from one or more random access preambles associated with a selected SS block and a selected group.

For example, a wireless device may initiate a contention free random access procedure based on a beam failure indication from a lower layer. For example, a base station may semi-statistically configure a wireless device with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a wireless device may select a random access preamble index corresponding to a selected SS block or CSI-RS from a set of one or more random access preambles for beam failure recovery request.

For example, a wireless device may receive, from a base station, a random access preamble index via PDCCH or RRC for a contention free random access procedure. If a base station does not configure a wireless device with at least one contention free PRACH resource associated with SS blocks or CSI-RS, the wireless device may select a random access preamble index. If a base station configures a wireless device with one or more contention free PRACH resources associated with SS blocks and at least one SS block with a RSRP above a first RSRP threshold amongst associated SS blocks is available, the wireless device may select the at least one SS block and select a random access preamble corresponding to the at least one SS block. If a base station configures a wireless device with one or more contention free PRACH resources associated with CSI-RSs and at least one CSI-RS with a RSRP above a second RSPR threshold amongst the associated CSI-RSs is available, the wireless device may select the at least one CSI-RS and select a random access preamble corresponding to the at least one CSI-RS.

A wireless device may perform one or more Msg1 1220 transmissions by transmitting the selected random access preamble. For example, if a wireless device selects an SS block and is configured with an association between one or more PRACH occasions and one or more SS blocks, the wireless device may determine an PRACH occasion from one or more PRACH occasions corresponding to a selected SS block. For example, if a wireless device selects a CSI-RS and is configured with an association between one or more PRACH occasions and one or more CSI-RSs, the wireless device may determine a PRACH occasion from one or more PRACH occasions corresponding to a selected CSI-RS. A wireless device may transmit, to a base station, a selected random access preamble via a selected PRACH occasions. A wireless device may determine a transmit power for a transmission of a selected random access preamble at least based on an initial preamble power and a power-ramping factor. A wireless device may determine a RA-RNTI associated with a selected PRACH occasions in which a selected random access preamble is transmitted. For example, a wireless device may not determine a RA-RNTI for a beam failure recovery request. A wireless device may determine an RA-RNTI at least based on an index of a first OFDM symbol and an index of a first slot of a selected PRACH occasions, and/or an uplink carrier index for a transmission of Msg1 1220.

In an example, a wireless device may receive, from a base station, a random access response, Msg 2 1230. A wireless device may start a time window (e.g., ra-ResponseWindow) to monitor a random access response. For beam failure recovery request, a base station may configure a wireless device with a different time window (e.g., bfr-ResponseWindow) to monitor response on beam failure recovery request. For example, a wireless device may start a time window (e.g., ra-ResponseWindow or bfr-ResponseWindow) at a start of a first PDCCH occasion after a fixed duration of one or more symbols from an end of a preamble transmission. If a wireless device transmits multiple preambles, the wireless device may start a time window at a start of a first PDCCH occasion after a fixed duration of one or more symbols from an end of a first preamble transmission. A wireless device may monitor a PDCCH of a cell for at least one random access response identified by a RA-RNTI or for at least one response to beam failure recovery request identified by a C-RNTI while a timer for a time window is running.

In an example, a wireless device may consider a reception of random access response successful if at least one random access response comprises a random access preamble identifier corresponding to a random access preamble transmitted by the wireless device. A wireless device may consider the contention free random access procedure successfully completed if a reception of random access response is successful. If a contention free random access procedure is triggered for a beam failure recovery request, a wireless device may consider a contention free random access procedure successfully complete if a PDCCH transmission is addressed to a C-RNTI. In an example, if at least one random access response comprises a random access preamble identifier, a wireless device may consider the random access procedure successfully completed and may indicate a reception of an acknowledgement for a system information request to upper layers. If a wireless device has signaled multiple preamble transmissions, the wireless device may stop transmitting remaining preambles (if any) in response to a successful reception of a corresponding random access response.

In an example, a wireless device may perform one or more Msg 3 1240 transmissions in response to a successful reception of random access response (e.g., for a contention based random access procedure). A wireless device may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A wireless device may transmit a random access preamble via PRACH and Msg3 1240 via PUSCH on a same cell. A base station may indicate an UL BWP for a PUSCH transmission of Msg3 1240 via system information block. A wireless device may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a wireless device does not incorrectly use an identity of another wireless device. For example, contention resolution 1250 may be based on C-RNTI on PDCCH or a wireless device contention resolution identity on DL-SCH. For example, if a base station assigns a C-RNTI to a wireless device, the wireless device may perform contention resolution 1250 based on a reception of a PDCCH transmission that is addressed to the C-RNTI. In response to detection of a C-RNTI on a PDCCH, a wireless device may consider contention resolution 1250 successful and may consider a random access procedure successfully completed. If a wireless device has no valid C-RNTI, a contention resolution may be addressed by employing a TC-RNTI. For example, if a MAC PDU is successfully decoded and a MAC PDU comprises a wireless device contention resolution identity MAC CE that matches the CCCH SDU transmitted in Msg3 1250, a wireless device may consider the contention resolution 1250 successful and may consider the random access procedure successfully completed.

Figure 13:
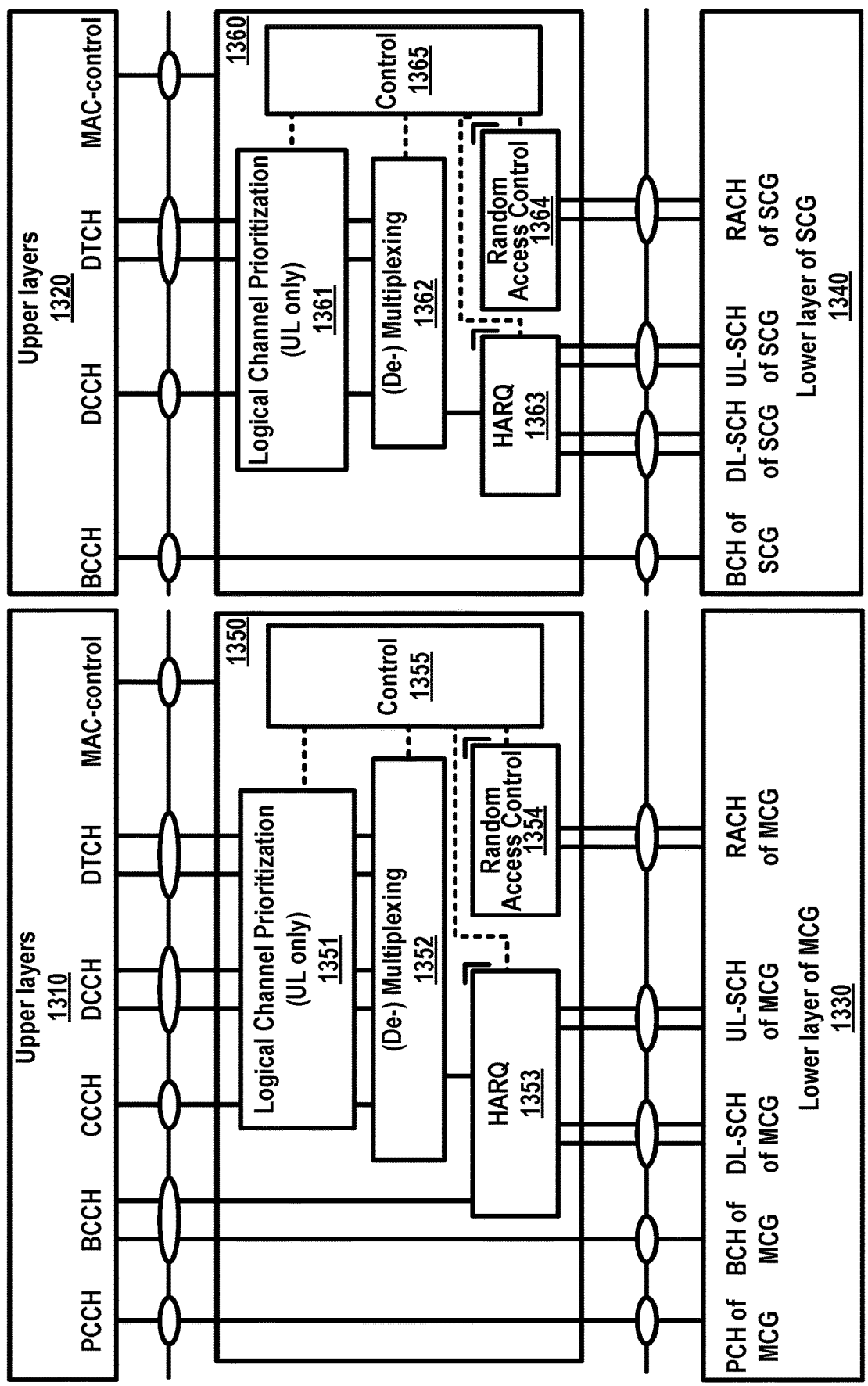
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG.

13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
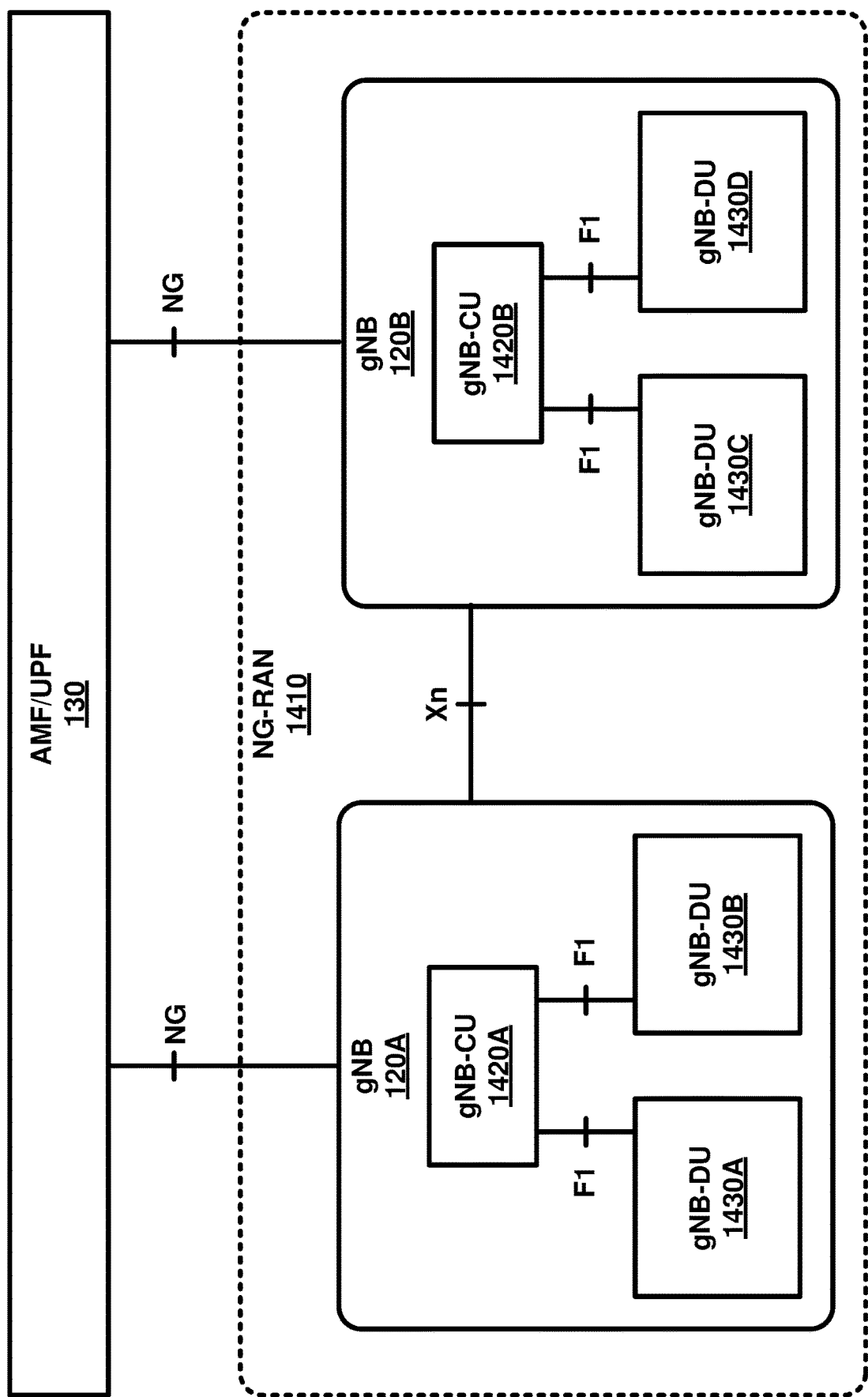
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per wireless device, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per wireless device split, a base station (base station CU and at least one base station DUs) may provide different split options for different wireless devices. In per bearer split, different split options may be utilized for different bearers. In per slice splice, different split options may be applied for different slices.

Figure 15:
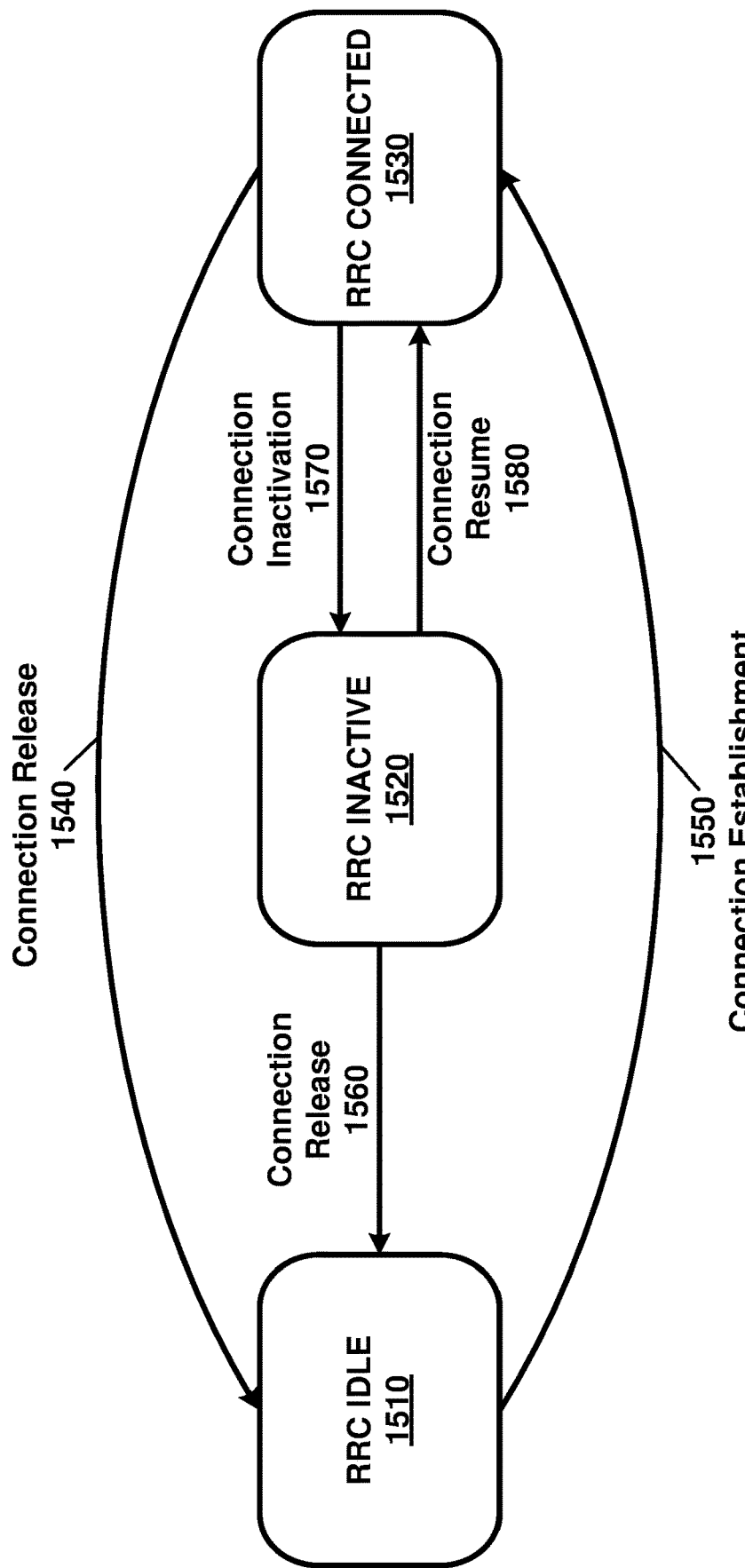
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a wireless device context of the wireless device. A wireless device context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a wireless device context of a wireless device may not be stored in a base station. In an example, in an RRC inactive state, a wireless device may not have an RRC connection with a base station. A wireless device context of a wireless device may be stored in a base station, which may be called as an anchor base station (e.g. last serving base station).

In an example, a wireless device may transition a wireless device RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a wireless device context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a wireless device RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a wireless device context retrieve procedure. A wireless device context retrieve may comprise: receiving, by a base station from a wireless device, a random access preamble; and fetching, by a base station, a wireless device context of the wireless device from an old anchor base station. Fetching may comprise: sending a retrieve wireless device context request message comprising a resume identifier to the old anchor base station and receiving a retrieve wireless device context response message comprising the wireless device context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a wireless device context of a wireless device by transmitting a retrieve wireless device context request message for the wireless device to an anchor base station of the wireless device based on at least one of an AS context identifier, an RNA identifier, a base station identifier, a resume identifier, and/or a cell identifier received from the wireless device. In response to fetching a wireless device context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

In an example, a gNB may transmit a DCI via a PDCCH for at least one of: scheduling assignment/grant; slot format notification; pre-emption indication; and/or power-control commends. More specifically, the DCI may comprise at least one of: identifier of a DCI format; downlink scheduling assignment(s); uplink scheduling grant(s); slot format indicator; pre-emption indication; power-control for PUCCH/PUSCH; and/or power-control for SRS.

In an example, a downlink scheduling assignment DCI may comprise parameters indicating at least one of: identifier of a DCI format; PDSCH resource indication; transport format; HARQ information; control information related to multiple antenna schemes; and/or a command for power control of the PUCCH.

In an example, an uplink scheduling grant DCI may comprise parameters indicating at least one of: identifier of a DCI format; PUSCH resource indication; transport format; HARQ related information; and/or a power control command of the PUSCH.

In an example, different types of control information may correspond to different DCI message sizes. For example, supporting multiple beams and/or spatial multiplexing in the spatial domain and noncontiguous allocation of RBs in the frequency domain may require a larger scheduling message, in comparison with an uplink grant allowing for frequency-contiguous allocation. DCI may be categorized into different DCI formats, where a format corresponds to a certain message size and/or usage.

In an example, a wireless device may monitor one or more PDCCH for detecting one or more DCI with one or more DCI format, in common search space or wireless device-specific search space. In an example, a wireless device may monitor PDCCH with a limited set of DCI format, to save power consumption. The more DCI format to be detected, the more power be consumed at the wireless device.

In an example, the information in the DCI formats for downlink scheduling may comprise at least one of: identifier of a DCI format; carrier indicator; frequency domain resource assignment; time domain resource assignment; bandwidth part indicator; HARQ process number; one or more MCS; one or more NDI; one or more RV; MIMO related information; Downlink assignment index (DAI); PUCCH resource indicator; PDSCH-to-HARQ_feedback timing indicator; TPC for PUCCH; SRS request; and padding if necessary. In an example, the MIMO related information may comprise at least one of: PMI; precoding information; transport block swap flag; power offset between PDSCH and reference signal; reference-signal scrambling sequence; number of layers; and/or antenna ports for the transmission; and/or Transmission Configuration Indication (TCI).

In an example, the information in the DCI formats used for uplink scheduling may comprise at least one of: an identifier of a DCI format; carrier indicator; bandwidth part indication; resource allocation type; frequency domain resource assignment; time domain resource assignment; MCS; NDI; Phase rotation of the uplink DMRS; precoding information; CSI request; SRS request; Uplink index/DAI; TPC for PUSCH; and/or padding if necessary.

In an example, a gNB may perform CRC scrambling for a DCI, before transmitting the DCI via a PDCCH. The gNB may perform CRC scrambling by binary addition of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, or TPC-SRS-RNTI) and the CRC bits of the DCI. The wireless device may check the CRC bits of the DCI, when detecting the DCI. The wireless device may receive the DCI when the CRC is scrambled by a sequence of bits that is the same as the at least one wireless device identifier.

In an example, in order to support wide bandwidth operation, a gNB may transmit one or more PDCCH in different control resource sets (coresets). A gNB may transmit one or more RRC message comprising configuration parameters of one or more coresets. A coreset may comprise at least one of: a first OFDM symbol; a number of consecutive OFDM symbols; a set of resource blocks; a CCE-to-REG mapping. In an example, a gNB may transmit a PDCCH in a dedicated coreset for particular purpose, for example, for beam failure recovery confirmation.

In an example, a wireless device may monitor PDCCH for detecting DCI in one or more configured coresets, to reduce the power consumption.

In a carrier aggregation (CA), two or more component carriers (CCs) may be aggregated. A wireless device may simultaneously receive or transmit on one or more CCs depending on capabilities of the wireless device. In an example, the CA may be supported for contiguous CCs. In an example, the CA may be supported for non-contiguous CCs.

When configured with a CA, a wireless device may have one RRC connection with a network. During an RRC connection establishment/re-establishment/handover, a cell providing a NAS mobility information may be a serving cell. During an RRC connection re-establishment/handover procedure, a cell providing a security input may be a serving cell. In an example, the serving cell may be referred to as a primary cell (PCell). In an example, a gNB may transmit, to a wireless device, one or more messages comprising configuration parameters of a plurality of one or more secondary cells (SCells), depending on capabilities of the wireless device.

When configured with CA, a base station and/or a wireless device may employ an activation/deactivation mechanism of an SCell for an efficient battery consumption. When a wireless device is configured with one or more SCells, a gNB may activate or deactivate at least one of the one or more SCells. Upon configuration of an SCell, the SCell may be deactivated.

In an example, a wireless device may activate/deactivate an SCell in response to receiving an SCell Activation/Deactivation MAC CE.

In an example, a base station may transmit, to a wireless device, one or more messages comprising an sCellDeactivationTimer timer. In an example, a wireless device may deactivate an SCell in response to an expiry of the sCellDeactivationTimer timer.

When a wireless device receives an SCell Activation/Deactivation MAC CE activating an SCell, the wireless device may activate the SCell. In response to the activating the SCell, the wireless device may perform operations comprising SRS transmissions on the SCell, CQI/PMI/RI/CRI reporting for the SCell on a PCell, PDCCH monitoring on the SCell, PDCCH monitoring for the SCell on the PCell, and/or PUCCH transmissions on the SCell.

In an example, in response to the activating the SCell, the wireless device may start or restart an sCellDeactivationTimer timer associated with the SCell. The wireless device may start the sCellDeactivationTimer timer in the slot when the SCell Activation/Deactivation MAC CE has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

In an example, when a wireless device receives an SCell Activation/Deactivation MAC CE deactivating an activated SCell, the wireless device may deactivate the activated SCell.

In an example, when an sCellDeactivationTimer timer associated with an activated SCell expires, the wireless device may deactivate the activated SCell. In response to the deactivating the activated SCell, the wireless device may stop the sCellDeactivationTimer timer associated with the activated SCell. In an example, in response to the deactivating the activated SCell, the wireless device may clear one or more configured downlink assignments and/or one or more configured uplink grant Type 2 associated with the activated SCell. In an example, in response to the deactivating the activated SCell, the wireless device may further suspend one or more configured uplink grant Type 1 associated with the activated SCell. The wireless device may flush HARQ buffers associated with the activated SCell.

In an example, when an SCell is deactivated, a wireless device may not perform operations comprising transmitting SRS on the SCell, reporting CQI/PMI/RI/CRI for the SCell on a PCell, transmitting on UL-SCH on the SCell, transmitting on RACH on the SCell, monitoring at least one first PDCCH on the SCell, monitoring at least one second PDCCH for the SCell on the PCell, transmitting a PUCCH on the SCell.

In an example, when at least one first PDCCH on an activated SCell indicates an uplink grant or a downlink assignment, a wireless device may restart an sCellDeactivationTimer timer associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart an sCellDeactivationTimer timer associated with the activated SCell.

In an example, when an SCell is deactivated, if there is an ongoing random access procedure on the SCell, a wireless device may abort the ongoing random access procedure on the SCell.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the wireless device. The UL LBT scheme may be different from the DL LBT scheme (e.g. by using different LBT mechanisms or parameters) for example, since the LAA UL is based on scheduled access which affects a wireless device's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a wireless device perspective may be a continuous transmission from a wireless device with no transmission immediately before or after from the same wireless device on the same CC. In an example, UL transmission burst is defined from a wireless device perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In an example, single and multiple DL to UL and UL to DL switching within a shared gNB channel occupancy time (COT) may be supported. In an example, gap length and/or single or multiple switching points may have different LBT requirements. In an example, LBT may not be used for gap less than 16 us. One-shot LBT may be used for gap above 16 us and less than 25 us. In an example, for single switching point and for the gap from DL transmission to UL transmission exceeds 25 us, one-shot LBT may be used; for multiple switching points, for the gap from DL transmission to UL transmission exceeds 25 us, one-shot LBT may be used.

In an example, a signal that is detected by a wireless device with low complexity may be useful for at least one of: power saving of the wireless device, improved coexistence with other systems, achieving spatial reuse at least within the same operator network, and/or performing serving cell transmission burst acquisition, etc.

In an example, operation of new radio on unlicensed bands (NR-U) may employ a signal that contains at least SS/PBCH block burst set transmission. In an example, other channels and signals may be transmitted together as part of the signal. The design of this signal may consider there is no gap within a time span the signal is transmitted at least within a beam. In an example, gaps may be needed for beam switching.

In an example, a block-interlaced based PUSCH may be employed. In an example, the same interlace structure for PUCCH and PUSCH may be used. In an example, interlaced based PRACH may be used.

In an example, initial active DL/UL BWP may be approximately 20 MHz for 5 GHz band. In an example, initial active DL/UL BWP may be approximately 20 MHz for 6 GHz band if similar channelization as 5 GHz band is used for 6 GHz band.

In an example, a wireless device may transmit one or more HARQ ACK/NACK bits corresponding to a data packet in a COT same as when the wireless receives the data packet. In an example, a wireless device may transmit one or more HARQ ACK/NACK bits corresponding to a data packet in a first COT different from a second COT when the wireless device receives the data packet.

In an example, dependencies of HARQ process information to a configured/predefined timing relative to a received data packet may be removed. In an example, UCI on PUSCH may carry HARQ process identification (ID), new data indication (NDI), redundancy version identification (RVID). In an example, Downlink Feedback Information (DFI) may be used for transmission of HARQ feedback for configured grant.

In an example, a gNB and/or a wireless device may support both CBRA and CFRA on NR-U SpCell. CFRA may be supported on NR-U SCells. In an example, RAR may be transmitted via SpCell.

In an example, carrier aggregation between a primary NR cell in licensed band (e.g., NR PCell) and a secondary NR cell in unlicensed band (e.g., NR-U SCell) may be supported. In an example, NR-U SCell may have both DL and UL, or DL-only. In an example, dual connectivity between a primary LTE cell in licensed band (e.g., LTE PCell) and a primary secondary NR cell in unlicensed band (e.g., NR-U PSCell) may be supported. In an example, Stand-alone NR-U where all carriers are in unlicensed spectrum may be supported. In an example, an NR cell with DL in unlicensed band and UL in licensed band may be supported. In an example, dual connectivity between a primary NR cell in licensed band licensed band (e.g., NR PCell) and a primary secondary NR cell in unlicensed band (e.g., NR-U PSCell) may be supported.

In an example, a Wi-Fi system may be present in a band (e.g., sub-7 GHz) by regulation. If the Wi-Fi system is present in the band (e.g., sub-7 GHz) where NR-U is operating, the NR-U operating bandwidth may be an integer multiple of 20 MHz. In an example, at least for band where absence of Wi-Fi cannot be guaranteed (e.g. by regulation), LBT can be performed in units of 20 MHz. In an example, receiver assisted LBT (e.g., request to send (RTS)/clear to send (CTS) type mechanism) and/or on-demand receiver assisted LBT (e.g., enabling receiver assisted LBT when needed) may be employed. In an example, techniques to enhance spatial reuse may be used. In an example, preamble detection may be used for unlicensed system.

In an example, to schedule uplink data packet on a PUSCH via an unlicensed carrier, a gNB may attempt to gain access to a channel to transmit a DCI via a PDCCH. In response to receiving the DCI via the PDCCH, a wireless device may perform LBT prior to transmitting data packets on the PUSCH. Such procedure may increase latency of data transmission especially when the channel is occupied by other devices (e.g., Wi-Fi terminals). In an example, a mechanism of autonomous uplink transmission may be used to improve the latency of data transmission. In an example, a wireless device may be pre-allocated a resource for transmission similar to UL semi persistent scheduling (SPS) and performs LBT prior to using the resource. In an example, autonomous uplink may be based on one or more configured grants f (e.g., a type 1 configured grant and/or a type 2 configured grant).

In an example, a HARQ process identity may be transmitted by the wireless device (e.g., as UCI). This may enable a wireless device to use the first available transmission opportunity irrespective of the HARQ process. In an example, UCI on PUSCH may be used to carry HARQ process ID, NDI and RVID.

For unlicensed band, UL dynamic grant scheduled transmission may increase a transmission delay and/or transmission failure possibility due to at least a first LBT of a gNB and a second LBT of a wireless device. Pre-configured grant such as configured grant in NR may be used for NR-U, which may decrease the number of LBTs performed and control signaling overhead.

In an example, in a Type 1 configured grant, an uplink grant is provided by RRC, and stored as configured uplink grant. In an example, in Type 2 configured grant, an uplink grant is provided by PDCCH, and stored or cleared as configured uplink grant based on L1 signaling indicating configured grant activation or deactivation.

In an example, there may not be a dependency between HARQ process information to the timing. In an example, UCI on PUSCH may carry HARQ process ID, NDI, RVID, etc. In an example, wireless device may autonomously select one HARQ process ID which is informed to gNB by UCI.

In an example, a wireless device may perform non-adaptive retransmission with the configured uplink grant. When dynamic grant for configured grant retransmission is blocked due to LBT, wireless device may try to transmit in the next available resource with configured grant.

In an example, Downlink Feedback Information (DFI) may be transmitted (e.g., using DCI) may include HARQ feedback for configured grant transmission. The wireless device may perform transmission/retransmission using configured grant according to DFI including HARQ feedback. In an example, wideband carrier with more than one channels is supported on NR-based unlicensed cell.

In an example, there may be one active BWP in a carrier. In an example, a BWP with multiple channels may be activated. In an example, when absence of Wi-Fi cannot be guaranteed (e.g. by regulation), LBT may be performed in units of 20 MHz. In this case, there may be multiple parallel LBT procedures for this BWP. The actual transmission bandwidth may be subject to subband with LBT success, which may result in dynamic bandwidth transmission within this active wideband BWP.

In an example, multiple active BWPs may be supported. To maximize the BWP utilization efficiency, the BWP bandwidth may be the same as the bandwidth of subband for LBT, e.g., LBT is carried out on each BWP. The network may activate/deactivate the BWPs based on data volume to be transmitted.

In an example, multiple non overlapped BWPs may be activated for a wireless device within a wide component carrier, which may be similar as carrier aggregation in LTE LAA. To maximize the BWP utilization efficiency, the BWP bandwidth may be the same as the bandwidth of subband for LBT, i.e. LBT is carrier out on each BWP. When more than one subband LBT success, it requires wireless device to have the capability to support multiple narrow RF or a wide RF which includes these multiple activated BWPs.

In an example, a single wideband BWP may be activated for a wireless device within a component carrier. The bandwidth of wideband BWP may be in the unit of subband for LBT. For example, if the subband for LBT is 20 MHz in 5 GHz band, the wideband BWP bandwidth may consist of multiple 20 MHz. The actual transmission bandwidth may be subject to subband with LBT success, which may result in dynamic bandwidth transmission within this active wideband BWP.

In an example, active BWP switching may be achieved by use of scheduling DCI. In an example, the network may indicate to the wireless device a new active BWP to use for an upcoming, and any subsequent, data transmission/reception. In an example, a wireless device may monitor multiple, configured BWPs to determine which has been acquired for DL transmissions by the gNB. For example, a wireless device may be configured with monitoring occasion periodicity and offset for each configured BWP. The wireless device may attempt to determine if a BWP has been acquired by the gNB during those monitoring occasions. In an example, upon successfully determining that the channel is acquired, the wireless device may continue with that BWP as its active BWP, at least until indicated otherwise or Maximum Channel Occupancy Time (MCOT) has been reached. In an example, when a wireless device has determined that a BWP is active, it may attempt blind detection of PDCCH in configured CORESETs and it might also perform measurements on aperiodic or SPS resources.

In an example, for UL transmissions, a wireless device may be configured with multiple UL resources, possibly in different BWPs. The wireless device may have multiple LBT configurations, each tied to a BWP and possibly a beam pair link. The wireless device may be granted UL resources tied to one or more LBT configurations. Similarly, the wireless device may be provided with multiple AUL/grant-free resources each requiring the use of different LBT configurations. Providing a wireless device with multiple AUL resources over multiple BWPs may ensure that if LBT fails using a first LBT configuration for one AUL resource in one BWP, a wireless device can attempt transmission in another AUL resource in another BWP. This may reduce the channel access latency and make better use of the over-all unlicensed carrier.

The carrier aggregation with at least one SCell operating in the unlicensed spectrum may be referred to as Licensed-Assisted Access (LAA). In LAA, the configured set of serving cells for a wireless device may include at least one SCell operating in the unlicensed spectrum according to a first frame structure (e.g., frame structure Type 3). The SCell may be called LAA SCell.

In an example, if the absence of IEEE802.11n/11ac devices sharing the carrier cannot be guaranteed on a long term basis (e.g., by level of regulation), and for if the maximum number of unlicensed channels that network may simultaneously transmit on is equal to or less than 4, the maximum frequency separation between any two carrier center frequencies on which LAA SCell transmissions are performed may be less than or equal to 62 MHz. In an example, the wireless device may be required to support frequency separation.

In an example, base station and wireless device may apply Listen-Before-Talk (LBT) before performing a transmission on LAA SCell. When LBT is applied, the transmitter may listen to/sense the channel to determine whether the channel is free or busy. If the channel is determined to be free/clear, the transmitter may perform the transmission; otherwise, it may not perform the transmission. In an example, if base station uses channel access signals of other technologies for the purpose of channel access, it may continue to meet the LAA maximum energy detection threshold requirement.

In an example, the combined time of transmissions compliant with the channel access procedure by a base station may not exceed 50 ms in any contiguous 1 second period on an LAA SCell.

In an example, which LBT type (e.g., type 1 or type 2 uplink channel access) the wireless device applies may be signaled via uplink grant for uplink PUSCH transmission on LAA SCells. In an example, for Autonomous Uplink (AUL) transmissions the LBT may not be signaled in the uplink grant.

In an example, for type 1 uplink channel access on AUL, base station may signal the Channel Access Priority Class for a logical channel and wireless device may select the highest Channel Access Priority Class (e.g., with a lower number in FIG. 16) of the logical channel(s) with MAC SDU multiplexed into the MAC PDU. In an example, the MAC CEs except padding BSR may use the lowest Channel Access Priority Class.

In an example, for type 2 uplink channel access on AUL, the wireless device may select logical channels corresponding to any Channel Access Priority Class for UL transmission in the subframes signaled by base station in common downlink control signaling.

In an example, for uplink LAA operation, the base station may not schedule the wireless device more subframes than the minimum necessary to transmit the traffic corresponding to the selected Channel Access Priority Class or lower (e.g., with a lower number in FIG. 16), than the channel Access Priority Class signaled in UL grant based on the latest BSR and received uplink traffic from the wireless device if type 1 uplink channel access procedure is signaled to the wireless device; and/or Channel Access Priority Class used by the base station based on the downlink traffic, the latest BSR and received UL traffic from the wireless device if type 2 uplink channel access procedure is signaled to the wireless device.

In an example, a first number (e.g., four) Channel Access Priority Classes may be used when performing uplink and downlink transmissions in LAA carriers. In an example in FIG. 16 shows which Channel Access Priority Class may be used by traffic belonging to the different standardized QCIs. A non-standardized QCI (e.g., Operator specific QCI) may use suitable Channel Access Priority Class based on the FIG. 16 for example, e.g., the Channel Access Priority Class used for a non-standardized QCI should be the Channel Access Priority Class of the standardized QCIs which best matches the traffic class of the non-standardized QCI.

In an example, for uplink, the base station may select the Channel Access Priority Class by taking into account the lowest priority QCI in a Logical Channel Group.

In an example, four Channel Access Priority Classes may be used. If a DL transmission burst with PDSCH is transmitted, for which channel access has been obtained using Channel Access Priority Class P (1 . . . 4), the base station may ensure the following where a DL transmission burst refers to the continuous transmission by base station after a successful LBT: the transmission duration of the DL transmission burst may not exceed the minimum duration needed to transmit all available buffered traffic corresponding to Channel Access Priority Class(es)≤P; the transmission duration of the DL transmission burst may not exceed the Maximum Channel Occupancy Time for Channel Access Priority Class P; and additional traffic corresponding to Channel Access Priority Class(s)>P may be included in the DL transmission burst once no more data corresponding to Channel Access Priority Class≤P is available for transmission. In such cases, base station may maximize occupancy of the remaining transmission resources in the DL transmission burst with this additional traffic.

In an example, when the PDCCH of an LAA SCell is configured, if cross-carrier scheduling applies to uplink transmission, it may be scheduled for downlink transmission via its PDCCH and for uplink transmission via the PDCCH of one other serving cell. In an example, when the PDCCH of an LAA SCell is configured, if self-scheduling applies to both uplink transmission and downlink transmission, it may be scheduled for uplink transmission and downlink transmission via its PDCCH.

In an example, Autonomous uplink may be supported on the SCells. In an example, one or more autonomous uplink configuration may be supported per SCell. In an example, multiple autonomous uplink configurations may be active simultaneously when there is more than one SCell.

In an example, when autonomous uplink is configured by RRC, the following information may be provided in an AUL configuration information element (e.g., AUL-Config): AUL C-RNTI; HARQ process IDs aul-harq-processes that may be configured for autonomous UL HARQ operation, the time period aul-retransmissionTimer before triggering a new transmission or a retransmission of the same HARQ process using autonomous uplink; the bitmap aul-subframes that indicates the subframes that are configured for autonomous UL HARQ operation.

In an example, when the autonomous uplink configuration is released by RRC, the corresponding configured grant may be cleared.

In an example, if AUL-Config is configured, the MAC entity may consider that a configured uplink grant occurs in those subframes for which aul-subframes is set to 1.

In an example, if AUL confirmation has been triggered and not cancelled, if the MAC entity has UL resources allocated for new transmission for this TTI, the MAC entity may instruct a Multiplexing and Assembly procedure to generate an AUL confirmation MAC Control Element; the MAC entity may cancel the triggered AUL confirmation.

In an example, the MAC entity may clear the configured uplink grant for the SCell in response first transmission of AUL confirmation MAC Control Element triggered by the AUL release for this SCell. In an example, retransmissions for uplink transmissions using autonomous uplink may continue after clearing the corresponding configured uplink grant.

In an example, a MAC entity may be configured with AUL-RNTI for AUL operation. In an example, an uplink grant may be received for a transmission time interval for a Serving Cell on the PDCCH for the MAC entity's AUL C-RNTI. In an example, if the NDI in the received HARQ information is 1, the MAC entity may consider the NDI for the corresponding HARQ process not to have been toggled. The MAC entity may deliver the uplink grant and the associated HARQ information to the HARQ entity for this transmission time interval. In an example, if the NDI in the received HARQ information is 0 and if PDCCH contents indicate AUL release, the MAC entity may trigger an AUL confirmation. If an uplink grant for this TTI has been configured, the MAC entity may consider the NDI bit for the corresponding HARQ process to have been toggled. The MAC entity may deliver the configured uplink grant and the associated HARQ information to the HARQ entity for this TTI. In an example, if the NDI in the received HARQ information is 0 and if PDCCH contents indicate AUL activation, the MAC entity may trigger an AUL confirmation.

In an example, if the aul-retransmissionTimer is not running and if there is no uplink grant previously delivered to the HARQ entity for the same HARQ process; or if the previous uplink grant delivered to the HARQ entity for the same HARQ process was not an uplink grant received for the MAC entity's C-RNTI; or if the HARQ_FEEDBACK is set to ACK for the corresponding HARQ process, the MAC entity may deliver the configured uplink grant, and the associated HARQ information to the HARQ entity for this TTI.

In an example, the NDI transmitted in the PDCCH for the MAC entity's AUL C-RNTI may be set to 0.

In an example, for configured uplink grants, if UL HARQ operation is autonomous, the HARQ Process ID associated with a TTI for transmission on a Serving Cell may be selected by the wireless device implementation from the HARQ process IDs that are configured for autonomous UL HARQ operation by upper layers for example, in AUL-HARQ-processes.

In an example, for autonomous HARQ, a HARQ process may maintain a state variable e.g., HARQ_FEEDBACK, which may indicate the HARQ feedback for the MAC PDU currently in the buffer, and/or a timer aul-retransmission-Timer which may prohibit new transmission or retransmission for the same HARQ process when the timer is running.

In an example, when the HARQ feedback is received for a TB, the HARQ process may set HARQ_FEEDBACK to the received value; and may stop the aul-retransmission-Timer if running.

In an example, when PUSCH transmission is performed for a TB and if the uplink grant is a configured grant for the MAC entity's AUL C-RNTI, the HARQ process start the aul-retransmissionTimer.

In an example, if the HARQ entity requests a new transmission, the HARQ process may set HARQ_FEED-BACK to NACK if UL HARQ operation is autonomous asynchronous. if the uplink grant was addressed to the AUL C-RNTI, set CURRENT_IRV to 0.

In an example, if aperiodic CSI requested for a TTI, the MAC entity may not generate a MAC PDU for the HARQ entity in case the grant indicated to the HARQ entity is a configured uplink grant activated by the MAC entity's AUL C-RNTI.

In an example, if the wireless device detects on the scheduling cell for UL transmissions on an LAA SCell a transmission of DCI (e.g., Format 0A/4A) with the CRC scrambled by AUL C-RNTI carrying AUL-DFI, the wireless device may use the autonomous uplink feedback information according to the following procedures: for a HARQ process configured for autonomous uplink transmission, the corresponding HARQ-ACK feedback may be delivered to higher layers. For the HARQ processes not configured for autonomous uplink transmission, the corresponding HARQ-ACK feedback may not delivered to higher layers; for an uplink transmission in subframe/slot/TTI n, the wireless device may expect HARQ-ACK feedback in the AUL-DFI at earliest in subframe n+4; If the wireless device receives AUL-DFI in a subframe indicating ACK for a HARQ process, the wireless device may not be expected to receive AUL-DFI indicating ACK for the same HARQ process prior to 4 ms after the wireless device transmits another uplink transmission associated with that HARQ process;

In an example, a wireless device may validate an autonomous uplink assignment PDCCH/EPDCCH if all the following conditions are met: the CRC parity bits obtained for the PDCCH/EPDCCH payload are scrambled with the AUL C-RNTI; and the 'Flag for AUL differentiation' indicates activating/releasing AUL transmission. In an example, one or more fields in an activation DCI may be pre-configured values for validation.

In an example, a Serving Cell may be configured with one or multiple BWPs. In an example, a maximum number of BWP per Serving Cell may be a first number.

In an example, the BWP switching for a Serving Cell may be used to activate an inactive BWP and deactivate an active BWP at a time. In an example, the BWP switching may be controlled by the PDCCH indicating a downlink assignment or an uplink grant, by the bwp-InactivityTimer, by RRC signaling, or by the MAC entity itself upon initiation of Random Access procedure. In an example, upon/in response to addition of SpCell or activation of an SCell, the DL BWP and UL BWP indicated by firstActiveDownlinkBWP-Id and firstActiveUplinkBWP-Id respectively may be active without receiving PDCCH indicating a downlink assignment or an uplink grant. The active BWP for a Serving Cell may be indicated by either RRC or PDCCH. For unpaired spectrum, a DL BWP may be paired with a UL BWP, and BWP switching may be common for both UL and DL.

In an example, for an activated Serving Cell configured with a BWP, if a BWP is activated, the MAC entity may transmit on UL-SCH on the BWP; may transmit on RACH on the BWP; may monitor the PDCCH on the BWP; may transmit PUCCH on the BWP; may transmit SRS on the BWP; may receive DL-SCH on the BWP; and may (re-)initialize any suspended configured uplink grants of configured grant Type 1 on the active BWP according to the stored configuration, if any, and to start in a symbol.

In an example, for an activated Serving Cell configured with a BWP, if a BWP is deactivated, the MAC entity may not transmit on UL-SCH on the BWP; may not transmit on RACH on the BWP; may not monitor the PDCCH on the BWP; may not transmit PUCCH on the BWP; may not report CSI for the BWP; may not transmit SRS on the BWP; may not receive DL-SCH on the BWP; may clear any configured downlink assignment and configured uplink grant of configured grant Type 2 on the BWP; and may suspend any configured uplink grant of configured grant Type 1 on the inactive BWP.

In an example, upon/in response to initiation of the Random Access procedure on a Serving Cell, if PRACH occasions are not configured for the active UL BWP, the MAC entity may switch the active UL BWP to BWP indicated by initialUplinkBWP and if the Serving Cell is a SpCell, the MAC entity may switch the active DL BWP to BWP indicated by initialDownlinkBWP. The MAC entity may perform the Random Access procedure on the active DL BWP of SpCell and active UL BWP of this Serving Cell.

In an example, upon/in response to initiation of the Random Access procedure on a Serving Cell, if PRACH occasions are configured for the active UL BWP, if the Serving Cell is a SpCell and if the active DL BWP does not have the same bwp-Id as the active UL BWP, the MAC entity may switch the active DL BWP to the DL BWP with the same bwp-Id as the active UL BWP. The MAC entity may perform the Random Access procedure on the active DL BWP of SpCell and active UL BWP of this Serving Cell.

In an example, if the MAC entity receives a PDCCH for BWP switching of a serving cell, if there is no ongoing Random Access procedure associated with this Serving Cell; or if the ongoing Random Access procedure associated with this Serving Cell is successfully completed upon reception of this PDCCH addressed to C-RNTI the MAC entity may perform BWP switching to a BWP indicated by the PDCCH.

In an example, if the MAC entity receives a PDCCH for BWP switching for a Serving Cell while a Random Access procedure associated with that Serving Cell is ongoing in the MAC entity, it may be up to wireless device implementation whether to switch BWP or ignore the PDCCH for BWP switching, except for the PDCCH reception for BWP switching addressed to the C-RNTI for successful Random Access procedure completion in which case the wireless device may perform BWP switching to a BWP indicated by the PDCCH. In an example, upon/in response to reception of the PDCCH for BWP switching other than successful contention resolution, if the MAC entity decides to perform BWP switching, the MAC entity may stop the ongoing Random Access procedure and may initiate a Random Access procedure on the new activated BWP; if the MAC decides to ignore the PDCCH for BWP switching, the MAC entity may continue with the ongoing Random Access procedure on the active BWP.

In an example, a wireless device configured for operation in bandwidth parts (BWPs) of a serving cell, may be configured by higher layers for the serving cell a set of at most X (e.g., four) bandwidth parts (BWPs) for receptions by the wireless device (DL BWP set) in a DL bandwidth by a parameter (e.g., BWP-Downlink) and a set of at most Y (e.g., four) BWPs for transmissions by the wireless device (UL BWP set) in an UL bandwidth by a parameter (e.g., BWP-Uplink) for the serving cell.

An initial active DL BWP may be defined by a location and number of contiguous PRBs, a subcarrier spacing, and a cyclic prefix, for the control resource set for Type0-PDCCH common search space. For operation on the primary cell or on a secondary cell, a wireless device may be provided an initial active UL BWP by higher layer parameter initialuplinkBWP. If the wireless device is configured with a supplementary carrier, the wireless device may be provided an initial UL BWP on the supplementary carrier by higher layer parameter (e.g., initialUplinkBWP) in supplementaryUplink.

In an example, if a wireless device has dedicated BWP configuration, the wireless device may be provided by a higher layer parameter (e.g., firstActiveDownlinkBWP-Id) a first active DL BWP for receptions and by a higher layer parameter (e.g., firstActiveUplinkBWP-Id) a first active UL BWP for transmissions on the primary cell.

In an example, for each DL BWP or UL BWP in a set of DL BWPs or UL BWPs, respectively, the wireless device may be configured the following parameters for the serving cell: a subcarrier spacing provided by a higher layer parameter (e.g., subcarrierSpacing); a cyclic prefix provided by a higher layer parameter (e.g., cyclicPrefix); a first PRB and a number of contiguous PRBs indicated by a higher layer parameter (e.g., locationAndBandwidth) that is interpreted as RIV, setting $N_{BWP}^{size}$=275, and the first PRB is a PRB offset relative to the PRB indicated by higher layer parameters (e.g., offsetToCarrier and subcarrierSpacing); an index in the set of DL BWPs or UL BWPs by respective a higher layer parameter (e.g., bwp-Id); a set of BWP-common and a set of BWP-dedicated parameters by higher layer parameters (e.g., bwp-Common and bwp-Dedicated).

In an example, for unpaired spectrum operation, a DL BWP from the set of configured DL BWPs with index provided by higher layer parameter (e.g., bwp-Id) for the DL BWP is linked with an UL BWP from the set of configured UL BWPs with index provided by higher layer parameter (e.g., bwp-Id) for the UL BWP when the DL BWP index and the UL BWP index are equal. In an example, for unpaired spectrum operation, a wireless device may not expect to receive a configuration where the center frequency for a DL BWP is different than the center frequency for an UL BWP when the bwp-Id of the DL BWP is equal to the bwp-Id of the UL BWP.

In an example, for each DL BWP in a set of DL BWPs on the primary cell, a wireless device may be configured control resource sets for every type of common search space and for wireless device-specific search space. In an example, the wireless device may not expect to be configured without a common search space on the PCell, or on the PSCell, in the active DL BWP.

In an example, for each UL BWP in a set of UL BWPs, the wireless device may be configured resource sets for PUCCH transmissions.

In an example, a wireless device may receive PDCCH and PDSCH in a DL BWP according to a configured subcarrier spacing and CP length for the DL BWP. A wireless device may transmit PUCCH and PUSCH in an UL BWP according to a configured subcarrier spacing and CP length for the UL BWP.

In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions.

If a bandwidth part indicator field is configured in DCI format 0_1 or DCI format 1_1 and indicates an UL BWP or a DL BWP different from the active UL BWP or DL BWP, respectively, for each information field in the received DCI format 0_1 or DCI format 1_1, in an example, if the size of the information field is smaller than the one required for the DCI format 0_1 or DCI format 1_1 interpretation for the UL BWP or DL BWP that is indicated by the bandwidth part indicator, respectively, the wireless device may prepend zeros to the information field until its size is the one required for the interpretation of the information field for the UL BWP or DL BWP prior to interpreting the DCI format 0_1 or DCI format 1_1 information fields, respectively. In an example, if the size of the information field is larger than the one required for the DCI format 0_1 or DCI format 1_1 interpretation for the UL BWP or DL BWP that is indicated by the bandwidth part indicator, respectively, the wireless device may use a number of least significant bits of DCI format 0_1 or DCI format 1_1 equal to the one required for the UL BWP or DL BWP indicated by bandwidth part indicator prior to interpreting the DCI format 0_1 or DCI format 1_1 information fields, respectively. In an example, the wireless device may set the active UL BWP or DL BWP to the UL BWP or DL BWP indicated by the bandwidth part indicator in the DCI format 0_1 or DCI format 1_1, respectively.

In an example, a wireless device may expect to detect a DCI format 0_1 indicating active UL BWP change, or a DCI format 1_1 indicating active DL BWP change, if a corresponding PDCCH is received within the first X (e.g., 3) symbols of a slot.

In an example, for the primary cell, a wireless device may be provided by a higher layer parameter (e.g., defaultDownlinkBWP-Id) a default DL BWP among the configured DL BWPs. In an example, if a wireless device is not provided a default DL BWP by higher layer parameter defaultDownlinkBWP-Id, the default DL BWP may be the initial active DL BWP.

In an example, if a wireless device is configured for a secondary cell with higher layer parameter defaultDownlinkBWP-Id indicating a default DL BWP among the configured DL BWPs and the wireless device is configured with higher layer parameter bwp-InactivityTimer indicating a timer value, the wireless device procedures on the secondary cell may be same as on the primary cell using the timer value for the secondary cell and the default DL BWP for the secondary cell.

In an example, if a wireless device is configured by higher layer parameter bwp-InactivityTimer a timer value for the primary cell and the timer is running, the wireless device may increment the timer every interval of 1 millisecond for frequency range 1 or every 0.5 milliseconds for frequency range 2 if the wireless device does not detect a DCI format for PDSCH reception on the primary cell for paired spectrum operation or if the wireless device does not detect a DCI format for PDSCH reception or a DCI format for PUSCH transmission on the primary cell for unpaired spectrum operation during the interval.

In an example, if a wireless device is configured by higher layer parameter BWP-InactivityTimer a timer value for a secondary cell and the timer is running, the wireless device may increment the timer every interval of 1 millisecond for frequency range 1 or every 0.5 milliseconds for frequency range 2 if the wireless device does not detect a DCI format for PDSCH reception on the secondary cell for paired spectrum operation or if the wireless device does not detect a DCI format for PDSCH reception or a DCI format for PUSCH transmission on the secondary cell for unpaired spectrum operation during the interval. In an example, the wireless device may deactivate the secondary cell when the timer expires.

In an example, if a wireless device is configured by higher layer parameter firstActiveDownlinkBWP-Id a first active DL BWP and by higher layer parameter firstActiveUplinkBWP-Id a first active UL BWP on a secondary cell or supplementary carrier, the wireless device uses the indicated DL BWP and the indicated UL BWP on the secondary cell as the respective first active DL BWP and first active UL BWP on the secondary cell or supplementary carrier.

In an example, for paired spectrum operation, a wireless device does not expect to transmit HARQ-ACK information on a PUCCH resource indicated by a DCI format 1_0 or a DCI format 1_1 if the wireless device changes its active UL BWP on the PCell between a time of a detection of the DCI format 1_0 or the DCI format 1_1 and a time of a corresponding HARQ-ACK information transmission on the PUCCH.

In an example, a wireless device may not expect to monitor PDCCH when the wireless device performs RRM over a bandwidth that is not within the active DL BWP for the wireless device.

In an example, a BWP IE may be used to configure a bandwidth part. In an example, for each serving cell the network may configure at least an initial bandwidth part comprising of at least a downlink bandwidth part and one (if the serving cell is configured with an uplink) or two (if using supplementary uplink (SUL)) uplink bandwidth parts. Furthermore, the network may configure additional uplink and downlink bandwidth parts for a serving cell.

In an example, the bandwidth part configuration may be split into uplink and downlink parameters and into common and dedicated parameters. Common parameters (in BWP-UplinkCommon and BWP-DownlinkCommon) may be "cell specific" and the network ensures the necessary alignment with corresponding parameters of other UEs. The common parameters of the initial bandwidth part of the PCell may be provided via system information. In an example, the network may provide the common parameters via dedicated signaling.

In an example, cyclic prefix may indicate whether to use the extended cyclic prefix for this bandwidth part. If not set, the wireless device may use the normal cyclic prefix. Normal CP may be supported for all numerologies and slot formats. Extended CP may be supported only for 60 kHz subcarrier spacing. In an example, locationAndBanddwidth may indicate frequency domain location and bandwidth of this bandwidth part. The value of the field may be interpreted as resource indicator value (RIV). The first PRB may be a PRB determined by subcarrierSpacing of this BWP and offsetToCarrier (configured in SCS-SpecificCarrier contained within FrequencyInfoDL) corresponding to this subcarrier spacing. In case of TDD, a BWP-pair (UL BWP and DL BWP with the same bwp-Id) may have the same center frequency. In an example, subcarrierSpacing may indicate subcarrier spacing to be used in this BWP for all channels and reference signals unless explicitly configured elsewhere. In an example, the value kHz15 may corresponds to $\mu=0$, kHz30 to $\mu=1$, and so on. In an example, the values 15, 30, or 60 kHz may be used. In an example, bwp-Id may indicate an identifier for this bandwidth part. Other parts of the RRC configuration may use the BWP-Id to associate themselves with a particular bandwidth part. The BWP ID=0 may be associated with the initial BWP and may hence not be used here (in other bandwidth parts). The NW may trigger the wireless device to switch UL or DL BWP using a DCI field. The four code points in that DCI field may map to the RRC-configured BWP-ID as follows: For up to 3 configured BWPs (in addition to the initial BWP) the DCI code point may be equivalent to the BWP ID (initial=0, first dedicated=1, . . . ). If the NW configures 4 dedicated bandwidth parts, they may be identified by DCI code points 0 to 3. In this case it is not possible to switch to the initial BWP using the DCI field. In an example, bwp-Id may indicate an identifier for this bandwidth part. Other parts of the RRC configuration may use the BWP-Id to associate themselves with a particular bandwidth part. The BWP ID=0 may be associated with the initial BWP and may hence may not be used here (in other bandwidth parts). The NW may trigger the wireless device to switch UL or DL BWP using a DCI field. The four code points in that DCI field map to the RRC-configured BWP-ID as follows: For up to 3 configured BWPs (in addition to the initial BWP) the DCI code point may be equivalent to the BWP ID (initial=0, first dedicated=1, . . . ). If the NW configures 4 dedicated bandwidth parts, they may be identified by DCI code points 0 to 3. In this case it may not be possible to switch to the initial BWP using the DCI field. In an example, rach-ConfigCommon may indicate configuration of cell specific random access parameters which the wireless device may use for contention based and contention free random access as well as for contention based beam failure recovery. In an example, the NW may configure SSB-based RA (and hence RACH-ConfigCommon) only for UL BWPs if the linked DL BWPs allows the wireless device to acquire the SSB associated to the serving cell. In an example, PUCCH-config may indicate PUCCH configuration for one BWP of the regular UL or SUL of a serving cell. If the wireless device is configured with SUL, the network may configure PUCCH only on the BWPs of one of the uplinks (UL or SUL).

In an example, an information element (e.g., LBT-Config) may indicate one or more parameters for listen before talk operation at the wireless device. In an example, maxEnergyDetectionThreshold may indicate an absolute maximum energy detection threshold value. In an example, the units of maxEnergyDetectionThreshold may be in dBm. For example, value −85 may correspond to −85 dBm, value −84 may correspond to −84 dBm, and so on (e.g., in steps of 1 dBm). If the field is not configured, the wireless device shall use a default maximum energy detection threshold value. In an example, energyDetectionThresholdOffset may indicate an offset to the default maximum energy detection threshold value. The unit of energyDetectionThresholdOffset may be in dB. For example, value −13 may correspond to −13 dB, value −12 may correspond to −12 dB, and so on (e.g., in steps of 1 dB). In an example, an information element (e.g., laa-SCellSubframeConfig) may indicate a bit-map indicating unlicensed SCell subframe configuration. For example, 1 denotes that the corresponding subframe is allocated as MBSFN subframe. The bitmap may be interpreted as follows: Starting from the first/leftmost bit in the bitmap, the allocation applies to subframes #1, #2, #3, #4, #6, #7, #8, and #9. In an example, a cell/bandwidth part may be configured with an information element (e.g., CrossCarrierSchedulingConfigLAA) that may indicate a scheduling cell ID and a CIF value. In an example, an information element schedulingCellId may indicate which cell signals the downlink allocations and uplink grants, if applicable, for the concerned SCell. In case the wireless device is configured with DC, the scheduling cell may be part of the same cell group (e.g., MCG or SCG) as the scheduled cell. In case the wireless device is configured with crossCarrierScheduling-ConfigLAA-UL, schedulingCellId indicated in crossCarrierSchedulingConfigLAA-UL may indicate which cell signals the uplink grants. In an example, an information element (e.g., cifInSchedulingCell) may indicate the CIF value used in the scheduling cell to indicate the cell.

In an example, a wireless device and a base station scheduling UL transmission(s) for the wireless device may perform channel access procedures for the wireless device to access the channel(s) on which the unlicensed Scell(s) transmission(s) are performed.

In an example, the wireless device may access a carrier on which unlicensed Scell(s) UL transmission(s) are performed according to one of a plurality of channel access procedures. In an example, the plurality of channel access procedures may comprise a first Type or a second Type UL channel access procedures.

In an example, if an UL grant scheduling a PUSCH transmission indicates a first Type channel access procedure, the wireless device may use the first Type channel access procedure for transmitting transmissions including the PUSCH transmission.

In an example, a wireless device may use a first Type channel access procedure for transmitting transmissions including the PUSCH transmission on autonomous UL resources.

In an example, if an UL grant scheduling a PUSCH transmission indicates a second Type channel access procedure, the wireless device may use the second Type channel access procedure for transmitting transmissions including the PUSCH transmission.

Figure 17:
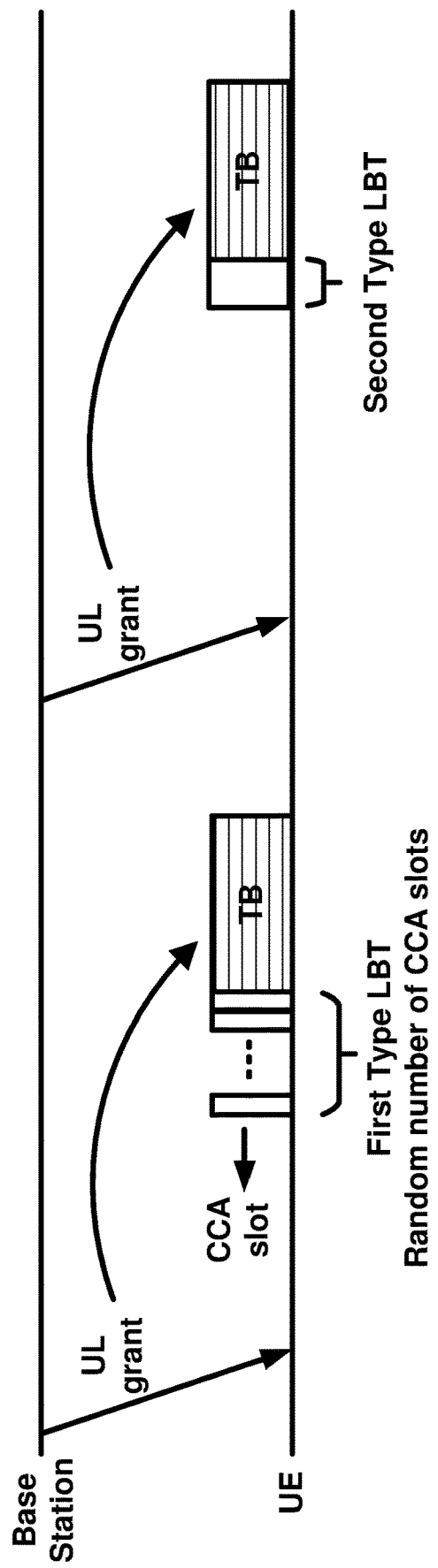
FIG. 17 is a diagram of an example listen before talk (LBT) as per an aspect of an embodiment of the present disclosure.

In an example and as shown in FIG. 17, channel access procedure for transmission of a first PUSCH may be based on a first Type channel access. The first Type channel access may be based on sensing the channel for a first number of durations (e.g., CCA slots). The first duration may have a first fixed value. The first number may be based on a random number drawn from an interval based on the priority class. In an example, channel access procedure for transmission of a second PUSCH may be based on a second Type channel access. The second Type channel access procedure may be based on sensing the channel based on a second fixed duration.

In an example, the wireless device may use the first Type channel access procedure for transmitting SRS transmissions not including a PUSCH transmission. In an example, UL channel access priority class p=1 may be used for SRS transmissions not including a PUSCH.

In an example, if the wireless device is scheduled to transmit PUSCH and SRS in subframe/slot/mini-slot/TTI n, and if the wireless device cannot access the channel for PUSCH transmission in subframe/slot/mini-slot/TTI n, the wireless device may attempt to make SRS transmission in subframe/slot/mini-slot/TTI n according to uplink channel access procedures specified for SRS transmission.

In an example, channel access priority classes and its associated parameters are shown in FIG. 16. In an example, for p=3,4, $T_{ulm\,cot,p}$ may be 10 ms if a higher layer parameter (e.g., absenceOfAnyOtherTechnology) indicates TRUE, otherwise, $T_{ulm\,cot,p}$ may be 6 ms.

In an example, when $T_{ulm\,cot,p}$ is 6 ms it may be increased to 8 ms by inserting one or more gaps. The minimum duration of a gap may be 100 us. The maximum duration before including any such gap may be 6 ms.

In an example, if a first field (e.g., an UL duration and offset field) configures an UL offset l and an UL duration d for subframe/slot/mini-slot/TTI n, the scheduled wireless device may use the second Type channel access for transmissions in subframes/slots/mini-slots/TTIs n+l+i where i=0, 1, . . . d−1, irrespective of the channel access Type signaled in the UL grant for those subframes/slots/mini-slots/TTIs, if the end of wireless device transmission occurs in or before subframe/slot/mini-slot/TTI n+l+d−1.

In an example, if one or more first fields (e.g., an UL duration and offset field) configure an UL offset l and an UL duration d for subframe/slot/mini-slot/TTI n and one or more second fields (e.g., COT sharing indication for AUL field) are set to true, a wireless device configured with autonomous UL may use the second Type channel access for autonomous UL transmissions corresponding to any priority class in subframes/slots/mini-slots/TTIs n+l+i where i=0, 1, . . . d−1, if the end of wireless device autonomous UL transmission occurs in or before subframe/slot/mini-slot/TTI n+l+d−1 and the autonomous UL transmission between n+l and n+l+d−1 may be contiguous.

In an example, if one or more first fields (e.g., an UL duration and offset field) configures an UL offset l and an UL durationd for subframe/slot/mini-slot/TTI n and one or more second fields (e.g., a COT sharing indication for AUL field) is set to false, a wireless device configured with autonomous UL may not transmit autonomous UL in subframes/slots/mini-slots/TTIs n+l+i where i=0, 1, . . . d−1.

In an example, if the wireless device scheduled to transmit transmissions including PUSCH in a set subframes/slots/mini-slots/TTIs $n_0, n_1, \ldots, n_{w-1}$ using one or more PDCCH DCI Formats and if the wireless device cannot access the channel for a transmission in subframe/slot/mini-slot/TTI $n_k$, the wireless device may attempt to make a transmission in subframe/slot/mini-slot/TTI $n_{k+1}$ according to a channel access type indicated in the DCI, where k∈{0, 1, . . . w−2}, and w is the number of scheduled subframes/slots/mini-slots/TTIs indicated in the DCI.

In an example, if the wireless device is scheduled to transmit transmissions without gaps including PUSCH in a set of subframes/slots/mini-slots/TTIs $n_0, n_1, \ldots, n_{w-1}$ using one or more PDCCH DCI Formats and the wireless device performs a transmission in subframe/slot/mini-slot/TTI $n_k$ after accessing the carrier according to one of first Type or second Type UL channel access procedures, the wireless device may continue transmission in subframes/slots/mini-slots/TTIs after $n_k$ where $k \in \{0, 1, \ldots w-1\}$.

In an example, if the beginning of wireless device transmission in subframe/slot/mini-slot/TTI n+1 immediately follows the end of wireless device transmission in subframe/slot/mini-slot/TTI n, the wireless device may not be expected to be indicated with different channel access types for the transmissions in those subframes/slots/mini-slots/TTIs.

In an example, if a wireless device is scheduled to transmit transmissions including a first mode PUSCH in a set subframes/slots/mini-slots/TTIs $n_0, n_1, \ldots, n_{w-1}$ using one or more PDCCH DCI Formats and a first Type channel access procedure, and if the wireless device cannot access the channel for a transmission in subframe/slot/mini-slot/TTI $n_k$ according to the PUSCH starting position indicated in the DCI, the wireless device may attempt to make a transmission in subframe/slot/mini-slot/TTI $n_k$ with an offset of $o_i$ OFDM symbol and according to the channel access type indicated in the DCI, where $k \in \{0, 1, \ldots w-1\}$ and $i \in \{0,7\}$, for i=0 the attempt is made at the PUSCH starting position indicated in the DCI, and w is the number of scheduled subframes/slots/mini-slots/TTIs indicated in the DCI. In an example, there may be no limit on the number of attempts the wireless device should make for the transmission.

In an example, if the wireless device is scheduled to transmit transmissions including a first mode PUSCH in a set subframes/slots/mini-slots/TTI $sn_0, n_1, \ldots, n_{w-1}$ using one or more PDCCH DCIs and a second Type channel access procedure, and if the wireless device cannot access the channel for a transmission in subframe/slot/mini-slot/TTI $n_k$ according to the PUSCH starting position indicated in the DCI, the wireless device may attempt to make a transmission in subframe/slot/mini-slot/TTI $n_k$ with an offset of $o_i$ OFDM symbol and according to the channel access type indicated in the DCI, where $k \in \{0, 1, \ldots w-1\}$ and $i \in \{0,7\}$, for i=0 the attempt is made at the PUSCH starting position indicated in the DCI, and w is the number of scheduled subframes/slots/mini-slots/TTIs indicated in the DCI. In an example, the number of attempts the wireless device may make for the transmission may be limited to w+1, where w is the number of scheduled subframes/slots/mini-slots/TTIs indicated in the DCI.

In an example, if a wireless device is scheduled to transmit without gaps in subframes/slots/mini-slots/TTIs $n_0, n_1, \ldots, n_{w-1}$ using one or more PDCCH DCI Formats, and if the wireless device has stopped transmitting during or before subframe/slot/mini-slot/TTI $n_{k1}$, $k1 \in \{0,1, \ldots w-2\}$, and if the channel is sensed by the wireless device to be continuously idle after the wireless device has stopped transmitting, the wireless device may transmit in a later subframe/slot/mini-slot/TTI $n_{k2}$, $k2 \in \{1, \ldots w-1\}$ using a second Type channel access procedure. If the channel sensed by the wireless device is not continuously idle after the wireless device has stopped transmitting, the wireless device may transmit in a later subframe/slot/mini-slot/TTI $n_{k2}$, $k2 \in \{1, \ldots w-1\}$ using a first Type channel access procedure with the UL channel access priority class indicated in the DCI corresponding to subframe/slot/mini-slot/TTI $n_{k2}$.

In an example, if the wireless device receives an UL grant and the DCI indicates a PUSCH transmission starting in subframe/slot/mini-slot/TTI n using s first Type channel access procedure, and if the wireless device has an ongoing first Type channel access procedure before subframe/slot/mini-slot/TTI n: if a UL channel access priority class value pi used for the ongoing first Type channel access procedure is same or larger than the UL channel access priority class value $P_2$ indicated in the DCI, the wireless device may transmit the PUSCH transmission in response to the UL grant by accessing the carrier by using the ongoing first Type channel access procedure.

In an example, if the wireless device receives an UL grant and the DCI indicates a PUSCH transmission starting in subframe/slot/mini-slot/TTI n using s first Type channel access procedure, and if the wireless device has an ongoing first Type channel access procedure before subframe/slot/mini-slot/TTI n: if the UL channel access priority class value p, used for the ongoing first Type channel access procedure is smaller than the UL channel access priority class value $ep_2$ indicated in the DCI, the wireless device may terminate the ongoing channel access procedure.

In an example, if the wireless device is scheduled to transmit on a set of carriers C in subframe/slot/mini-slot/TTI n, and if the UL grants scheduling PUSCH transmissions on the set of carriers C indicate a first Type channel access procedure, and if the same PUSCH starting position is indicated for all carriers in the set of carriers C, or if the wireless device intends to perform an autonomous uplink transmission on the set of carriers C in subframe/slot/mini-slot/TTI n with first Type channel access procedure, and if the same $N_{Start}^{FS3}$ is used for all carriers in the set of carriers C: the wireless device may transmit on carrier $c_i \in C$ using a second Type channel access procedure, if the second Type channel access procedure is performed on carrier $c_i$ immediately before the wireless device transmission on carrier $c_j \in C$, $i \neq j$, and if the wireless device has accessed carrier $c_j$ using first Type channel access procedure, where carrier $c_j$ is selected by the wireless device uniformly randomly from the set of carriers C before performing the first Type channel access procedure on any carrier in the set of carriers C.

In an example, if the wireless device is scheduled to transmit on carrier $c_i$ by a UL grant received on carrier $c_j$, $i \neq j$, and if the wireless device is transmitting using autonomous UL on carrier $c_i$, the wireless device may terminate the ongoing PUSCH transmissions using the autonomous UL at least one subframe/slot/mini-slot/TTI before the UL transmission according to the received UL grant.

In an example, if the wireless device is scheduled by a UL grant received on a carrier to transmit a PUSCH transmission(s) starting from subframe/slot/mini-slot/TTI n on the same carrier using first Type channel access procedure and if at least for the first scheduled subframe/slot/mini-slot/TTI occupies $N_{RB}^{UL}$ resource blocks and the indicated 'PUSCH starting position is OFDM symbol zero, and if the wireless device starts autonomous UL transmissions before subframe/slot/mini-slot/TTI n using first Type channel access procedure on the same carrier, the wireless device may transmit UL transmission(s) according to the received UL grant from subframe/slot/mini-slot/TTI n without a gap, if the priority class value of the performed channel access procedure is larger than or equal to priority class value indicated in the UL grant, and the autonomous UL transmission in the subframe/slot/mini-slot/TTI preceding subframe/slot/mini-slot/TTI n may end at the last OFDM symbol of the subframe/slot/mini-slot/TTI regardless of the higher layer parameter AulEndingPosition. The sum of the lengths of the autonomous UL transmission(s) and the scheduled UL transmission(s) may not exceed the maximum channel occupancy time corresponding to the priority class value used to perform the autonomous uplink channel access procedure. Otherwise, the wireless device may terminate the ongoing autonomous UL transmission at least one subframe/slot/mini-slot/TTI before the start of the UL transmission according to the received UL grant on the same carrier.

In an example, a base station may indicate a second Type channel access procedure in the DCI of an UL grant scheduling transmission(s) including PUSCH on a carrier in subframe/slot/mini-slot/TTI n when the base station has transmitted on the carrier according to a channel access procedure, or when a base station may indicate using the 'UL duration and offset' field that the wireless device may perform a second Type channel access procedure for transmissions(s) including PUSCH on a carrier in subframe/slot/mini-slot/TTI n when the base station has transmitted on the carrier according to a channel access procedure, or when a base station may indicate using the 'UL duration and offset' field and 'COT sharing indication for AUL' field that a wireless device configured with autonomous UL may perform a second Type channel access procedure for autonomous UL transmissions(s) including PUSCH on a carrier in subframe/slot/mini-slot/TTI n when the base station has transmitted on the carrier according to a channel access procedure and acquired the channel using the largest priority class value and the base station transmission includes PDSCH, or when or when a base station may schedule transmissions including PUSCH on a carrier in subframe/slot/mini-slot/TTI n, that follows a transmission by the base station on that carrier with a duration of $T_{short\_ul}$=25 us, if subframe/slot/mini-slot/TTI n occurs within the time interval starting at $t_0$ and ending at $t_0+T_{CO}$, where $T_{CO}=T_{m\_cot,p}+T_g$, where $t_0$ may be the time instant when the base station has started transmission, $T_{m\_cot,p}$ value may be determined by the base station, $T_g$ may be total duration of all gaps of duration greater than 25 us that occur between the DL transmission of the base station and UL transmissions scheduled by the base station, and between any two UL transmissions scheduled by the base station starting from $t_0$.

In an example, the base station may schedule UL transmissions between $t_0$ and $t_0+T_{CO}$ in contiguous subframes/slots/mini-slots/TTIs if they can be scheduled contiguously.

In an example, for an UL transmission on a carrier that follows a transmission by the base station on that carrier within a duration of $T_{short\_ul}$=25 us, the wireless device may use a second Type channel access procedure for the UL transmission.

In an example, if the base station indicates second Type channel access procedure for the wireless device in the DCI, the base station may indicate the channel access priority class used to obtain access to the channel in the DCI.

In an example, the wireless device may transmit the transmission using first Type channel access procedure after first sensing the channel to be idle during the slot durations of a defer duration $T_d$; and after the counter N is zero in step 4. In an example, the counter N may be adjusted by sensing the channel for additional slot duration(s) according to a procedure.

In an example, if the wireless device has not transmitted a transmission including PUSCH or SRS on a carrier on which unlicensed Scell(s) transmission(s) are performed, the wireless device may transmit a transmission including PUSCH or SRS on the carrier, if the channel is sensed to be idle at least in a slot duration $T_{sl}$ when the wireless device is ready to transmit the transmission including PUSCH or SRS, and if the channel has been sensed to be idle during all the slot durations of a defer duration $T_d$ immediately before the transmission including PUSCH or SRS. If the channel has not been sensed to be idle in a slot duration $T_{sl}$ when the wireless device first senses the channel after it is ready to transmit, or if the channel has not been sensed to be idle during any of the slot durations of a defer duration $T_d$ immediately before the intended transmission including PUSCH or SRS, the wireless device may proceeds to step 1 after sensing the channel to be idle during the slot durations of a defer duration $T_d$.

In an example, the defer duration $T_d$ may consist of duration $T_f$=16 us immediately followed by $m_p$ consecutive slot durations where each slot duration is $T_{sl}$=9 us, and $T_f$ may include an idle slot duration $T_{sl}$ at start of $T_f$.

In an example, a slot duration $T_{sl}$ may be considered to be idle if the wireless device senses the channel during the slot duration, and the power detected by the wireless device for at least 4 us within the slot duration is less than energy detection threshold $X_{Thresh}$. Otherwise, the slot duration $T_{sl}$ may be considered to be busy.

In an example, $CW_{min,p} \leq CW_p \leq CW_{max,p}$ may be the contention window. In an example, $CW_{min,p}$ and $CW_{max,p}$ may be chosen before the channel access procedure. In an example, $m_p$, $CW_{min,p}$, and $CW_{max,p}$ may be based on channel access priority class signaled to the wireless device, as shown in FIG. 16.

In an example, if the UL wireless device uses second Type channel access procedure for a transmission including PUSCH, the wireless device may transmit the transmission including PUSCH immediately after sensing the channel to be idle for at least a sensing interval $T_{short\_ul}$=25 us. In an example, $T_{short\_ul}$ may consists of a duration $T_f$=16 us immediately followed by one slot duration $T_{sl}$=9 us and $T_f$ may include an idle slot duration $T_{sl}$ at start of $T_f$. The channel may be considered to be idle for $T_{short\_ul}$ if it is sensed to be idle during the slot durations of $T_{short\_ul}$.

In an example, if the wireless device transmits transmissions using a first Type channel access procedure that are associated with channel access priority class p on a carrier, the wireless device may maintain the contention window value $CW_p$ and may adjust $CW_p$ for those transmissions before the channel access procedure.

In an example, if the wireless device receives an UL grant or an AUL-DFI, the contention window size for the priority classes may be adjusted as following:

if the NDI value for at least one HARQ process associated with HARQ_ID_ref is toggled, or if the HARQ-ACK value(s) for at least one of the HARQ processes associated with HARQ_ID_ref received in the earliest AUL-DFI after $n_{ref}$+3 indicates ACK: for every priority class $p \in \{1,2,3,4\}$ set $CW_p=CW_{min,p}$. Otherwise, $CW_p$ may be increased for every priority class $p \in \{1,2,3,4\}$ to the next higher allowed value.

In an example, if there exist one or more previous transmissions $\{T_0, \ldots, T_n\}$ using the first Type channel access procedure, from the start subframe(s)/slot(s)/mini-slot(s)/TTI(s) of the previous transmission(s) of which, N or more subframes/slots/mini-slots/TTIs have elapsed and neither UL grant nor AUL-DFI was received, where N=max (Contention Window Size adjustment timer X, $T_i$ burst length+1) if X>0 and N=0 otherwise, for each transmission $T_i$, $CW_p$ is adjusted as following:

increase $CW_p$ for every priority class $p \in \{1,2,3,4\}$ to the next higher allowed value; The $CW_p$ is adjusted once. Otherwise if the wireless device transmits transmissions using first Type channel access procedure before N subframes/slots/mini-slots/TTIs have elapsed from the start of previous UL transmission burst using first Type channel access procedure and neither UL grant nor AUL-DFI is received, the $CW_p$ is unchanged.

In an example, if the wireless device receives an UL grant or an AUL-DFI indicates feedback for one or more previous transmissions $\{T_0, \ldots, T_n\}$ using first Type channel access procedure, from the start subframe(s)/slot(s)/mini-slot(s)/TTI(s) of the previous transmission(s) of which, N or more subframes/slots/mini-slots/TTIs have elapsed and neither UL grant nor AUL-DFI was received, where N=max (Contention Window Size adjustment timer X, $T_t$ burst length+1) if X>0 and N=0 otherwise, the wireless device may recomputed $CW_p$ as follows: the wireless device reverts $CW_p$ to the value used to transmit at $n_{T0}$ using first Type channel access procedure; the wireless device updates $CW_p$ sequentially in the order of the transmission $\{T_0, \ldots, T_n\}$. If the NDI value for at least one HARQ process associated with HARQ_ID_ref is toggled, or if the HARQ-ACK value(s) for at least one of the HARQ processes associated with HARQ_ID_ref received in the earliest AUL-DFI after $n_{Ti}+3$ indicates ACK. For every priority class $p \in \{1,2,3,4\}$ set $CW_p = CW_{min, p}$. Otherwise, increase $CW_p$ for every priority class $p \in \{1,2,3,4\}$ to the next higher allowed value.

If the wireless device transmits transmissions using first Type channel access procedure before N subframes/slots/mini-slots/TTIs have elapsed from the start of previous UL transmission burst using first Type channel access procedure and neither UL grant nor AUL-DFI is received, the $CW_p$ may be unchanged.

In an example, the HARQ_ID_ref may be the HARQ process ID of UL-SCH in reference subframe/slot/mini-slot/TTI $n_{ref}$. The reference subframe/slot/mini-slot/TTI $n_{ref}$ may be determined as follows: If the wireless device receives an UL grant or an AUL-DFI in subframe/slot/mini-slot/TTI $n_g$, subframe/slot/mini-slot/TTI $n_w$ may be the most recent subframe/slot/mini-slot/TTI before subframe/slot/mini-slot/TTI $n_g-3$ in which the wireless device has transmitted UL-SCH using first Type channel access procedure. In an example, if the wireless device transmits transmissions including UL-SCH without gaps starting with subframe/slot/mini-slot/TTI $n_0$ and in subframes/slots/mini-slots/TTIs $n_0, n_1, \ldots, n_w$ and the UL-SCH in subframe/slot/mini-slot/TTI $n_0$ is not PUSCH Mode 1 that starts in the second slot of the subframe/slot/mini-slot/TTI, reference subframe/slot/mini-slot/TTI $n_{ref}$ may be subframe/slot/mini-slot/TTI $n_0$. In an example, if the wireless device transmits transmissions including a first PUSCH Mode without gaps starting with second slot of subframe/slot/mini-slot/TTI $n_0$ and in subframe/slot/mini-slot/TTI $n_0, n_1, \ldots, n_w$ and the, reference subframe/slot/mini-slot/TTI $n_{ref}$ is subframe/slot/mini-slot/TTI $n_0$ and $n_1$, otherwise, reference subframe/slot/mini-slot/TTI $n_{ref}$ may be subframe/slot/mini-slot/TTI $n_w$.

In an example, HARQ_ID_ref may be the HARQ process ID of UL-SCH in reference subframe/slot/mini-slot/TTI $n_{Ti}$. The reference subframe/slot/mini-slot/TTI $n_{Ti}$ may be determined as the start subframe/slot/mini-slot/TTI of a transmission $T_t$ using a first Type channel access procedure and of which, N subframes/slots/mini-slots/TTIs have elapsed and neither UL grant nor AUL-DFI was received.

In an example, if the AUL-DFI with a first DCI format is indicated to a wireless device that is activated with AUL transmission and a second transmission mode is configured for the wireless device for grant-based uplink transmissions, the spatial HARQ-ACK bundling may be performed by logical OR operation across multiple codewords for the HARQ process not configured for autonomous UL transmission.

In an example, if $CW_p$ changes during an ongoing channel access procedure, the wireless device may draw a counter $N_{init}$ and applies it to the ongoing channel access procedure.

In an example, the wireless device may keep the value of $CW_p$ unchanged for every priority class $p \in \{1,2,3,4\}$, if the wireless device scheduled to transmit transmissions without gaps including PUSCH in a set of subframes/slots/mini-slots/TTIs $n_0, n_1, \ldots, n_{w-1}$ using a first Type channel access procedure, and if the wireless device is not able to transmit any transmission including PUSCH in the set of subframes/slots/mini-slots/TTIs.

In an example, the wireless device may keep the value of $CW_p$ for every priority class $p \in \{1,2,3,4\}$ the same as that for the last scheduled transmission including PUSCH using first Type channel access procedure, if the reference subframe/slot/mini-slot/TTI for the last scheduled transmission is also $n_{ref}$.

In an example, if $CW_p = CW_{max, p}$, the next higher allowed value for adjusting $CW_p$ is $CW_{max,p}$.

In an example, if the $CW_p = CW_{max,p}$ is consecutively used K times for generation of $N_{init}, CW_p$ may be reset to $CW_{min, p}$ for that priority class p for which $CW_p = CW_{max, p}$ is consecutively used K times for generation of $N_{init}$. In an example, K may be selected by wireless device from the set of values $\{1, 2, \ldots, 8\}$ for a priority class $p \in \{1,2,3,4\}$.

In an example, a wireless device accessing a carrier on which LAA Scell(s) transmission(s) are performed, may set the energy detection threshold ($X_{Thresh}$) to be less than or equal to the maximum energy detection threshold $X_{Thresh\_max}$.

In an example, if the wireless device is configured with higher layer parameter maxEnergyDetectionThreshold, $X_{Thresh\_max}$ may be set equal to the value signaled by the higher layer parameter. Otherwise, the wireless device may determine $X'_{Thresh\_max}$ according to a first procedure for determining energy detection threshold. In an example, if the wireless device is configured with higher layer parameter energyDetectionThresholdOffset, $X_{Thresh\_max}$ may be set by adjusting $X'_{Thresh\_max}$ according to the offset value signaled by the higher layer parameter. Otherwise, the wireless device may set $X_{Thresh\_max} = X'_{Thresh\_max}$.

In an example, the first procedure for determining the energy detection threshold may be as follows: if the higher layer parameter absenceOfAnyOtherTechnology indicates TRUE, $$X'_{Thresh\_max} = \min\left\{\begin{array}{c} T_{max} \\ X_r \end{array}\right\} \text{ where } X_r$$

is Maximum energy detection threshold defined by regulatory requirements in dBm when such requirements are defined, otherwise $X_r = T_{max} + 10$ dB. Otherwise, $$X'max\left\{\begin{array}{l} -72 + 10 \cdot \log 10(BW\text{MHz}/20\text{MHz}) \rightleftarrows \text{dBm}, \\ \min\left\{\begin{array}{l} T_{max}, \\ TA(P_H + 10 \cdot \\ \log 10(BW\text{MHz}/20\text{MHz}) \rightleftarrows -P_{TX})_{max} \end{array}\right\} \end{array}\right\}_{Thres\_max},$$

where $T_A = 10$ dB, $P_H = 23$ dBm; $P_{TX}$ may be the set to the value of PCMAX_H,c; TdBm log 1 $(3.16228 \cdot 10^{-8}$(mW/MHz)·BWMHz (MHz)$)_{max}$; BWMHz may be the single carrier bandwidth in MHz.

The frame structure of new radio (NR) in unlicensed spectrum (NR-U) may be an important feature for fair coexistence with other RATs (e.g., LTE and WLAN) and for performance of NR-U in terms of, for example, spectrum efficiency, reliability, and latency. To have a simplified and unified system, the frame structure of NR-U may inherit features of NR in licensed spectrum.

In an example, maximum channel occupancy time (MCOT) or channel occupancy time (COT) is defined in ETSI BRAN regulation as a total time that a wireless device may make use of an operating channel in an unlicensed band, after which the wireless device may perform a new extended CCA (for example, LBT CAT4) to continue using the operating channel. The concept of MCOT (also known as transmission opportunity period (TXOP) in IEEE) is further extended in 3GPP eLAA and IEEE 802.11 HCCA to enable bi-directional transmission between an eNB (AP) and a wireless device (STA) without performing an LBT CAT4 in MCOT. In an example, as MCOT may start at any time with variable duration, the frame structure design for NR-U may be flexible and efficient enough to make use of MCOT.

Figure 18:
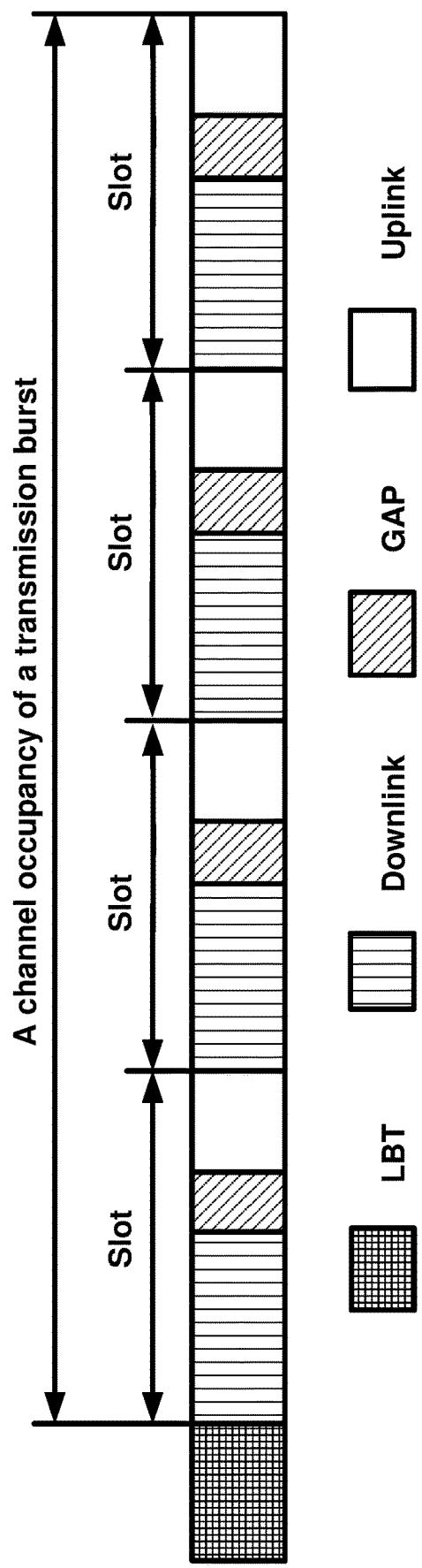
FIG. 18 is a diagram of an example maximum channel occupancy time (MCOT) with self-contained slots as per an aspect of an embodiment of the present disclosure.

In NR licensed spectrum, a self-contained slot with a bi-directional structure (e.g., a structure with downlink resources and uplink resources as shown in FIG. 18) is supported. Therefore, a bi-directional slot transmission may also be supported in NR-U. Different slot configurations may be configured for different scenarios. It may provide more flexibility to construct a bi-directional MCOT structure, which may include bi-directional transmission for one or more slots in the MCOT structure. In an example, and as shown in FIG. 18, an MCOT may comprise several bi-directional slots (e.g., 4 bi-directional slots). A bi-directional slot may comprise downlink symbols/resources, uplink symbols/resources, and/or a gap duration. In an example, the gap duration may comprise a guard period from downlink receiving to uplink transmission. The bi-directional slots may allow for multiple DL/UL switching points within the MCOT of NR-U. The multiple DL/UL switching points within the MCOT may allow for fast and simplified procedures of scheduling and feedback in unlicensed spectrum, including fast link adaptation and reduced number of HARQ processes. The multiple DL/UL switching points within the MCOT of NR-U may also allow for more efficient resource utilization in unlicensed spectrum.

In an example, NR may be designed to provide a wide variety of services by rendering waveform parameters flexibly. Flexibilities introduced to the waveform may enable reduced latencies and improve system reliability. In an example, the flexibility may be provided by coexisting of different numerologies, in which each numerology consists of a set of parameters defining the frame and lattice structure of the waveform. In contrast to the single numerology utilization in LTE, NR may allow simultaneous multiple numerologies utilization.

In an example, waveform may define how the resources are placed in a time-frequency lattice and structure. In downlink, NR may use CP-OFDM with multiple numerologies with a mother waveform plus its derivatives. The mother waveform is the same as in LTE, but there may be only one numerology. In uplink, there is an option to use either of CP-OFDM and DFT-s-OFDM with multiple numerologies for NR. In LTE, the only option may be DFT-s-OFDM with a single numerology.

Figure 19:
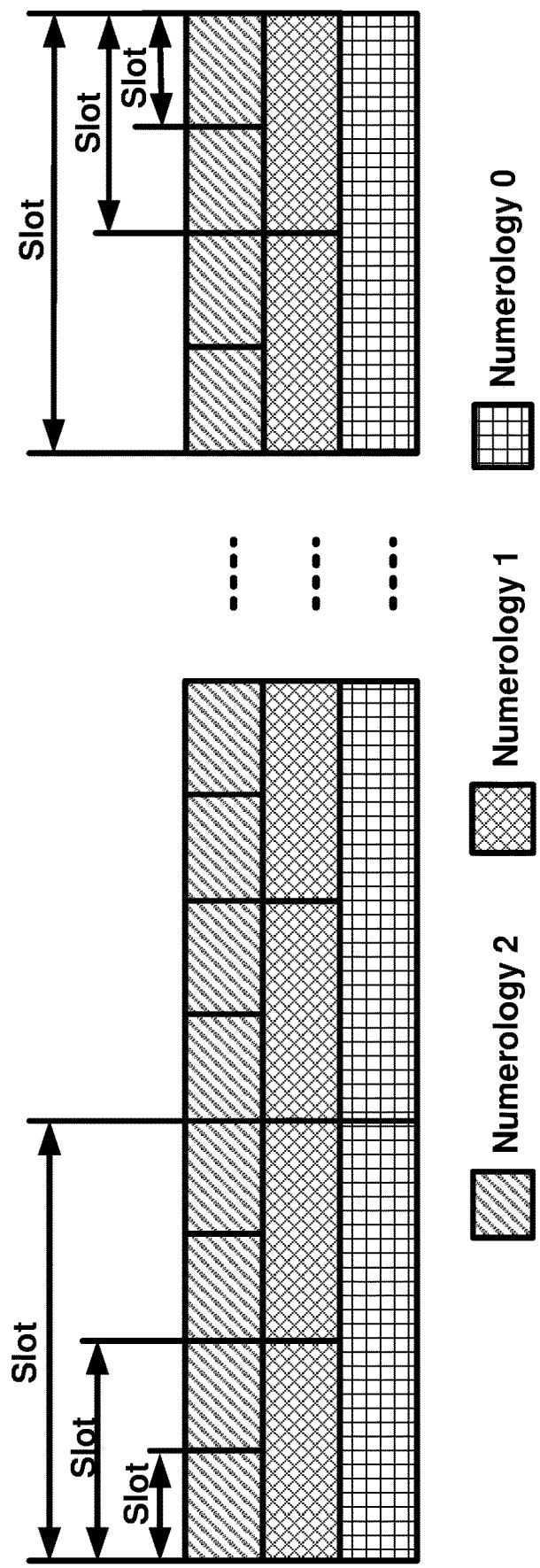
FIG. 19 is a diagram of an example slots transmission with different numerologies as per an aspect of an embodiment of the present disclosure.

In an example, the time-frequency lattice may be the grid of discrete resources in a continuous time-frequency plane which may define where/when information be transmitted. LTE may use a fixed lattice in which the frequency spacing between each point may be the same throughout the whole transmission band. NR may define flexible time-frequency lattice enabling multiple numerologies structure. In an example, as shown in FIG. 19, downlink data transmission can be performed with three numerologies (e.g., numerology 0, numerology 1 and numerology 2). Different numerologies may have difference sub-carrier spacing and have different slot length in time domain. In FIG. 19, numerology 0 may have the smallest sub-carrier spacing with longest slot length. Numerology 1 may have the second large sub-carrier spacing with a second short slot length. Numerology 2 may have the largest sub-carrier spacing with shortest slot length. In an example, different numerologies may be applied in different sub-bands/BWPs. Transport block transmission with different numerologies may be performed at the same time on different sub-bands/BWPs in downlink.

In an example, a BWP may be a new term in NR that defines a fixed band over which a communication taking place may use the same numerology throughout the existence of the BWP. It may be a bridge between the numerology and scheduling mechanisms. BWPs may be controlled at the gNB based on the wireless device needs and network requirements. In contrast to LTE, wireless devices in NR may need not monitor the whole transmission bandwidth. They may only scan the BWPs assigned to themselves. BWPs may allow wireless devices to process only part of the band that contain their symbols, reducing power consumption and enabling longer battery lives. BWP may be a useful tool for multiple numerologies systems as BWP defines a specific numerology. The gNB may modify wireless device numerologies by changing its BWPs. There may be up to four configured BWPs for each wireless device, but there is only one active BWP for each wireless device in current standard. In future, multiple active BWPs may be applied for each wireless device.

In LTE-LAA system, when an eNB transmits transmissions including PDSCH that are associated with a channel access priority class on a carrier, the eNB may maintain a contention window value and adjust contention window value for LBT based on HARQ-ACK values corresponding to PDSCH transmission(s) in a reference subframe. The reference subframe may be the starting subframe of the most recent transmission on the carrier made by the eNB, for which at least some HARQ-ACK feedback is expected to be available. The eNB may adjust the value of the contention window for every priority class based on the given reference subframe only once.

In an example, implementation of existing reference subframe determining scheme for LBT contention window adjustment for a NR-U system may result in inefficient and unreliable contention window adjustment mechanism. Different numerologies with different length of a slot may be used in NR-U as discussed and as shown in FIG. 19. In an example, flexible slot format combinations may be implemented in NR-U. Implementation of existing reference subframe determination for NR-U may result in indeterministic contention window (CW) determination, for example, due to insufficient available acknowledgement required for a reliable CW determination. In an example, if a numerology with a large sub-carrier spacing is used in NR-U, the time length of the starting slot may be shorter than one millisecond (e.g., 0.0625 ms when sub-carrier spacing is 240 kHz) which may not be enough for a reference duration. If existing mechanisms for CW determination are implemented for NR-U systems there may not be enough ACK/NACK and/or new data indicator (NDI) available for CW determination.

In an example, a base station may configure a self-contained slot structure for data transmission. The LTE-LAA based reference subframe determining scheme may not be applicable in the self-contained slot structure with flexible numerologies in NR. Self-contained slots may be used in NR-U as discussed and as shown in FIG. 18. When the starting reference slot comprise more uplink resources, the base station may not obtain a reliable percentage calculation for HARQ-ACK feedback with the starting reference slot for downlink transmission. For uplink transmission, when the starting reference slot comprise more downlink resources, a wireless device may not obtain a reliable channel state estimation based on a reception of new data indicator (NDI) values for less uplink resources in the starting reference slot. Existing reference slot determining scheme may not efficiently support the contention window adjustment in NR-U cases when considering new features (e.g., multiple numerologies, self-contained slots, and/or the like) used in NR.

Embodiments of the present disclosure may provide enhanced reference duration (e.g., referred as reference duration in all the embodiments) determining scheme for NR-U when considering new features used in NR. In an example, a reference duration for contention window adjustment is from a beginning of a channel occupancy of a transmission burst and until an end of a first slot where at least one physical downlink shared channel (PDSCH) is transmitted. The reference duration may be determined based on different numerologies and/or self-contained slot structure in NR. Embodiments of the present disclosure may further enhance flexibility of the reference duration determining based on the new features in NR. Example embodiments may improve the reliability of CW adjustment mechanism in NR.

Figure 20:
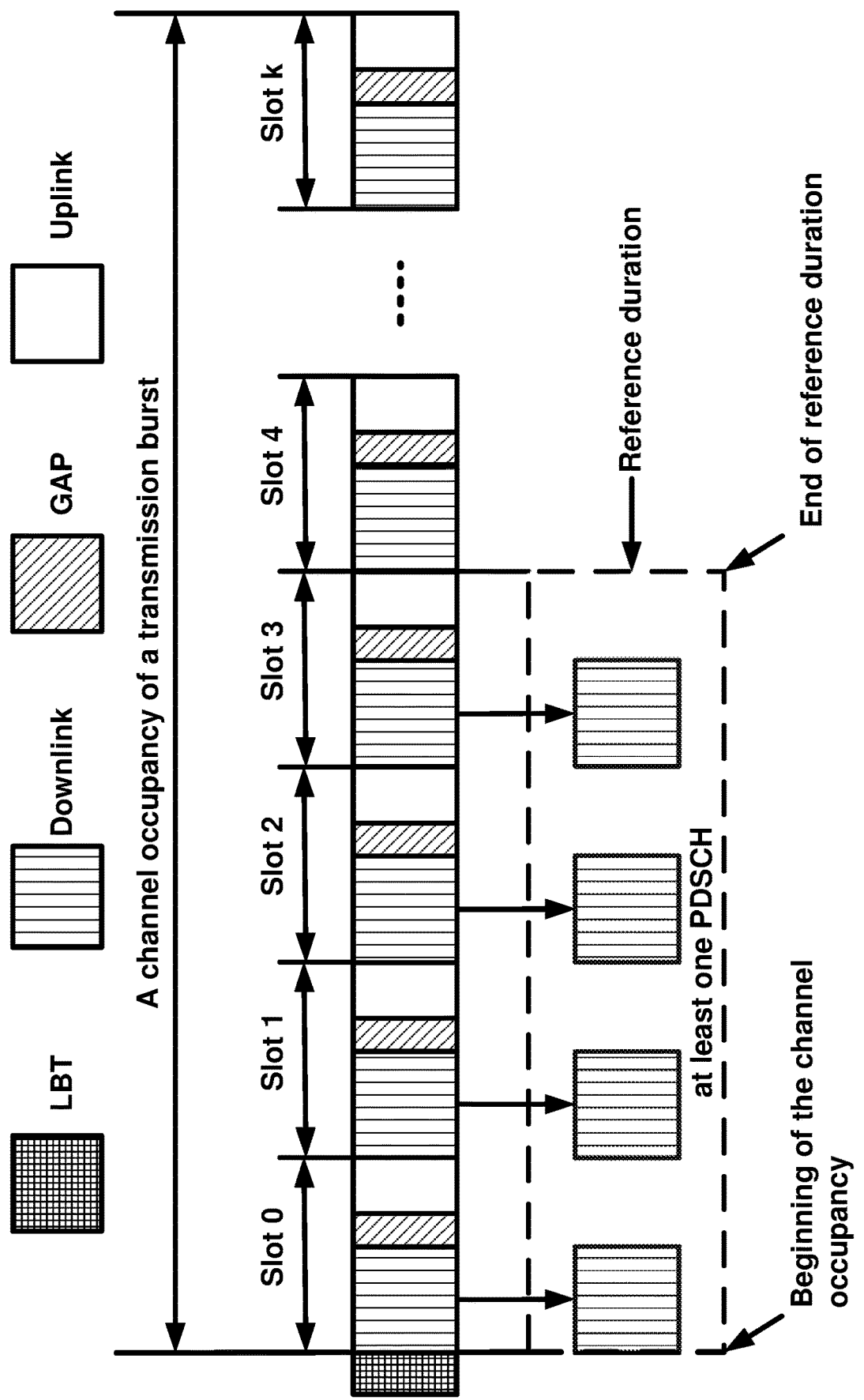
FIG. 20 is a diagram of an example downlink and uplink transmission with same numerology as per an aspect of an embodiment of the present disclosure.

FIG. 20 illustrates downlink and uplink transmission with a same numerology in accordance with embodiments of the present disclosure. As shown in FIG. 20, a plurality of slots with self-contained downlink and uplink resources, each associated with a respective index 0, 1, 2, . . . , k, may be transmitted in a transmission burst for NR-U (e.g. during an MCOT). In an example, k may be a positive integer. The plurality of the slots may be a recent transmission before a gNB performs a first LBT CAT4. Before transmission of the plurality of slots, the gNB may perform a second LBT CAT4 and the output of the second LBT CAT4 may indicate an idle channel.

In an example, in the plurality of slots with index 0, 1, 2, . . . , k, the slot formats of the plurality slots may be same or different, which may depend on the gNB configuration/implementation. A slot format combination may indicate slot formats of the plurality of slots. Each of the plurality of slots may be configured with a slot format. The gNB may transmit the slot format combination to a wireless device to indicate the slot formats of the plurality of slots. A slot format of a slot may indicate a first number of OFDM symbols for a downlink transmission; a second number of OFDM symbols for an uplink transmission; and/or a third number of OFDM symbols for a flexible transmission. A length of the slot format combination in time domain may be equal to the length of an MCOT in terms of OFDM symbols. In an example, the slot format combination for NR-U may be different from a slot format combination defined for licensed carriers. In an example, the slot format combination for NR-U may be predefined based on a slot format for a licensed carrier. In an example, the slot format combination for NR-U may aggregate several slots with a slot format for a licensed carrier.

In an example, the gNB may select and aggregate a slot format to form a slot format combination based on channel conditions and/or an interference environment on an unlicensed carrier. In an example, the gNB may select and aggregate two or more different slot formats to form the slot format combination based on channel conditions and/or the interference environment on the unlicensed carrier. The slot format combination for NR-U may be different from a slot format combination defined for licensed carriers. Based on the slot format combination and a numerology of the plurality of slots, the gNB may determine slot formats of the plurality of slots. The gNB may determine downlink resources configuration of each slot and length in time domain (e.g., in terms of OFDM symbols) associated with the downlink resources.

In an example, as shown in FIG. 20, the gNB may determine a reference duration before performing an LBT CAT4. Based on a numerology and a slot format combination, the gNB may determine downlink resources and a corresponding length in time domain for the downlink resources of each slot. A base station may determine the reference duration for contention window adjustment being used by the LBT CAT4. The reference duration may be from a beginning of a channel occupancy of a transmission burst and until an end of a first slot where at least one physical downlink shared channel (PDSCH) is transmitted. In an example PDSCH is transmitted over all the resources allocated for the PDSCH. In an example, the reference duration may end at the first slot: where the at least one PDSCH is transmitted, and for which one or more acknowledgement feedbacks are available for the at least one PDSCH. The base station may consider (for reference duration determination) PDSCH for which one or more acknowledgement feedbacks (ACK and/or NACK) are available. The beginning of the channel occupancy may be based on when a listen before talk (LBT) procedure indicates a clear channel (e.g. as shown in FIG. 20). The PDSCH may be a wireless specific PDSCH addressed to a wireless device.

In an example, the gNB may determine a reference duration threshold indicating a number of the at least one PDSCH transmitted. The reference duration threshold may be calculated based on the numerology. In an example, the reference duration threshold may be equal to $\alpha \cdot \frac{1}{2}^\mu$ ms. In an example, $\alpha$ may be a scale factor and determined via the gNB implementation/configuration (e.g., $\alpha$ may be 0.2, 0.5, 1, 2, and/or the like). In an example, $\mu$ may be a numerology index associated with the numerology. The numerology may be defined with a sub-carrier spacing and a cyclic prefix in transmission. In an example, $\mu$ may be 0, 1, 2, 3 or 4, which may depend on the gNB configuration/implementation.

In an example, the gNB may determine a number of slots from the plurality of slots of the transmission burst, where a duration of an aggregated number of downlink resources (e.g. PDSCH) in the number of slots is equal to or greater than the reference duration threshold. For example, if the reference duration threshold is 3, the at least one PDSCH transmitted in the reference duration may comprise three PDSCH. The base station may consider (for reference duration determination) PDSCH for which one or more acknowledgement feedbacks (ACK and/or NACK) are available. In an example, the reference duration may not exceed the duration of the transmission burst. In an example, the reference duration may be until the end of the transmission burst that contains at least one PDSCH transmitted.

In an example, in response to the determining, the gNB may form the number of slots into a reference duration. In an example, the number of slots may be contiguous. In an example, the number of slots may be non-contiguous. In an example, the aggregated number of downlink resources may comprise PDSCH resources (e.g., one or more acknowledgement feedbacks corresponding to the PDSCH resources may be available for the gNB). The reference duration may span the first number of slots of the plurality of slots. If one or more slots of the plurality of slots being without PDSCH (e.g., acknowledgement feedbacks corresponding to one or more slots may be unavailable for the gNB), the number of slots, formed into the reference duration, may comprise the one or more slots. If one or more slots of the plurality of slots being without PDSCH, the aggregated number of downlink resources may not comprise downlink resources of the one or more slots of the plurality of slots.

In an example, as shown in FIG. 20, the gNB may determine that a duration of four slots (e.g., slot 0, 1, 2 and 3 in FIG. 20) of the channel occupancy of the transmission burst comprises the at least one PDSCH downlink resources which is equal to or greater than the reference duration threshold (e.g., $\alpha \cdot \tfrac{1}{2}^{\mu}$ ms). The reference duration may comprise four instances of PDSCH. In one example, the reference duration may be until the end of the channel occupancy for the transmission burs, for example when the at least one PDSCH is in the last slot of the transmission burst. In an example, in response to the determining, the gNB may form the first four slots into a reference duration. In an example, the aggregated number of downlink resources may comprise PDSCH resources. In an example, If one slot of the plurality of slots being configured without PDSCH (e.g., slot 3 being without PDSCH), the number of slots which are formed into the reference duration, may further comprise slot 4 to meet the requirement that the aggregated number of downlink resources (PDSCH) may have a duration equal to or greater than the reference duration threshold (e.g., $\alpha \cdot \tfrac{1}{2}^{\mu}$ ms). In an example, if slot 4 is also configured without PDSCH, the number of slots which are formed into the reference duration may further comprise slot 5 until the aggregated number of downlink resources (PDSCH) may have a duration equal to or greater than the reference duration threshold (e.g., $\alpha \cdot \tfrac{1}{2}^{\mu}$ ms). In an example, the slot with PDSCH resources may comprise PDSCH is transmitted over all the resources allocated for the PDSCH in the slot. In an example, the slot without PDSCH resources may comprise PDSCH is transmitted over a portion of all the resources allocated for the PDSCH in the slot (e.g., punched by the gNB or damaged by interference of other nodes). The same rule may be applied to the following slots (e.g., slot 6, slot 7, etc.) for the gNB to determine the reference duration. In an example, the reference duration may comprise slots from the beginning of the plurality of slots until the end of the first slot with PDSCH resources of the plurality of slots. In an example, if each of the plurality slots is configured without PDSCH resources, the gNB may determine the plurality of slots as the reference duration. If one or more slots of the plurality of slots are configured without PDSCH in the reference duration, the aggregated number of downlink resources may not comprise the downlink resources of the one or more slots of the plurality of slots.

Figure 21:
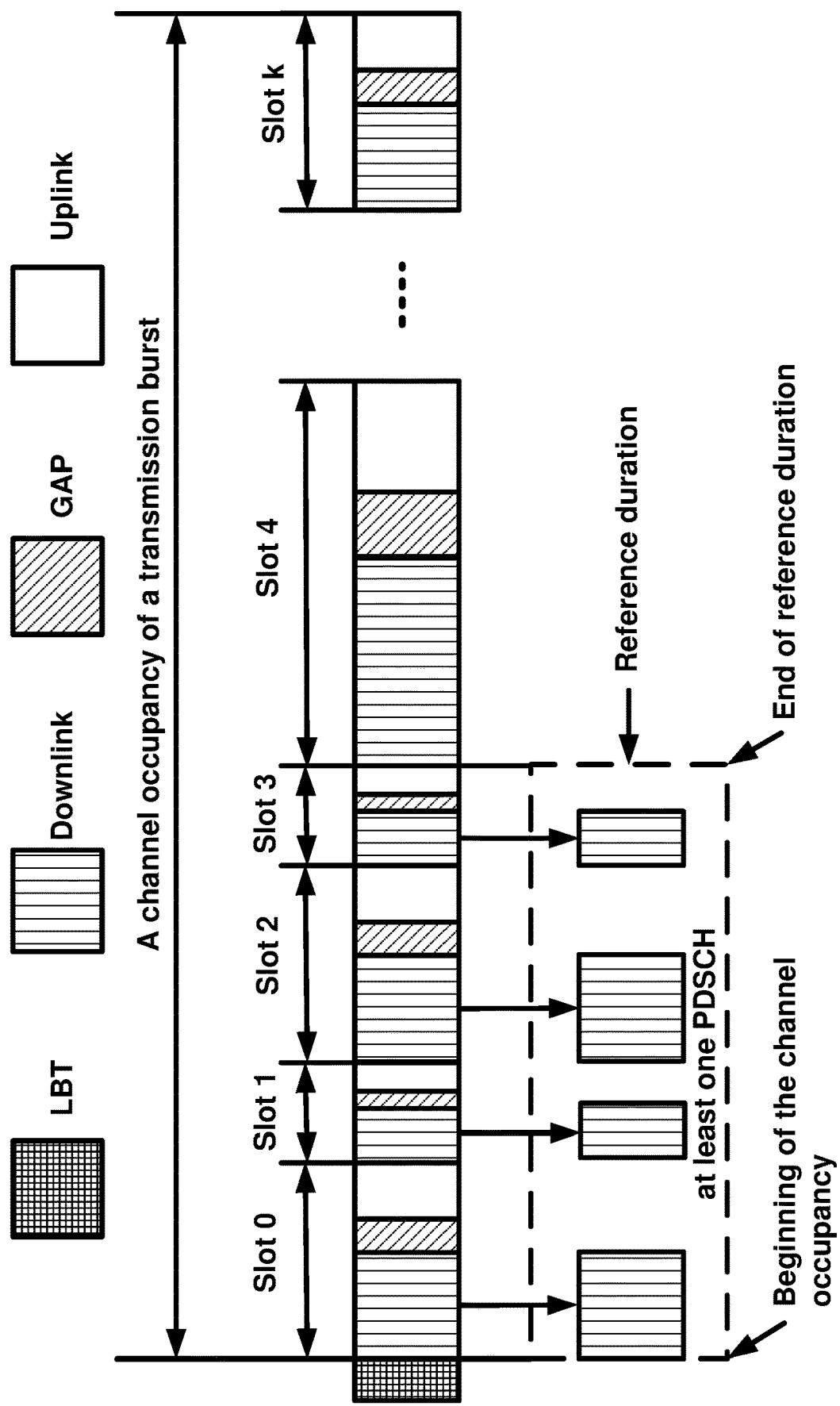
FIG. 21 is a diagram of an example downlink and uplink transmission with different numerologies as per an aspect of an embodiment of the present disclosure.

FIG. 21 illustrates downlink and uplink transmission with different numerologies in accordance with embodiments of the present disclosure. As shown in FIG. 21, a plurality of slots with self-contained downlink and uplink resources, each associated with a respective index 0, 1, 2, . . . , k, may be transmitted in an MCOT/Burst for NR-U. In an example, k may be a positive integer. The plurality of the slots may be a recent transmission before gNB performs a first LBT CAT4. Before transmission of the plurality of slots, the gNB may perform a second LBT CAT4 and the output of the second LBT CAT4 may indicate an idle channel.

In an example, as shown in FIG. 21, the gNB may determine a reference duration before performing an LBT CAT4. Based on a numerology and a slot format combination, the gNB may determine downlink resources and a corresponding length in time domain for the downlink resources of each slot. In an example, the gNB may determine a reference duration threshold. The reference duration threshold may be calculated based on the numerology. The plurality of slots may have multiple numerologies in time domain as shown in FIG. 21. In an example, the reference duration threshold may be equal to $\alpha \cdot \tfrac{1}{2}^{\mu_k}$ ms. In an example, a may be a scale factor and determined via the gNB implementation/configuration (e.g., a may be 0.2, 0.5, 1, 2, and/or the like). In an example, $\mu_k$ may be 0,1,2,3 or 4, which may depend on gNB configuration. In an example, $\mu_k$ may be a numerology index associated with a numerology with minimum sub-carrier spacing among the multiple configured numerologies for the plurality of slots. The numerology may be defined with a sub-carrier spacing and a cyclic prefix in transmission.

As shown in FIG. 21, the gNB may determine that a duration of an aggregated number of downlink resources in first four slots (e.g., slot 0, 1, 2 and 3 in FIG. 21) of the plurality of slots is equal to or greater than the reference duration threshold (e.g., $\alpha \cdot \tfrac{1}{2}^{\mu_k}$ ms). In an example, in response to the determining, the gNB may form the first four slots (e.g., slot0, slot1, slot2 and slot3) into a reference duration. In an example, the aggregated number of downlink resources may comprise PDSCH resources. If one slot of the plurality of slots being configured without PDSCH (e.g., slot 3 being configured without PDSCH), the number of slots which may be formed into the reference duration, may further comprise more slots (e.g., slot 4) to meet the requirement that the aggregated number of downlink resources (PDSCH) may have a duration equal to or greater than the reference duration threshold (e.g., $\alpha \cdot \tfrac{1}{2}^{\mu_k}$ ms). If slot 4 is configured without PDSCH, the number of slots which may be formed into the reference duration may further comprise slot 5 until the aggregated number of downlink resources (PDSCH) may have a duration equal to or greater than the reference duration threshold (e.g., $\alpha \cdot \tfrac{1}{2}^{\mu_k}$ ms). The same rule may be applied to the following slots (e.g., slot 6, slot 7, etc.) for the gNB to determine the reference duration. If one or more slots of the plurality of slots being configured without PDSCH in the reference duration, the aggregated number of downlink resources (e.g., only with PDSCH) may not comprise the downlink resources of the one or more slots of the plurality of slots.

Figure 22:
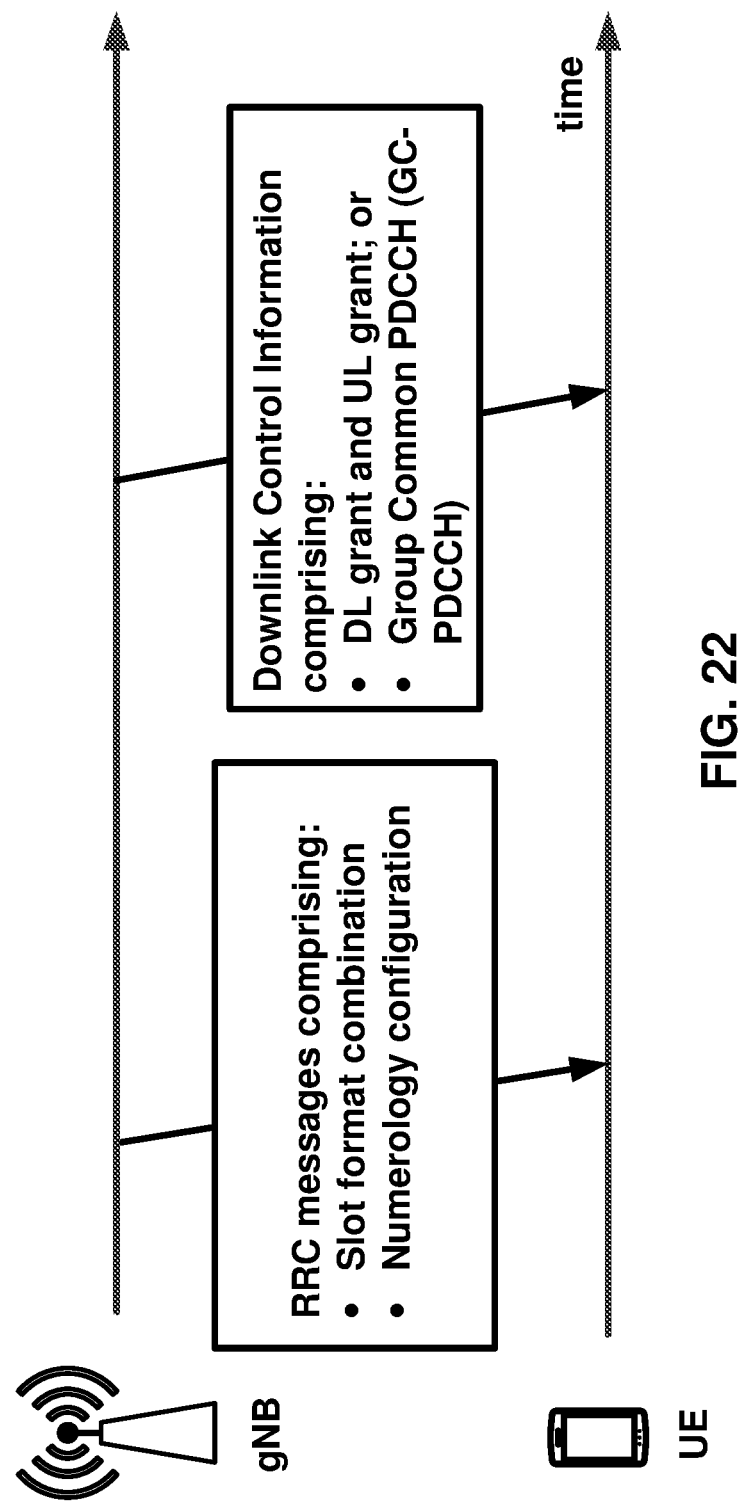
FIG. 22 is a diagram of an example RRC configuration and downlink control information indication as per an aspect of an embodiment of the present disclosure.

FIG. 22 illustrates example transmission/reception of RRC messages and downlink control information in accordance with embodiments of the present disclosure. As shown in FIG. 22, a gNB may transmit RRC messages, comprising slot format combination configuration and numerology configuration, to a wireless device. The gNB may transmit downlink control information (DCI) to the wireless device. The DCI may comprise a downlink grant (or downlink assignment), an uplink grant, and/or control information transmitted in a group common PDCCH. In response to receiving the DCI, the wireless device may determine MCOT\Burst structure based on slot format combination indication in the DCI.

Figure 23:
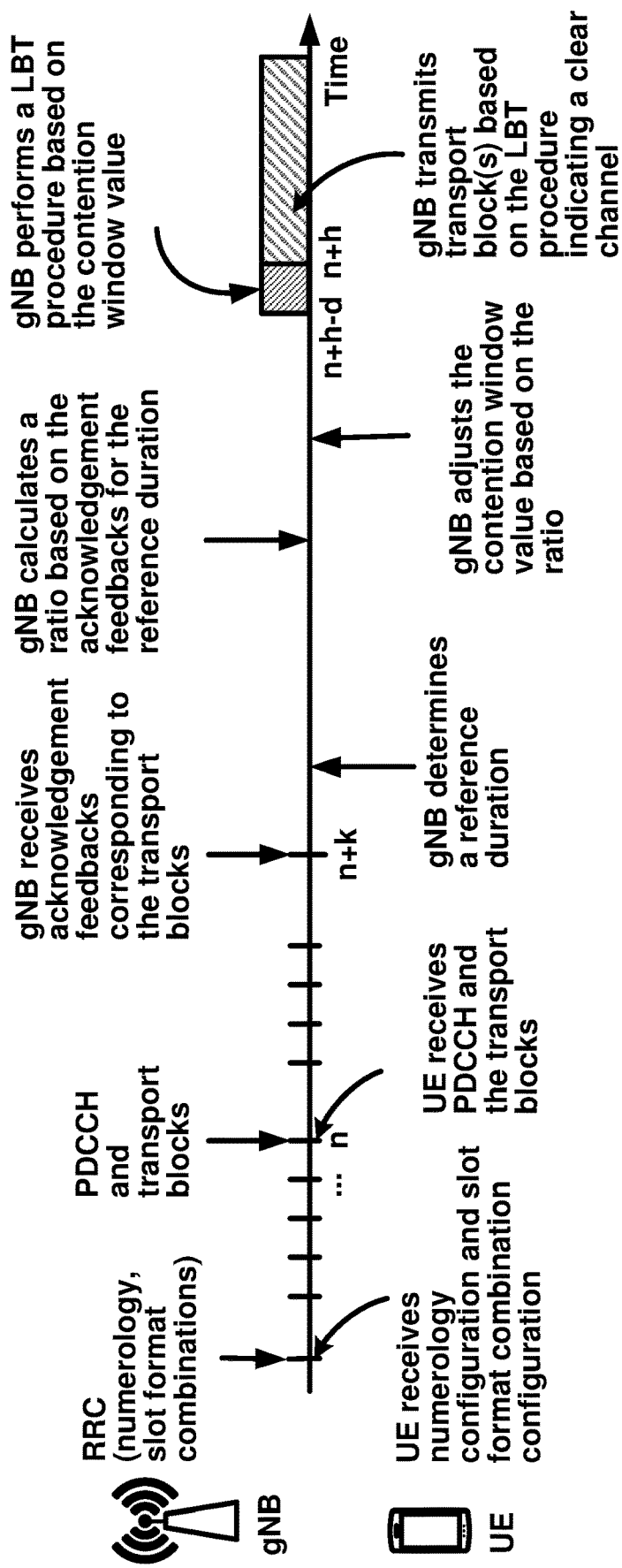
FIG. 23 is a diagram of an example procedure of determining reference duration as per an aspect of an embodiment of the present disclosure.

As shown in FIG. 23, an example timeline of a procedure of a gNB determining a reference duration and performing LBT is illustrated in accordance with embodiments of the present disclosure. As shown in FIG. 23, a gNB may transmit, to a wireless device, one or more RRC messages comprising parameters of a slot format combination, a numerology indication, and BWPs configuration. The gNB may transmit downlink control information, comprising UL grant, DL grant (or downlink assignment) and\or group common PDCCH, to the wireless device (e.g., at slot n). The gNB may transmit a plurality of transport blocks to the wireless device on a plurality of slots (e.g., at slot n).

The gNB may receive HARQ ACK/NACK feedbacks, corresponding to the plurality of the transport blocks, from the wireless device after k slots. In an example, k may be indicated in downlink control information. In an example, k may be determined by the wireless device capability. In an example, k may be determined by the gNB implementation. The gNB may determine a reference duration based on a numerology and a slot format combination as discussed in FIG. 20 and FIG. 21. The gNB may determine a first number of HARQ NACK and a second number of HARQ ACK feedbacks, from the wireless device, corresponding to PDSCH transport blocks transmitted in the reference duration. The gNB may determine a value based on the first number of HARQ NACK and the second number of HARQ ACK feedbacks. In an example, the determining the value may comprise that the gNB may calculate a ratio of the first HARQ NACK to a sum of the second HARQ ACK and the first HARQ NACK feedbacks corresponding to the PDSCH transport blocks transmitted in the reference duration.

In response to the calculating the ratio of the first HARQ NACK to the sum of the second HARQ ACK and the first HARQ NACK feedbacks, the gNB may adjust a contention window value to a larger value when the ratio being equal to or greater than a threshold. In an example, the gNB may adjust a contention window value to a minimum value in response to the ratio being less than the threshold. In an example, the gNB may keep a contention window value constant in response to the contention window value being a maximum value and the ratio being equal to or greater than the threshold. In an example, the threshold may a percentage value (e.g., 80%). The gNB may perform an LBT procedure based on the contention window value (or contention window size (CWS)). The gNB may transmit one or more transport blocks in response to the LBT procedure indicating a clear channel. The gNB may transmit PDCCH, PDSCH and SSB to the wireless device on the downlink resources of the plurality of slots.

Figure 24:
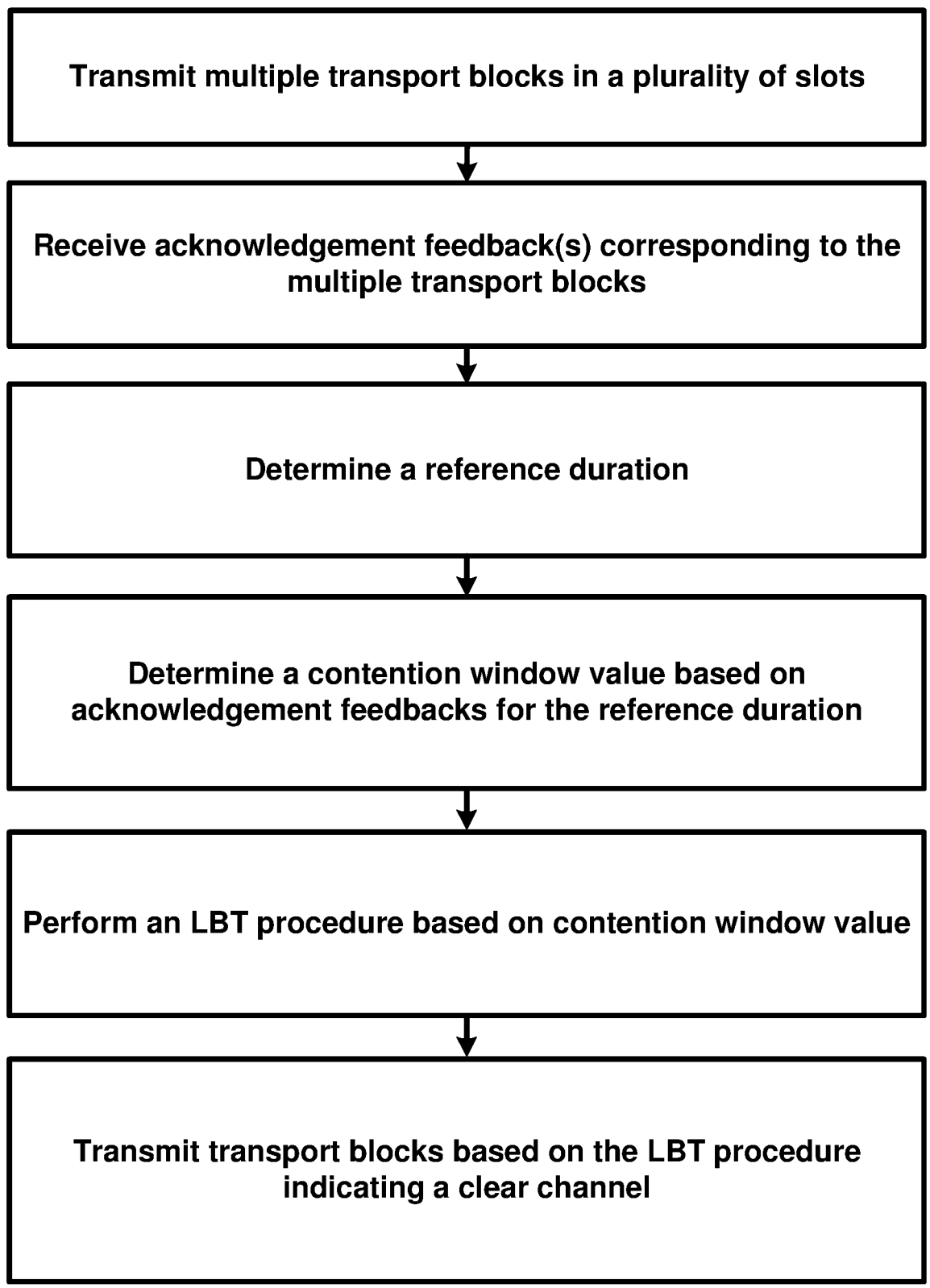
FIG. 24 is a diagram of an example flow chart of determining reference duration as per an aspect of an embodiment of the present disclosure.

FIG. 24 illustrates example of a follow chart for a gNB determining a reference duration and performing LBT in accordance with embodiments of the present disclosure. In an example, as shown in FIG. 24, a gNB may transmit RRC messages to configure numerologies, slot format combinations and BWPs. The gNB may transmit downlink control information comprising DL grant, UL grant and GC-PDCCH to a wireless device. The gNB may transmit a plurality of transport blocks in a plurality of slots to the wireless device. The gNB may receive HARQ-ACK/NACK feedbacks, corresponding to the plurality of transport blocks, from the wireless device. The gNB may determine a reference duration based on a numerology and a slot format combination. The gNB may calculate a ratio of HARQ-NACK feedbacks to HARQ ACK/NACK feedbacks on the reference duration. The gNB may adjust a contention window value based on the ratio calculation results if needed. The gNB may perform LBT based on the adjusted contention window value. The gNB may transmit transport blocks based on the output of successful LBT.

In an example, a gNB may transmit to at least one wireless device, a plurality of transport blocks in a plurality of slots. In an example, the gNB may receive a plurality of positive acknowledge (ACK)/negative acknowledgment (NACK) feedbacks corresponding to the plurality of transport blocks. In an example, the gNB may determine a reference duration based on a numerology and a slot format combination of the plurality of slots. In an example, the gNB may determine a value based on a first number of NACK feedbacks and a second number of ACK feedbacks among the plurality of ACK/NACK feedbacks, wherein the first number of NACK feedbacks and the second number of ACK feedbacks correspond to one or more of the plurality of transport blocks transmitted in the reference duration. In an example, the gNB may determine a contention window value based on the value. In an example, the gNB may perform a listen before talk procedure based on the contention window value. In an example, the gNB may transmit one or more transport blocks in response to the listen before talk procedure indicating a clear channel. In an example, the determining the reference duration may comprise determining a reference duration threshold based on the numerology. In an example, the determining the reference duration may comprise determining a first number of slots of the plurality of slots with an aggregated number of downlink resources having a duration equal to or greater than the reference duration threshold. In an example, the reference duration may span the first number of slots of the plurality of slots. In an example, the first number of slots may be contiguous slots. In an example, the determining the value based on the first number of NACK feedbacks and the second number of ACK feedbacks may comprise determining a ratio of the first number of NACK feedbacks to a sum of the first number of NACK feedbacks and the second number of ACK feedbacks. In an example, the determining a contention window value based on the value may comprise: adjusting a contention window value to a larger value in response to the value being equal to or greater than a threshold; adjusting a contention window value to a minimum value in response to the value being less than the threshold; or keeping a contention window value constant in response to the contention window value being a maximum value and the value being equal to or greater than the threshold. In an example, the gNB may transmit to the wireless device one or more messages comprising configuration parameters of a cell. The configuration parameters may comprise: an indication of numerology and a lot format combination. In an example, the indication of numerology may comprise an indication of a sub-carrier spacing and a cyclic prefix. In an example, the slot format combination may comprise maximum channel occupancy time (MCOT) structure. In an example, the slot format combination may indicate each slot format in the plurality of slots. In an example, the slot format may comprise a self-contained slot with downlink and uplink resources. In an example, the reference duration may comprise at least one slot of the plurality of slots. In an example, the gNB may receive PUSCH, PUCCH or SRS according to the slot format of the plurality of slots.

Figure 25:
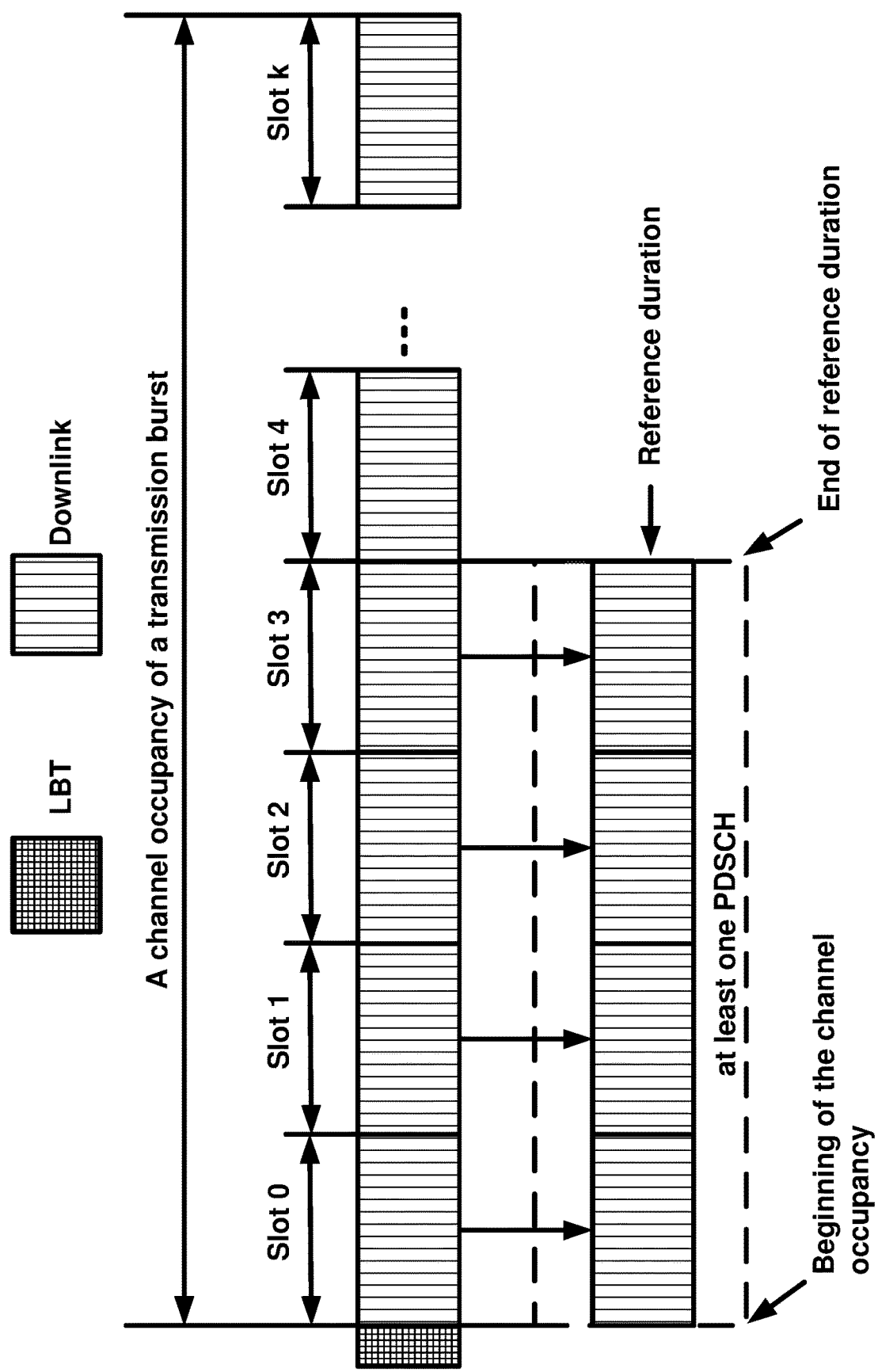
FIG. 25 is a diagram of an example downlink transmission with same numerology as per an aspect of an embodiment of the present disclosure.

FIG. 25 illustrates downlink transmission burst with a same numerology in accordance with embodiments of the present disclosure. As shown in FIG. 25, a plurality of slots with downlink resources, each associated with a respective index 0, 1, 2, . . . , k, may be transmitted in an MCOT/Burst for NR-U. In an example, k is a positive integer. The plurality of the slots may be a recent transmission before a gNB performs a first LBT CAT4. Before the transmission of the plurality of slots, the gNB may perform a second LBT CAT4 and the output of the second LBT CAT4 may indicate an idle channel.

In an example, in the plurality of slots with index 0, 1, 2, . . . , k, the slot formats of the plurality slots may be same or different, which may depend on gNB configuration/implementation. A slot format combination may indicate slot formats of the plurality of slots. Each of the plurality of slots may be configured with a slot format. The gNB may transmit the slot format combination to a wireless device to indicate the slot formats of the plurality of slots. A slot format of a slot may indicate a first number of OFDM symbols for a downlink transmission; a second number of OFDM symbols for an uplink transmission; and/or a third number of OFDM symbols for a flexible transmission. A length of the slot format combination in time domain may be equal to the length of an MCOT in terms of OFDM symbols. In an example, the slot format combination for NR-U may be different from a slot format combination defined for legacy licensed carriers. In an example, the slot format combination for NR-U may be predefined based on a slot format specified for a legacy licensed carrier. In an example, the slot format combination for NR-U may aggregate several slots with a slot format specified for a legacy licensed carrier.

In an example, a gNB may select and aggregate a slot format to form a slot format combination based on channel conditions and/or an interference environment on an unlicensed carrier. In another example, the gNB may select and aggregate several different slot formats to form the slot format combination based on channel conditions and/or an interference environment on an unlicensed carrier. The slot format combination for NR-U may be different from legacy slot format combination defined for licensed carriers. Based on the slot format combination and a numerology of the plurality of slots, the gNB may determine slot formats of the plurality of slots. The gNB may determine downlink resources configuration of each slot and length in time domain associated with the downlink resources.

In an example, as shown in FIG. 25, a gNB may determine a reference duration before performing an LBT CAT4. Based on a numerology and a slot format combination, the gNB may determine downlink resources and a corresponding length in time domain for the downlink resources of each slot. In an example, the gNB may determine a reference duration threshold. The reference duration threshold may be calculated based on the numerology. In an example, the reference duration threshold may be equal to $\alpha \cdot \frac{1}{2}^\mu$ ms. In an example, a may be a scale factor and determined via the gNB implementation/configuration. In an example, $\mu$ is 0,1,2,3 or 4, which may depend on gNB configuration. In an example, $\mu$ may be a numerology index associated with the numerology. The numerology may be defined with a sub-carrier spacing and a cyclic prefix in transmission.

In an example, a gNB may determine a number of slots from the plurality of slots, wherein a duration of an aggregated number of downlink resources in the number of slots is equal to or greater than the reference duration threshold. In an example, in response to the determining, the gNB may form the number of slots into a reference duration. In an example, the number of slots may be contiguous. In an example, the number of slots may be non-contiguous. In an example, the aggregated number of downlink resources may comprise PDSCH resources (e.g., one or more acknowledgement feedbacks corresponding to the PDSCH resources may be available for the gNB). The reference duration may span the first number of slots of the plurality of slots. If one or more slots of the plurality of slots being without PDSCH (e.g., acknowledgement feedbacks corresponding to one or more slots may be unavailable for the gNB), the number of slots, formed into the reference duration, may comprise the one or more slots. If one or more slots of the plurality of slots being configured without PDSCH, the aggregated number of downlink resources may not comprise downlink resources of the one or more slots of the plurality of slots.

In an example, as shown in FIG. 25, the gNB may determine that a duration of an aggregated number of downlink resources in four slots (e.g., slot 0, 1, 2 and 3 in FIG. 25) of the plurality of slots is equal to or greater than the reference duration threshold (e.g., $\alpha \cdot \frac{1}{2}^\mu$ ms). In an example, in response to the determining, the gNB may form the first four slots into a reference duration. In an example, the aggregated number of downlink resources may comprise PDSCH resources. In an example, If one slot of the plurality of slots being configured without PDSCH (e.g., slot 3 being without PDSCH), the number of slots which are formed into the reference duration, may further comprise slot 4 to meet the requirement that the aggregated number of downlink resources (PDSCH) may have a duration equal to or greater than the reference duration threshold (e.g., $\alpha \cdot \frac{1}{2}^\mu$ ms). In an example, if slot 4 is also configured without PDSCH, the number of slots which are formed into the reference duration may further comprise slot 5 until the aggregated number of downlink resources (PDSCH) may have a duration equal to or greater than the reference duration threshold (e.g., $\alpha \cdot \frac{1}{2}^\mu$ ms). The same rule may be applied to the following slots (e.g., slot 6, slot 7, etc.) for the gNB to determine the reference duration. If one or more slots of the plurality of slots are configured without PDSCH in the reference duration, the aggregated number of downlink resources may not comprise the downlink resources of the one or more slots of the plurality of slots.

Figure 26:
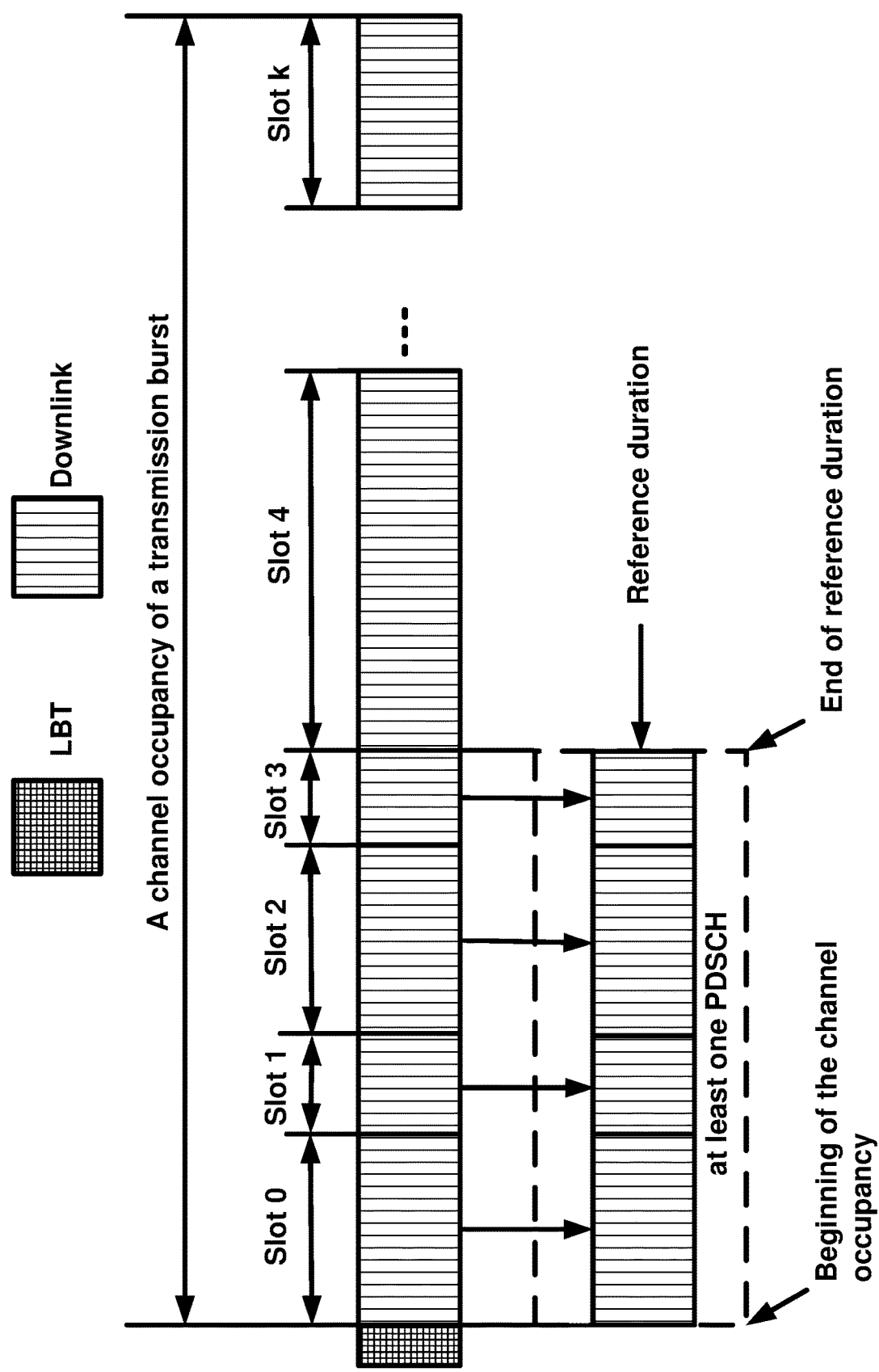
FIG. 26 is a diagram of an example downlink transmission with different numerologies as per an aspect of an embodiment of the present disclosure.

FIG. 26 illustrates downlink transmission burst with different numerologies in accordance with embodiments of the present disclosure. As shown in FIG. 26, a plurality of slots with downlink resources, each associated with a respective index 0, 1, 2, . . . , k, may be transmitted in an MCOT/Burst for NR-U. In an example, k is a positive integer. The plurality of the slots may be a recent transmission before gNB performs a first LBT CAT4. Before the transmission of the plurality of slots, the gNB may perform a second LBT CAT4 and the output of the second LBT CAT4 may indicate an idle channel.

In an example, as shown in FIG. 26, a gNB may determine a reference duration before performing an LBT CAT4. Based on a numerology and a slot format combination, the gNB may obtain downlink resources and a corresponding length in time domain for the downlink resources of each slot. In an example, the gNB may determine a reference duration threshold. The reference duration threshold may be calculated based on a numerology. The plurality of slots may have multiple numerologies as shown in FIG. 26. In an example, the reference duration threshold may be equal to $\alpha \cdot \frac{1}{2}^{\mu_k}$ ms. In an example, $\alpha$ may be a scale factor and determined via the gNB implementation/configuration. In an example, $\mu_k$ is 0,1,2,3 or 4, which may depend on gNB configuration. In an example, $\mu_k$ may be a numerology index associated with a numerology with minimum sub-carrier spacing among the multiple configured numerologies for the plurality of slots. The numerology may be defined with a sub-carrier spacing and a cyclic prefix in transmission.

As shown in FIG. 26, a gNB may determine that a duration of an aggregated number of downlink resources in first four slots (e.g., slot 0, 1, 2 and 3 in FIG. 26) of the plurality of slots is equal to or greater than the reference duration threshold (e.g., $\alpha \cdot \frac{1}{2}^{\mu_k}$ ms). In an example, in response to the determining, the gNB may form the first four slots (e.g., slot0, slot1, slot2 and slot3) into a reference duration. In an example, the aggregated number of downlink resources may comprise PDSCH resources. If one slot of the plurality of slots being configured without PDSCH (e.g., slot 3 being configured without PDSCH), the number of slots which may be formed into the reference duration, may further comprise more slots (e.g., slot 4) to meet the requirement that the aggregated number of downlink resources (PDSCH) may have a duration equal to or greater than the reference duration threshold (e.g., $\alpha \cdot \frac{1}{2}^{\mu*}$ ms). If slot 4 is configured without PDSCH, the number of slots which may be formed into the reference duration may further comprise slot 5 until the aggregated number of downlink resources (PDSCH) may have a duration equal to or greater than the reference duration threshold (e.g., $\alpha \cdot \frac{1}{2}^{\mu*}$ ms). The same rule may be applied to the following slots (e.g., slot 6, slot 7, etc.) for the gNB to determine the reference duration. If one or more slots of the plurality of slots being configured without PDSCH in the reference duration, the aggregated number of downlink resources (e.g., only with PDSCH) may not comprise the downlink resources of the one or more slots of the plurality of slots.

FIG. 22 illustrates example transmission/reception of RRC messages and downlink control information in accordance with embodiments of the present disclosure. As shown in FIG. 22, a gNB may transmit RRC messages, comprising slot format combination configuration and numerology configuration, to a wireless device. The gNB may transmit downlink control information (DCI) to the wireless device. The DCI may comprise a downlink grant (or downlink assignment), an uplink grant, and\or control information transmitted in a group common PDCCH. In response to receiving the DCI, the wireless device may determine MCOT\Burst structure based on slot format combination indication in the DCI.

As shown in FIG. 23, an example timeline of a procedure of a gNB determining a reference duration and performing LBT is illustrated in accordance with embodiments of the present disclosure. As shown in FIG. 23, a gNB may transmit to a wireless device, one or more RRC messages comprising parameters of a slot format combination, a numerology indication, and BWPs configuration. The gNB may transmit downlink control information, comprising UL grant, DL grant and group common PDCCH, to the wireless device. The gNB may transmit a plurality of transport blocks to the wireless device on a plurality of slots (e.g., at slot n).

The gNB may receive HARQ ACK/NACK feedbacks, corresponding to the plurality of the transport blocks, from the wireless device after k slots. In an example, k may be indicated in downlink control information. In an example, k may be determined by the wireless device capability. In an example, k may be determined by the gNB implementation. The gNB may determine a reference duration based on a numerology and a slot format combination as discussed above in FIG. 25 and FIG. 26. The gNB may determine a first number of HARQ NACK and a second number of HARQ ACK feedbacks from the wireless device for PDSCH transport blocks transmitted in the reference duration. The gNB may determine a value based on the first number of HARQ NACK and the second number of HARQ ACK feedbacks. In an example, the gNB determining a value may comprise that the gNB calculates a ratio of the first HARQ NACK to a sum of the second HARQ ACK and the first HARQ NACK feedbacks for PDSCH transport blocks transmitted in the reference duration.

In response to calculating the ratio of the first HARQ NACK to the sum of the second HARQ ACK and the first HARQ NACK feedbacks, the gNB may adjust a contention window value to a larger value when the ratio being equal to or greater than a threshold. In an example, the gNB may adjust a contention window value to a minimum value when the ratio being less than the threshold. In an example, the gNB may keep a contention window value constant when the contention window value being a maximum value and the ratio being equal to or greater than the threshold. In an example, the threshold may a percentage value 80%. The gNB may perform LBT based on the contention window value. The gNB may transmit one or more transport blocks in response to the LBT procedure indicating a clear channel. The gNB may transmit PDCCH, PDSCH and SSB to the wireless device on the downlink resources of the plurality of slots.

FIG. 24 illustrates example of a follow chart for a gNB determining a reference duration and performing LBT in accordance with embodiments of the present disclosure. In an example, as shown in FIG. 24, a gNB may transmit RRC messages to configure numerologies, slot format combinations and BWPs. The gNB may transmit downlink control information comprising DL grant, UL grant and GC-PDCCH to a wireless device. The gNB may transmit a plurality of transport blocks in a plurality of slots to the wireless device. The gNB may receive HARQ-ACK/NACK feedbacks, corresponding to the plurality of transport blocks, from the wireless device. The gNB may determine a reference duration based on a numerology and a slot format combination. The gNB may calculate a ratio of HARQ-NACK feedbacks to HARQ ACK/NACK feedbacks on the reference duration. The gNB may adjust a contention window value based on the ratio calculation results if needed. The gNB may perform LBT based on the adjusted contention window value. The gNB may transmit transport blocks based on the output of successful LBT.

Figure 27:
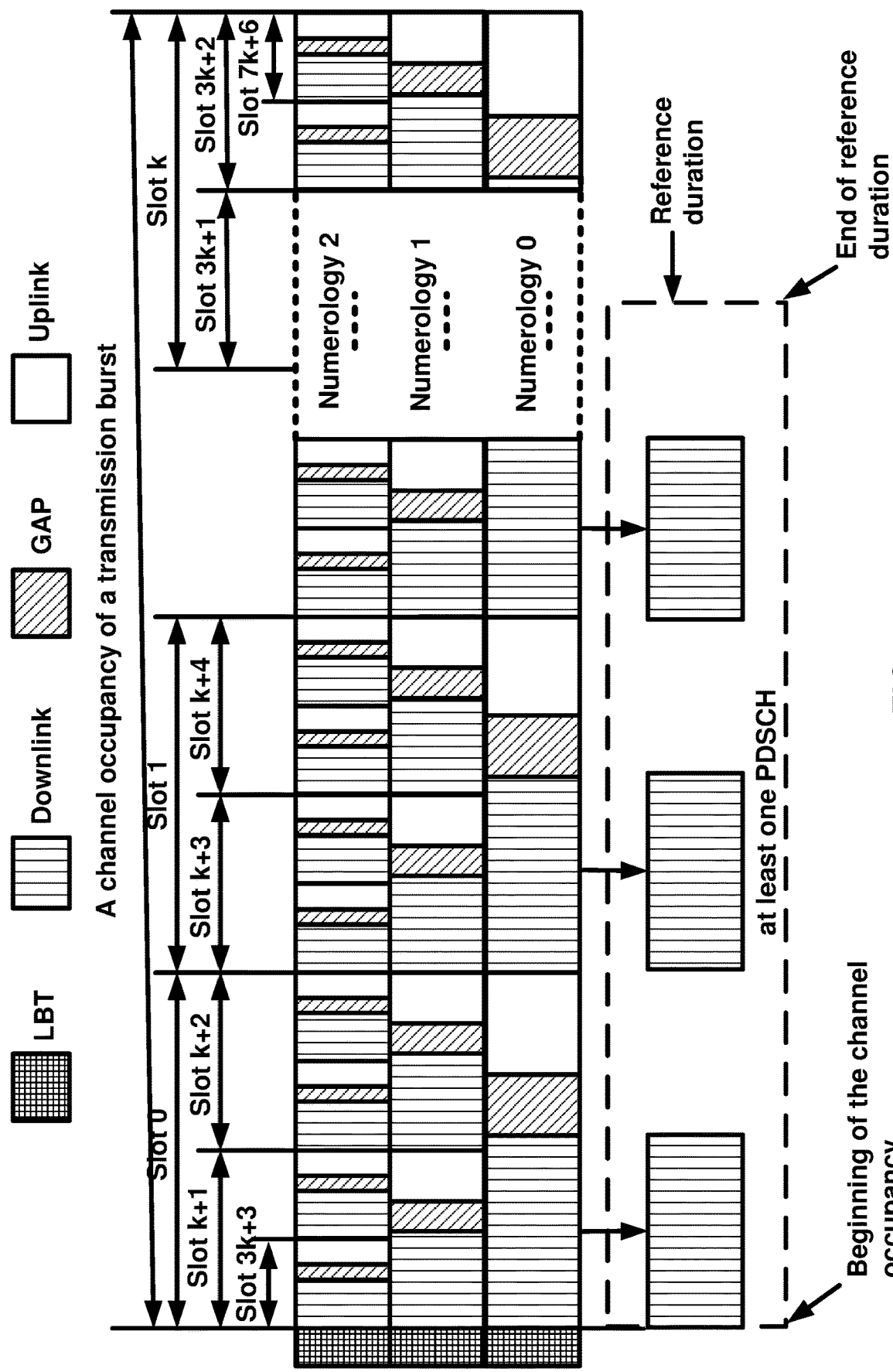
FIG. 27 is a diagram of an example downlink and uplink transmission with different numerologies as per an aspect of an embodiment of the present disclosure.

FIG. 27 illustrates downlink and uplink transmission with a same numerology in time domain and different numerologies in frequency domain in accordance with embodiments of the present disclosure. In an example, as shown in FIG. 27, three different numerologies (e.g., numerology 0, 1 and 2) may be used in three different BWPs/sub-bands and each may be with a different numerology. In an example, a sub-carrier spacing associated with numerology 2 may be larger than that of numerology 1. In an example, a sub-carrier spacing associated with numerology 1 may be larger than that of numerology 0. Numerology 0 may have a minimum sub-carrier spacing among the three configured numerologies. A plurality of slots with self-contained downlink and uplink resources, each associated with a respective index 0, 1, 2, . . . , k, k+1, k+2, k+3, . . . , 3k, 3k+1, 3k+2, 3k+3, . . . , 7k+6, may be transmitted in an MCOT/Burst for NR-U. In an example, k is a positive integer. The plurality of the slots may be a recent transmission before a gNB performs a first LBT CAT4 on at least one of the three BWPs/sub-bands. Before transmission of the plurality of slots, the gNB may perform a second LBT CAT4 on at least one of the three BWPs/sub-bands and the output of the second LBT CAT4, on at least one of the three BWPs/sub-bands, may indicate an idle channel.

In an example, for slots associated with numerology 0 having index 0, 1, 2, . . . , k in the plurality of slots, slot formats of the slots may be same or different. For slots associated with numerology 1 having index k+1, k+2, . . . , 3k+2 in the plurality of slots, slot formats of the slots may be same or different. For slots associated with numerology 2 having index 3k+3, 3k+4, . . . , 7k+6 in the plurality of slots, slot formats of the slots may be same or different. Slot formats of the plurality of slots may depend on gNB configuration/implementation. A slot format combination may indicate slot format for each slot of the plurality of slots. The gNB may transmit the slot format combination to a wireless device to indicate slot format for each slot of the plurality of slots. A slot format of a slot may indicate a first number of OFDM symbols for a downlink transmission; a second number of OFDM symbols for an uplink transmission; and/or a third number of OFDM symbols for a flexible transmission. A length of the slot format combination in the time domain may be equal to the length of an MCOT in terms of OFDM symbols. In an example, the slot format combination for NR-U may be different from a slot format combination defined for legacy licensed carriers. In an example, the slot format combination for NR-U may be predefined based on a slot format specified for a legacy licensed carrier. In an example, the slot format combination for NR-U may aggregate several slots with a slot format specified for a legacy licensed carrier.

In an example, a gNB may select and aggregate a slot format to form a slot format combination based on channel conditions and/or an interference environment on an unlicensed carrier. In another example, the gNB may select and aggregate several different slot formats to form the slot format combination based on channel conditions and/or an interference environment on an unlicensed carrier. The slot format combination for NR-U may be different from legacy slot format combination defined for licensed carriers. Based on the slot format combination and a numerology of the plurality of slots, the gNB may determine slot formats of the plurality of slots. The gNB may determine downlink resources configuration of each slot and length in time domain associated with the downlink resources.

In an example, as shown in FIG. 27, a gNB may determine a reference duration before performing an LBT CAT4 on at least one of the three configured BWPs/sub-bands. Based on a numerology and a slot format combination, the gNB may determine downlink resources and a corresponding length in time domain for the downlink resources of each slot. In an example, the gNB may determine a reference duration threshold. The reference duration threshold may be calculated based on a numerology. In an example, the reference duration threshold may be equal to $\alpha \cdot \frac{1}{2}^{\mu}$ ms. In an example, $\alpha$ may be a scale factor and determined via the gNB implementation/configuration. In an example, $\mu$ is 0,1,2,3 or 4, which may depend on gNB configuration. In an example, $\mu$ may be associated with a numerology, which may indicate a sub-carrier spacing and a cyclic prefix in transmission. In an example, $\mu$ may be a numerology index associated with the numerology with minimum sub-carrier spacing among the multiple configured numerologies. In an example, $\mu$ may be associated with a numerology configured for a BWP/sub-band, on which LBT CAT4 may be performed for transmission of the plurality of slots.

In an example, a gNB may determine a number of slots from the plurality of slots with one of the three numerologies, wherein a duration of an aggregated number of downlink resources in the number of slots is equal to or greater than the reference duration threshold. In an example, in response to the determining, the gNB may form the number of slots with one numerology into a reference duration. In an example, the number of slots formed into the reference duration may be slots with one of the three numerologies (e.g., slots with numerology 0). In an example, the one of the three numerologies may be a numerology with minimum sub-carrier spacing. In an example, the one of the three numerologies may be a numerology with LBT CAT4 performed. In an example, the number of slots may be contiguous. In an example, the number of slots may be non-contiguous. In an example, the aggregated number of downlink resources may comprise PDSCH resources (e.g., one or more acknowledgement feedbacks corresponding to the PDSCH resources may be available for the gNB). The reference duration may span the first number of slots of the plurality of slots with one of the three numerologies. If one or more slots of the plurality of slots, with one of the three numerologies, being configured without PDSCH (e.g., acknowledgement feedbacks corresponding to one or more slots may be unavailable for the gNB), the number of slots which are formed into the reference duration, may comprise the one or more slots. If one or more slots of the plurality of slots, with one of the three numerologies, being configured without PDSCH, the aggregated number of downlink resources may not comprise downlink resources of the one or more slots of the plurality of slots.

In an example, as shown in FIG. 27, a gNB may determine that a duration of an aggregated number of downlink resources in three slots (e.g., slot 0, 1 and 2 in FIG. 27) of the plurality of slots, with numerology 0, is equal to or greater than the reference duration threshold (e.g., $\alpha \cdot \frac{1}{2}^{\mu}$ ms). In an example, the gNB may form the three slots with numerology 0 into the reference duration as shown in FIG. 27. In an example, numerology 0 may be associated with a minimum sub-carrier spacing among the multiple configured numerologies. In an example, an LBT CAT4 may be performed on a BPW/sub-band with numerology 0. In an example, the aggregated number of downlink resources may comprise PDSCH resources. If one slot of the three slots being configured without PDSCH (e.g., slot 2 being configured without PDSCH), the number of slots which are formed into the reference duration, may further comprise slot 3 to meet the requirement that the aggregated number of downlink resources (PDSCH) may have a duration equal to or greater than the reference duration threshold (e.g., $\alpha \cdot \frac{1}{2}^{\mu}$ ms). If slot 3 is also configured without PDSCH, the number of slots which are formed into the reference duration may further comprise slot 4 (e.g., k is larger than 4) until the aggregated number of downlink resources (PDSCH) may have a duration equal to or greater than the reference duration threshold (e.g., $\alpha \cdot \frac{1}{2}^{\mu}$ ms). The same rule may be applied to the following slots (e.g., slot 5, slot 6, etc.) for the gNB to determine the reference duration. If one or more slots of the plurality of slots being configured without PDSCH in the reference duration, the aggregated number of downlink resources may not comprise the downlink resources of the one or more slots of the plurality of slots.

Figure 28:
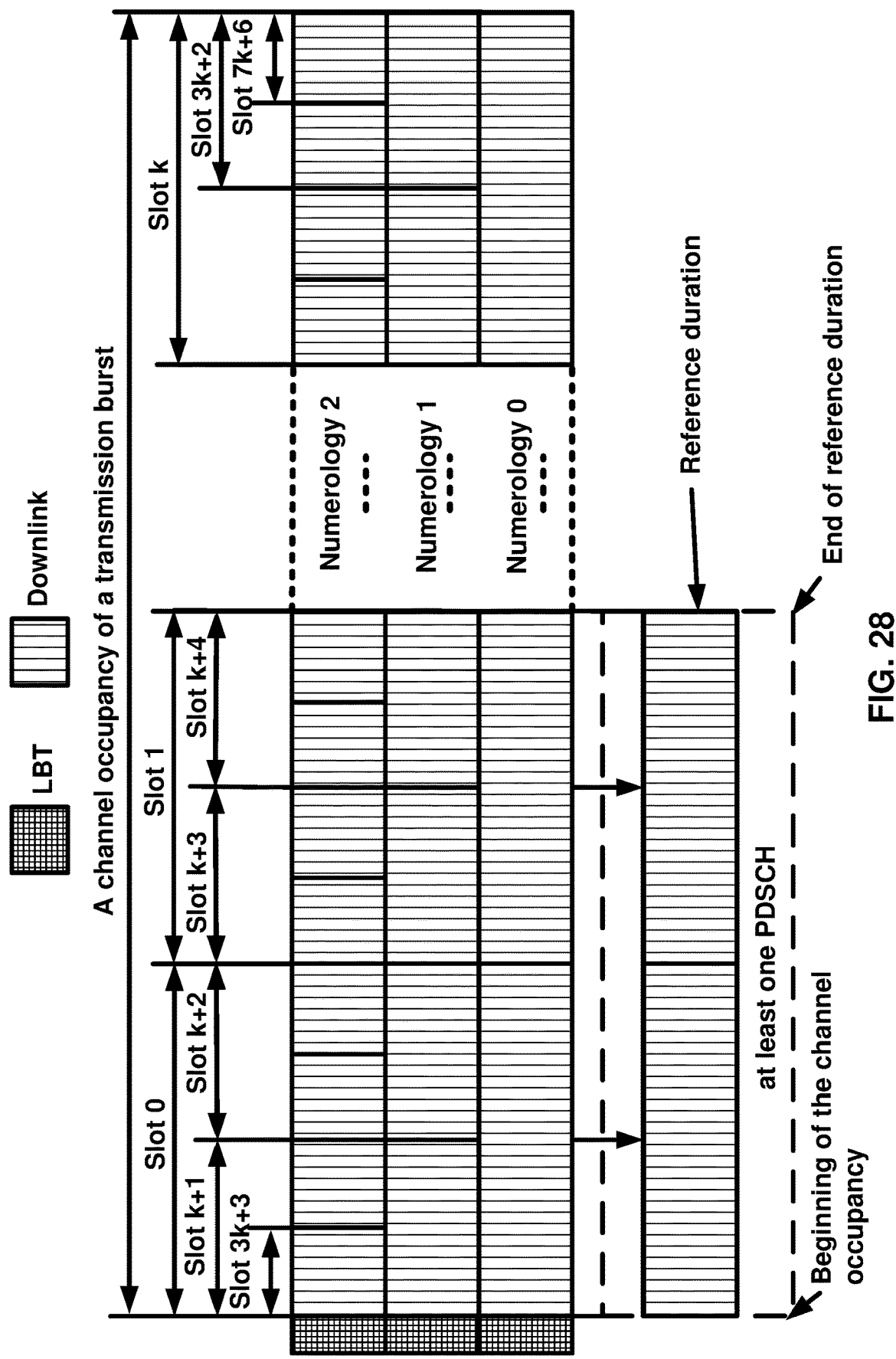
FIG. 28 is a diagram of an example downlink transmission with different numerologies as per an aspect of an embodiment of the present disclosure.

FIG. 28 illustrates downlink transmission burst with a same numerology in time domain and different numerologies in frequency domain in accordance with embodiments of the present disclosure. In an example, as shown in FIG. 28, three different numerologies (e.g., numerology 0, 1 and 2) may be used in three different BWPs/sub-bands and each may be with a different numerology. In an example, a sub-carrier spacing associated with numerology 2 may be larger than that of numerology 1. In an example, a sub-carrier spacing associated with numerology 1 may be larger than that of numerology 0. Numerology 0 may have a minimum sub-carrier spacing among the three configured numerologies. A plurality of slots with downlink resources, each associated with a respective index 0, 1, 2, . . . , k, k+1, k+2, k+3, . . . , 3k, 3k+1, 3k+2, 3k+3, . . . , 7k+6, may be transmitted in an MCOT/Burst for NR-U. In an example, k is a positive integer. The plurality of the slots may be a recent transmission before a gNB performs a first LBT CAT4 on at least one of the three BWPs/sub-bands. Before transmission of the plurality of slots, the gNB may perform a second LBT CAT4 on at least one of the three BWPs/sub-bands and the output of the second LBT CAT4, on at least one of the three BWPs/sub-bands, may indicate an idle channel.

In an example, as shown in FIG. 28, a gNB may determine a reference duration before performing an LBT CAT4 on at least one of the three configured BWPs/sub-bands. Based on a numerology and a slot format combination, the gNB may determine downlink resources and a corresponding length in time domain for the downlink resources of each slot of the plurality of slots. In an example, the gNB may determine a reference duration threshold. The reference duration threshold may be calculated based on a numerology. In an example, the reference duration threshold may be equal to $\alpha \cdot \frac{1}{2}^{\mu_k}$ ms. In an example, $\alpha$ may be a scale factor and determined via the gNB implementation/configuration. In an example, $\mu_k$ is 0,1,2,3 or 4, which may depend on gNB configuration. In an example, $\mu_k$ may be a numerology index associated with a numerology with minimum sub-carrier spacing among the multiple configured numerologies for the plurality of slots. In an example, $\mu^k$ may be associated with a numerology configured for a BWP/sub-band, on which an LBT CAT4 may be performed for transmission of the plurality of slots. The numerology may be defined with a sub-carrier spacing and a cyclic prefix in transmission.

In an example, as shown in FIG. 28, a gNB may determine that a duration of an aggregated number of downlink resources in first two slots (e.g., slot 0 and 1 in FIG. 28) of the plurality of slots, with numerology 0, is equal to or greater than the reference duration threshold (e.g., $\alpha \cdot \frac{1}{2}^{\mu_k}$ ms). In an example, in response to the determining, the gNB may form the first two slots (e.g., slot0 and slot1) with numerology 0 into a reference duration. In an example, numerology 0 may have a minimum sub-carrier spacing. In an example, an LBT CAT4 may be performed on a BPW/sub-band with numerology 0. In an example, the aggregated number of downlink resources may comprise PDSCH resources. If one slot of the two slots being configured without PDSCH (e.g., slot 1 being configured without PDSCH), the number of slots which are formed into the reference duration, may further comprise slot 2 (e.g., k is larger than 2) to meet the requirement that the aggregated number of downlink resources (PDSCH) may have a duration equal to or greater than the reference duration threshold (e.g., $\alpha \cdot \frac{1}{2}^{\mu_k}$ ms). If slot 2 is also configured without PDSCH, the number of slots which are formed into the reference duration may further comprise slot 3 (e.g., k is larger than 3) until the aggregated number of downlink resources (PDSCH) may have a duration equal to or greater than the reference duration threshold (e.g., $\alpha \cdot \frac{1}{2}^{\mu_k}$ ms). The same rule may be applied to the following slots (e.g., slot 4, slot 5, etc.) for the gNB to determine the reference duration. If one or more slots with numerology 0 of the plurality of slots being configured without PDSCH in the reference duration, the aggregated number of downlink resources may not comprise the downlink resources of the one or more slots with numerology 0 of the plurality of slots.

FIG. 22 illustrates example transmission/reception of RRC messages and downlink control information in accordance with embodiments of the present disclosure. As shown in FIG. 22, a gNB may transmit RRC messages, comprising slot format combination configuration, BWP configuration and numerology configuration, to a wireless device. The gNB may transmit downlink control information (DCI) to the wireless device. The DCI may comprise a downlink grant (or downlink assignment), an uplink grant, and\or control information transmitted in a group common PDCCH. In response to receiving the DCI, the wireless device may determine MCOT\Burst structure based on slot format combination indication in the DCI.

As shown in FIG. 23, an example timeline of a procedure of a gNB determining a reference duration and performing LBT is illustrated in accordance with embodiments of the present disclosure. As shown in FIG. 23, a gNB may transmit to a wireless device, one or more RRC messages comprising parameters of a slot format combination, a numerology indication, and BWPs configuration. The gNB may transmit downlink control information, comprising UL grant, DL grant and group common PDCCH, to the wireless device. The gNB may transmit a plurality of transport blocks to the wireless device on a plurality of slots with multiple numerologies and BWPs (e.g., at slot n).

The gNB may receive HARQ ACK/NACK feedbacks, corresponding to the plurality of the transport blocks, from the wireless device after k slots. In an example, k may be indicated in downlink control information. In an example, k may be determined by the wireless device capability. In an example, k may be determined by the gNB implementation. The gNB may determine a reference duration based on a numerology and a slot format combination as discussed above in FIG. 27 and FIG. 28. The gNB may determine a first number of HARQ NACK and a second number of HARQ ACK feedbacks from the wireless device for PDSCH transport blocks transmitted in the reference duration on the multiple BWPs/sub-bands. The gNB may determine a value based on the first number of HARQ NACK and the second number of HARQ ACK feedbacks. In an example, the gNB determining a value may comprise that the gNB calculates a ratio of the first HARQ NACK to a sum of the second HARQ ACK and the first HARQ NACK feedbacks for PDSCH transport blocks transmitted in the reference duration on the multiple BWPs/sub-bands.

In response to calculating the ratio of the first HARQ NACK to the sum of the second HARQ ACK and the first HARQ NACK feedbacks, the gNB may adjust a contention window value to a larger value when the ratio being equal to or greater than a threshold. In an example, the gNB may adjust a contention window value to a minimum value when the ratio being less than the threshold. In an example, the gNB may keep a contention window value constant when the contention window value being a maximum value and the ratio being equal to or greater than the threshold. In an example, the threshold may a percentage value 80%. The gNB may perform LBT based on the contention window value. The gNB may transmit one or more transport blocks in response to the LBT procedure indicating a clear channel. The gNB may transmit PDCCH, PDSCH and SSB to the wireless device on the downlink resources of the plurality of slots on multiple BWPs/sub-bands.

FIG. 24 illustrates example of a follow chart for a gNB determining a reference duration and performing LBT in accordance with embodiments of the present disclosure. In an example, as shown in FIG. 24, a gNB may transmit RRC messages to configure numerologies, slot format combinations and BWPs. The gNB may transmit downlink control information comprising DL grant, UL grant and GC-PDCCH to a wireless device. The gNB may transmit a plurality of transport blocks in a plurality of slots to the wireless device. The gNB may receive HARQ-ACK/NACK feedbacks, corresponding to the plurality of transport blocks, from the wireless device. The gNB may determine a reference duration based on a numerology and a slot format combination. The gNB may calculate a ratio of HARQ-NACK feedbacks to HARQ ACK/NACK feedbacks on the reference duration. The gNB may adjust a contention window value based on the ratio calculation results if needed. The gNB may perform an LBT procedure based on the adjusted contention window value. The gNB may transmit transport blocks on multiple BWPs/sub-bands based on the output of successful LBT (e.g., the LBT procedure indicating a clear channel) on at least one BWP/sub-band.

Figure 29:
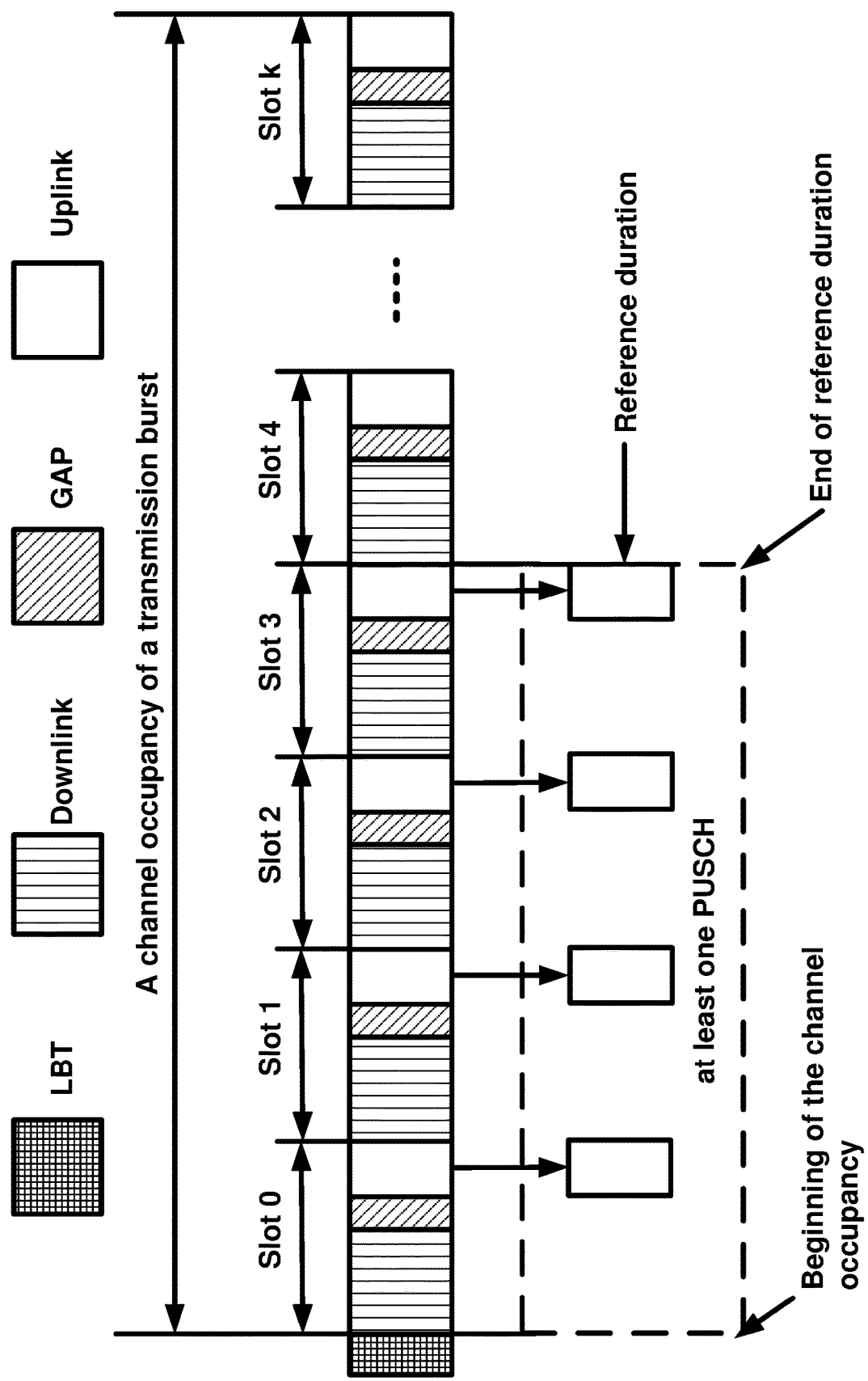
FIG. 29 is a diagram of an example downlink and uplink transmission with same numerology as per an aspect of an embodiment of the present disclosure.

FIG. 29 illustrates downlink and uplink transmission with a same numerology in accordance with embodiments of the present disclosure. As shown in FIG. 29, a plurality of slots with self-contained downlink and uplink resources, each associated with a respective index 0, 1, 2, . . . , k, may be transmitted in a channel occupancy of a transmission burst for NR-U. In an example, k may be a positive integer. The plurality of the slots may be a most recent transmission before a wireless device receives a UL grant to perform a first LBT CAT4. Before transmission of the plurality of slots, the wireless device may perform a second LBT CAT4 in a gap and the output of the second LBT CAT4 may indicate an idle channel.

In an example, in the plurality of slots with index 0, 1, 2, . . . , k, slot formats of the plurality slots may be same or different, which may depend on gNB configuration. A slot format combination may indicate slot formats of the plurality of slots. Each of the plurality of slots may be configured with a slot format. The gNB may transmit the slot format combination to a wireless device to indicate the slot formats of the plurality of slots. A slot format of a slot may indicate a first number of OFDM symbols for a downlink transmission; a second number of OFDM symbols for an uplink transmission; and/or a third number of OFDM symbols for a flexible transmission. A length of the slot format combination in time domain may be equal to a length of an MCOT in terms of OFDM symbols. In an example, the slot format combination for NR-U may be different from a slot format combination defined for legacy licensed carriers. In an example, the slot format combination for NR-U may be predefined based on a slot format specified for a legacy licensed carrier. In an example, the slot format combination for NR-U may aggregate several slots with a slot format specified for a licensed carrier.

In an example, a gNB may select and aggregate a slot format to form a slot format combination based on channel conditions and/or an interference environment on an unlicensed carrier. In another example, the gNB may select and aggregate several different slot formats to form the slot format combination based on channel conditions and/or an interference environment on an unlicensed carrier. The slot format combination for NR-U may be different from slot format combination defined for licensed carriers. The gNB may transmit the slot format combination and a numerology configuration for the plurality of slots to a wireless device. Based on the slot format combination and the numerology of the plurality of slots, the wireless device may determine slot formats of the plurality of slots. The wireless device may determine uplink resources of each slot and length in time domain associated with the uplink resources.

In an example, as shown in FIG. 29, a wireless device may determine a reference duration before performing an LBT CAT4. Based on a numerology and a slot format combination, the wireless device may determine uplink resources of each slot and a corresponding length in time domain for the uplink resources. Based on a numerology and a slot format combination, the UE may determine uplink resources and a corresponding length in time domain for the uplink resources of each slot. A UE may determine the reference duration for contention window adjustment being used by the LBT CAT4. The reference duration may be from a beginning of a channel occupancy of a transmission burst and until an end of a first slot where at least one physical uplink shared channel (PUSCH) is transmitted. In an example PUSCH is transmitted over all the resources allocated for the PUSCH. In an example, the reference duration may end at the first slot: where the at least one PUSCH is transmitted, and for which one or more acknowledgement feedbacks, based on one or more NDIs, are available for the at least one PUSCH. The wireless device may consider (for reference duration determination) PUSCH for which one or more acknowledgement feedbacks (ACK and/or NACK) are available. In an example, when NDI in a DCI is toggled, the wireless device assumes that a transmission of a previous PUSCH is positively acknowledged (ACK). In an example, when NDI in a DCI is not toggled, the wireless device assumes that a transmission of a previous PUSCH is negatively acknowledged (NACK).

The beginning of the channel occupancy may be based on when a listen before talk (LBT) procedure indicates a clear channel (e.g. as shown in FIG. 20).

In an example, the UE may determine a reference duration threshold indicating a number of the at least one PUSCH transmitted. The reference duration threshold may be calculated based on the numerology. In an example, the reference duration threshold may be equal to $\alpha \cdot \frac{1}{2}^{\mu}$ ms. In an example, $\alpha$ may be a scale factor and determined via the UE implementation/configuration (e.g., $\alpha$ may be 0.2, 0.5, 1, 2, and/or the like). In an example, $\mu$ may be a numerology index associated with the numerology. The numerology may be defined with a sub-carrier spacing and a cyclic prefix in transmission. In an example, $\mu$ may be 0,1,2,3 or 4, which may depend on the UE configuration/implementation.

In an example, the UE may determine a number of slots from the plurality of slots of the transmission burst, where a duration of an aggregated number of downlink resources (e.g. PUSCH) in the number of slots is equal to or greater than the reference duration threshold. For example, if the reference duration threshold is 3, the at least one PUSCH transmitted in the reference duration may comprise three PUSCH. The wireless device may consider (for reference duration determination) PUSCH for which one or more acknowledgement feedbacks (ACK and/or NACK) are available. In an example, the reference duration may not exceed the duration of the transmission burst. In an example, the reference duration may be until the end of the transmission burst that contains at least one PUSCH transmitted.

In an example, in response to the determining, the wireless device may form the number of slots into a reference duration. In an example, the number of slots may be contiguous. In an example, the number of slots may be non-contiguous. In an example, the aggregated number of uplink resources may comprise PUSCH resources (e.g., one or more acknowledgement feedbacks corresponding to the PUSCH resources may be available for the wireless device). The reference duration may span the first number of slots of the plurality of slots. If one or more slots of the plurality of slots being configured without PUSCH resources (e.g., acknowledgement feedbacks corresponding to the PUSCH resources may be unavailable for the wireless device), the number of slots, formed into the reference duration, may comprise the one or more slots. If one or more slots of the plurality of slots being configured without PUSCH resources, the aggregated number of uplink resources may not comprise uplink resources of the one or more slots of the plurality of slots.

In an example, as shown in FIG. 29, a wireless device may determine that a duration of an aggregated number of uplink resources in first four slots (e.g., slot 0, 1, 2 and 3 in FIG. 29) of the plurality of slots is equal to or greater than a reference duration threshold (e.g., $\alpha \cdot \frac{1}{2}^\mu$ ms). In an example, in response to the determining, the wireless device may form the first four slots into a reference duration. In an example, the aggregated number of uplink resources may comprise PUSCH resources. In an example, if one slot of the plurality of slots being configured without PUSCH resources (e.g., slot 3 being configured without PUSCH resources), the number of slots which are formed into the reference duration, may further comprise slot 4 to meet the requirement that the aggregated number of uplink resources (PUSCH) may have a duration equal to or greater than the reference duration threshold (e.g., $\alpha \cdot \frac{1}{2}^\mu$ ms). In an example, if slot 4 is also configured without PUSCH, the number of slots which are formed into the reference duration may further comprise slot 5 until the aggregated number of uplink resources (PUSCH) may have a duration equal to or greater than the reference duration threshold (e.g., $\alpha \cdot \frac{1}{2}^\mu$ ms). In an example, the slot with PUSCH resources may comprise PUSCH is transmitted over all the resources allocated for the PUSCH in the slot. In an example, the slot without PUSCH resources may comprise PUSCH is transmitted over a portion of all the resources allocated for the PUSCH in the slot (e.g., punched by the wireless device or damaged by interference of other nodes). The same rule may be applied to the following slots (e.g., slot 6, slot 7, etc.) for the wireless device to determine the reference duration. In an example, the reference duration may comprise slots from the beginning of the plurality of slots until the end of the first slot with PUSCH resources of the plurality of slots. In an example, if each of the plurality slots is configured without PUSCH resources, the wireless device may determine the plurality of slots as the reference duration. If one or more slots of the plurality of slots are configured without PUSCH in the reference duration, the aggregated number of uplink resources may not comprise the uplink resources of the one or more slots of the plurality of slots.

Figure 30:
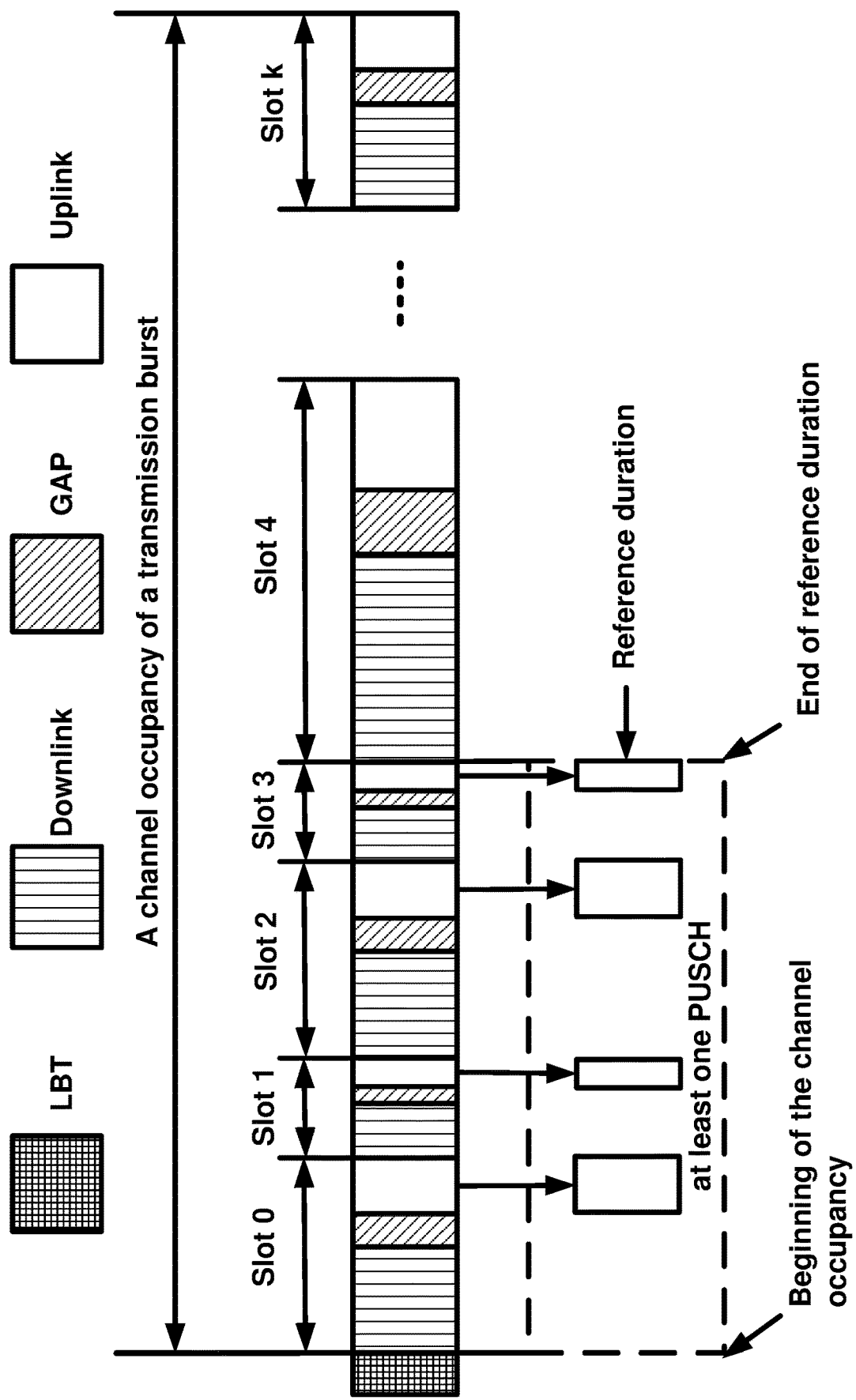
FIG. 30 is a diagram of an example downlink and uplink transmission with different numerologies as per an aspect of an embodiment of the present disclosure.

FIG. 30 illustrates downlink and uplink transmission with different numerologies in accordance with embodiments of the present disclosure. As shown in FIG. 30, a plurality of slots with self-contained downlink and uplink resources, each slot associated with a respective index 0, 1, 2, . . . , k, may be transmitted in an MCOT/Burst for NR-U. In an example, k may be a positive integer. The plurality of slots may be a most recent transmission before a wireless device receives a UL grant to perform a first LBT CAT4. Before transmission of the plurality of slots, the wireless device may perform a second LBT CAT4 in a gap and the output of the second LBT CAT4 may indicate an idle channel.

In an example, as shown in FIG. 30, a wireless device may determine a reference duration before performing an LBT CAT4. Based on a numerology and a slot format combination, the wireless device may determine uplink resources of each slot and a corresponding length in time domain for the uplink resources. In an example, the wireless device may determine a reference duration threshold. The reference duration threshold may be calculated based on a numerology. The plurality of slots may have multiple numerologies in time domain as shown in FIG. 30. In an example, the reference duration threshold may be equal to $\alpha \cdot \frac{1}{2}^{\mu k}$ ms. In an example, $\alpha$ may be a scale factor and determined via gNB configuration. In an example, $\mu^k$ is 0,1,2,3 or 4, which may depend on gNB configuration. In an example, $\mu^k$ may be a numerology index associated with a numerology with minimum sub-carrier spacing among the multiple configured numerologies for the plurality of slots. The numerology may be defined with a sub-carrier spacing and a cyclic prefix in transmission.

As shown in FIG. 30, a wireless device may determine that a duration of an aggregated number of uplink resources in first four slots (e.g., slot 0, 1, 2 and 3 in FIG. 30) of the plurality of slots is equal to or greater than a reference duration threshold (e.g., $\alpha \cdot \frac{1}{2}^{\mu k}$ ms). In an example, in response to the determining, the wireless device may form the first four slots (e.g., slot0, slot1, slot2 and slot3) into a reference duration. In an example, the aggregated number of uplink resources may comprise PUSCH resources. If one slot of the plurality of slots being configured without PUSCH resources (e.g., slot 3 being configured without PUSCH resources), the number of slots which may be formed into the reference duration, may further comprise more slots (e.g., slot 4) to meet the requirement that the aggregated number of uplink resources (PUSCH) may have a duration equal to or greater than the reference duration threshold (e.g., $\alpha \cdot \frac{1}{2}^{\mu k}$ ms). If slot 4 is configured without PUSCH, the number of slots which may be formed into the reference duration may further comprise slot 5 until the aggregated number of uplink resources (PUSCH) may have a duration equal to or greater than the reference duration threshold (e.g., $\alpha \cdot \frac{1}{2}^{\mu k}$ ms). The same rule may be applied to the following slots (e.g., slot 6, slot 7, etc.) for the wireless device to determine the reference duration. If one or more slots of the plurality of slots being configured without PUSCH resources in the reference duration, the aggregated number of uplink resources (e.g., only with PUSCH) may not comprise the uplink resources of the one or more slots of the plurality of slots.

FIG. 22 illustrates example transmission/reception of RRC messages and downlink control information in accordance with embodiments of the present disclosure. As shown in FIG. 22, a gNB may transmit RRC messages, comprising slot format combination configuration and numerology configuration, to a wireless device. The gNB may transmit downlink control information (DCI) to the wireless device. The DCI may comprise a downlink grant (or downlink assignment), an uplink grant, and\or control information transmitted in a group common PDCCH. In response to receiving the DCI, the wireless device may determine MCOT\Burst structure based on slot format combination indication in the DCI.

Figure 31:
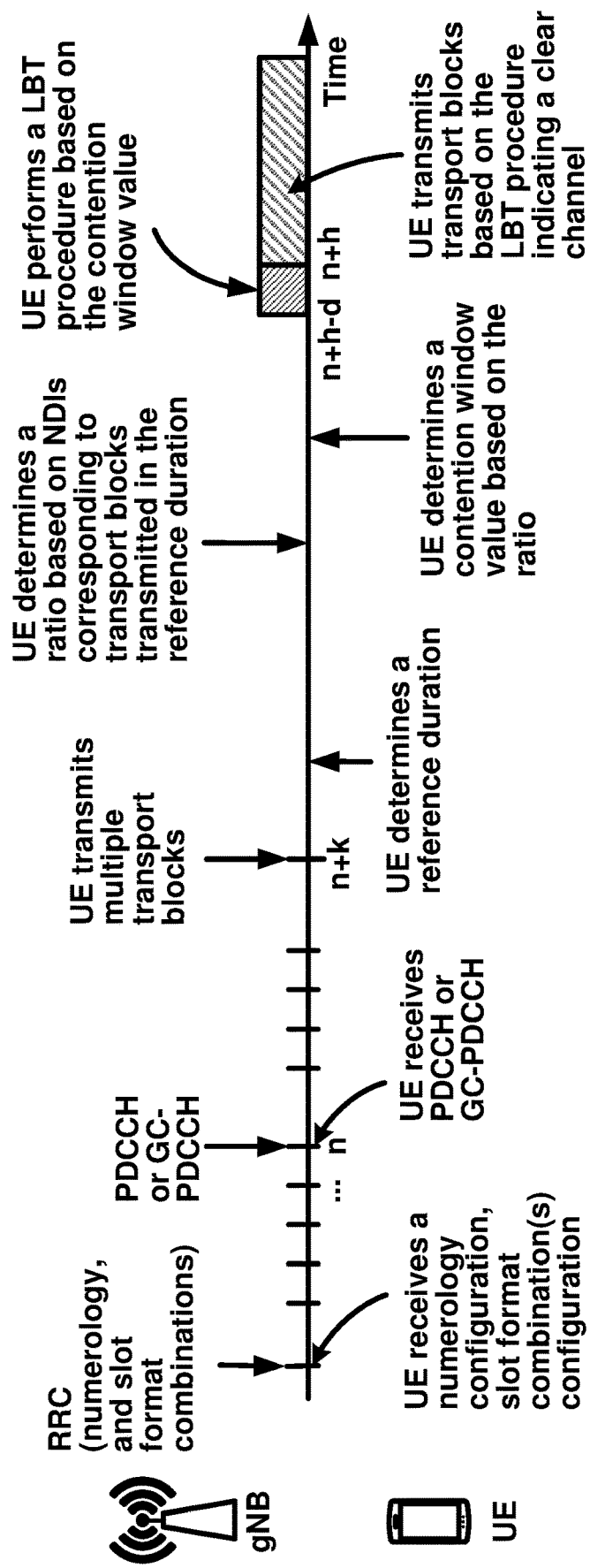
FIG. 31 is a diagram of an example procedure of determining reference duration as per an aspect of an embodiment of the present disclosure.

FIG. 31 shows an example timeline of a procedure of a wireless device determining a reference duration and performing LBT is illustrated in accordance with embodiments of the present disclosure. As shown in FIG. 31, a gNB may transmit to a wireless device, one or more RRC messages comprising parameters of a slot format combination, a numerology indication, and BWPs configuration. In an example, the parameters may further indicate multiple slots, for which one or more acknowledgement feedbacks are available, as a reference duration. The gNB may transmit downlink control information, comprising UL grant, DL grant and/or group common PDCCH, to the wireless device (e.g., at slot n). The wireless device may transmit a plurality of transport blocks to the gNB on a plurality of slots with one or more BPWs (e.g., at slot n+k). In an example, k may be indicated in downlink control information. In an example, k may be determined by the wireless device capability. In an example, k may be determined by the gNB configuration.

The wireless device may receive HARQ parameters corresponding to the plurality of transport blocks from the gNB. The wireless device may determine a reference duration based on a numerology and a slot format combination as discussed above in FIG. 29 and/or FIG. 30. The wireless device may determine a number of HARQ parameters for transport blocks of the plurality of transport blocks transmitted in the reference duration. In an example, the number of HARQ parameters may comprise new data indicator (NDI) values in a UL grant for transport blocks of the plurality of transport blocks transmitted in the reference duration (e.g., the NDI may indicate an acknowledgement feedback to the wireless device). In an example, the number of HARQ parameters may comprise HARQ ACK/NACK feedbacks for transport blocks of the plurality of transport blocks transmitted in the reference duration.

In an example, a wireless device may determine one or more new data indicator (NDI) values in a UL grant corresponding to transport blocks of the plurality of transport blocks with one or more HARQ processes transmitted in the reference duration. In response to determining the number of new data indicator (NDI) values, the wireless device may adjust a contention window value to a minimum value when a new data indicator (NDI) value for at least one HARQ process of the one or more HARQ processes is toggled. The wireless device may adjust a contention window value to a larger value when a new data indicator (NDI) value for the one or more HARQ processes is not toggled. The wireless device may keep a contention window value to constant when a new data indicator (NDI) value for the one or more HARQ processes is not toggled and the contention window value is maximum. The wireless device may perform LBT based on the contention window value. The wireless device may transmit one or more transport blocks in response to the LBT procedure indicating a clear channel. The wireless device may transmit PUCCH, SRS, and/or transport blocks on PUSCHs to the gNB on uplink resources of the plurality of slots.

In an example, a wireless device may calculate a ratio of a first HARQ NACK to a sum of a second HARQ ACK and the first HARQ NACK feedbacks, corresponding to transport blocks of the plurality of transport blocks transmitted in the reference duration. In response to calculating the ratio of the first HARQ NACK to the sum of the second HARQ ACK and the first HARQ NACK feedbacks, the wireless device may adjust a contention window value to a larger value when the ratio being equal to or greater than a threshold. In an example, the wireless device may adjust a contention window value to a minimum value when the ratio being less than the threshold. In an example, the wireless device may keep a contention window value constant when the contention window value being a maximum value and the ratio being equal to or greater than the threshold. In an example, the threshold may a percentage value (e.g., 80%). The wireless device may perform LBT based on the contention window value. The wireless device may transmit one or more transport blocks in response to the LBT procedure indicating a clear channel. The wireless device may transmit PUCCH, PUSCH and/or SRS to the gNB on uplink resources of the plurality of slots.

Figure 32:
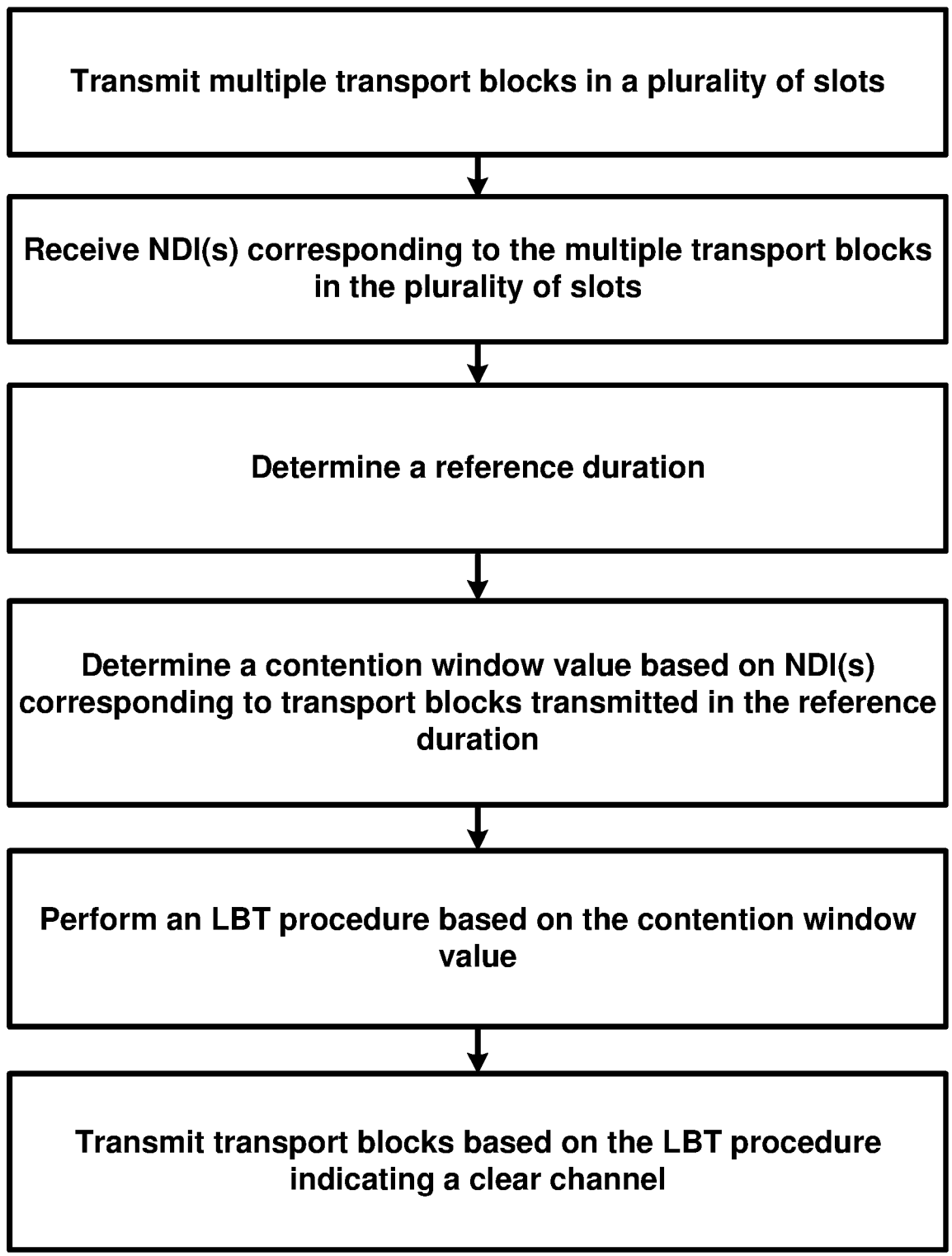
FIG. 32 is a diagram of an example flow chart of determining reference duration as per an aspect of an embodiment of the present disclosure.

FIG. 32 illustrates example of a follow chart for a wireless device determining a reference duration and performing LBT in accordance with embodiments of the present disclosure. In an example, as shown in FIG. 32, a wireless device may receive RRC messages to configure a numerology, a slot format combination and/or a BWP. The wireless device may receive downlink control information comprising DL grant, UL grant and/or GC-PDCCH from a gNB. The wireless device may transmit a plurality of transport blocks in a plurality of slots to the gNB. The wireless device may receive HARQ parameters, corresponding to the plurality of transport blocks, from the gNB. The wireless device may determine a reference duration based on the numerology and/or the slot format combination. The wireless device may determine a HARQ parameter value corresponding to one or more transport blocks transmitted in the reference duration. The wireless device may determine a contention window value based on the determined HARQ parameter value corresponding to transport blocks transmitted in the reference duration. The wireless device may perform LBT based on the determined contention window value. The wireless device may transmit transport blocks based on the output of successful LBT.

In an example, a wireless device may transmit to a gNB, a plurality of transport blocks in a plurality of slots. In an example, the wireless device may determine a reference duration based on a numerology and/or a slot format combination of the plurality of slots. In an example, the wireless device may receive at least one uplink grant corresponding to one or more transport blocks of the plurality of transport blocks, where the one or more transport blocks are transmitted in the reference duration and the one or more transport blocks are associated with one or more HARQ processes. In an example, the wireless device may determine a new data indicator (NDI) value for at least one HARQ process of the one or more HARQ processes. In an example, the wireless device may determine a contention window value based on the NDI value. In an example, the wireless device may perform a listen before talk procedure based on the contention window value. In an example, the wireless device may transmit a transport block in response to the listen before talk procedure indicating a clear channel. In an example, the determining the reference duration may comprise determining a reference duration threshold based on the numerology. In an example, the determining the reference duration may comprise determining a first number of slots of the plurality of slots with an aggregated number of uplink resources having a duration equal to or greater than the reference duration threshold. In an example, the reference duration may span the first number of slots of the plurality of slots. In an example, the first number of slots may be contiguous slots. In an example, the determining the new data indicator (NDI) value for at least one HARQ process may comprise determining the new data indicator (NDI) value for at least one HARQ process is toggled. In an example, the determining the contention window value based on the NDI value may comprise one of: adjusting a contention window value to a minimum value in response to the NDI value being toggled; adjusting a contention window value to a larger value in response to the NDI value being not toggled; and keeping a contention window value constant in response to the contention window value being a maximum value and the NDI value being not toggled. In an example, the wireless device may receive from the gNB one or more messages comprising configuration parameters of a cell. The configuration parameters may comprise an indication of numerology and a lot format combination. In an example, the indication of numerology may comprise an indication of a sub-carrier spacing and a cyclic prefix. In an example, the slot format combination may comprise maximum channel occupancy time (MCOT) structure. In an example, the slot format combination may indicate each slot format in the plurality of slots. In an example, the slot format may comprise the self-contained slot with downlink and uplink resources. In an example, the reference duration may comprise at least one slot of the plurality of slots. In an example, the wireless device may transmit PUSCH, PUCCH and/or SRS according to the slot format of the plurality of slots.

Figure 33:
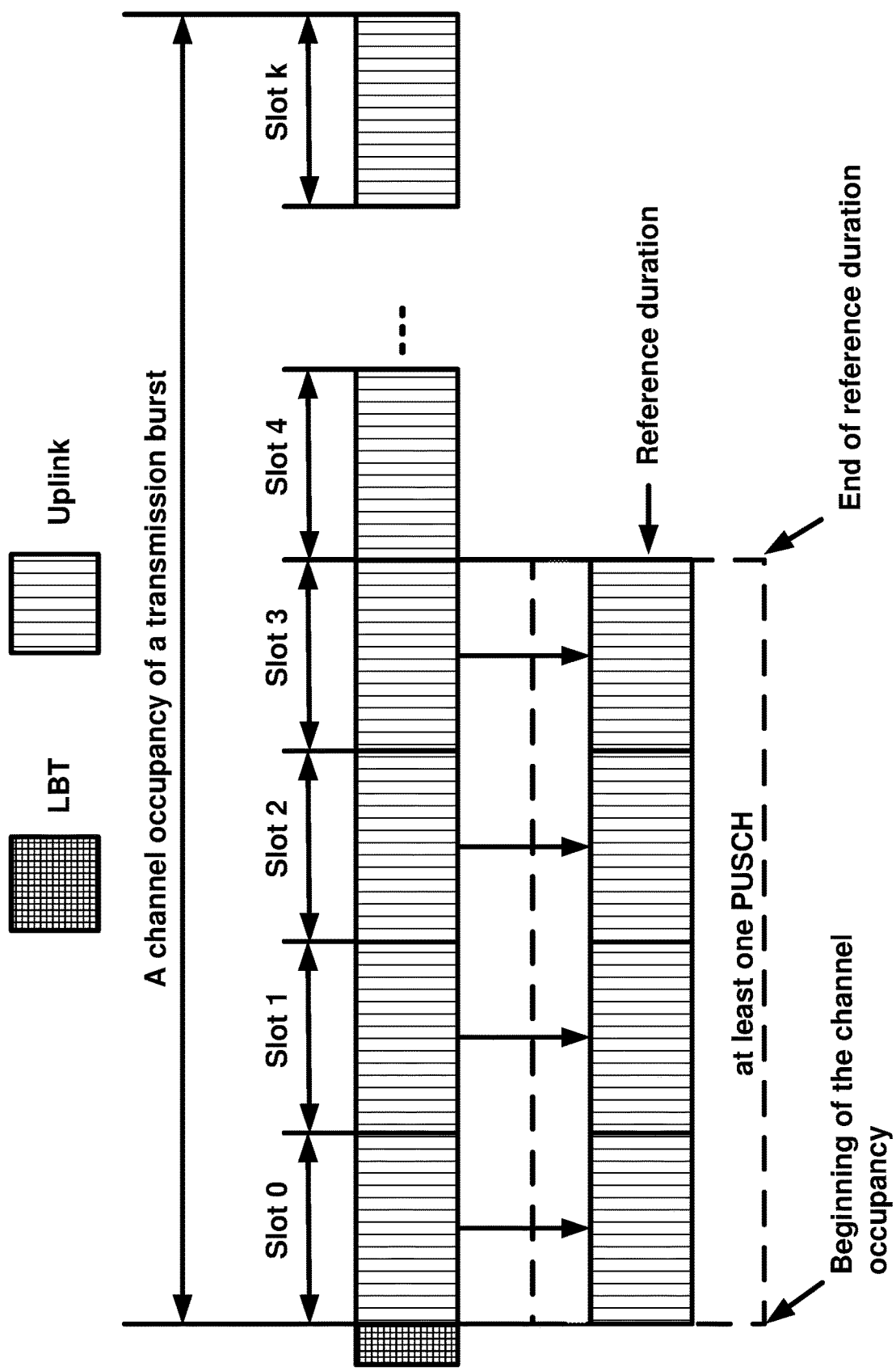
FIG. 33 is a diagram of an example uplink transmission with same numerology as per an aspect of an embodiment of the present disclosure.

FIG. 33 illustrates uplink transmission burst with a same numerology in accordance with embodiments of the present disclosure. As shown in FIG. 33, a plurality of slots with uplink resources, each slot associated with a respective index 0, 1, 2, . . . , k, may be transmitted in an MCOT/Burst for NR-U. In an example, k may be a positive integer. The plurality of the slots may be a most recent transmission before a wireless device receives a UL grant to perform a first LBT CAT4. Before transmission of the plurality of slots, the wireless device may perform a second LBT CAT4 and the output of the second LBT CAT4 may indicate an idle channel.

In an example, in the plurality of slots with index 0, 1, 2, . . . , k, the slot formats of the plurality slots may be same or different, which may depend on gNB configuration. A slot format combination may indicate slot formats of the plurality of slots. Each of the plurality of slots may be configured with a slot format. A wireless device may receive the slot format combination from a gNB to indicate the slot formats of the plurality of slots. A slot format of a slot may indicate a first number of OFDM symbols for a downlink transmission; a second number of OFDM symbols for an uplink transmission; and/or a third number of OFDM symbols for a flexible transmission. A length of the slot format combination in time domain may be equal to the length of an MCOT in terms of OFDM symbols. In an example, the slot format combination for NR-U may be different from a slot format combination defined for legacy licensed carriers. In an example, the slot format combination for NR-U may be predefined based on a slot format specified for a legacy licensed carrier. In an example, the slot format combination for NR-U may aggregate several slots with a slot format specified for a legacy licensed carrier.

In an example, a gNB may select and aggregate a slot format to form a slot format combination based on channel conditions and/or an interference environment on an unlicensed carrier. In another example, the gNB may select and aggregate several different slot formats to form the slot format combination based on channel conditions and/or an interference environment on an unlicensed carrier. The slot format combination for NR-U may be different from legacy slot format combination defined for licensed carriers. Based on the slot format combination and a numerology of the plurality of slots, a wireless device may determine slot formats of the plurality of slots. The wireless device may determine uplink resources of each slot and length in time domain associated with the uplink resources.

In an example, as shown in FIG. 33, a wireless device may determine a reference duration before performing an LBT CAT4. Based on a numerology and a slot format combination, the wireless device may determine uplink resources of each slot and a corresponding length in time domain for the uplink resources. In an example, the wireless device may determine a reference duration threshold. The reference duration threshold may be calculated based on the numerology. In an example, the reference duration threshold may be equal to $\alpha \cdot \frac{1}{2}^{\mu}$ ms. In an example, $\alpha$ may be a scale factor and determined via gNB configuration. In an example, $\mu$ is 0, 1, 2, 3 or 4, which may depend on gNB configuration. In an example, $\mu$ may be a numerology index associated with the numerology. The numerology may be defined with a sub-carrier spacing and a cyclic prefix in transmission.

In an example, a wireless device may determine a number of slots from the plurality of slots, wherein a duration of an aggregated number of uplink resources in the number of slots is equal to or greater than the reference duration threshold. In an example, in response to the determining, the wireless device may form the number of slots into a reference duration. In an example, the number of slots may be contiguous. In an example, the number of slots may be non-contiguous. In an example, the aggregated number of uplink resources may comprise PUSCH resources (e.g., one or more acknowledgement feedbacks corresponding to the PUSCH resources may be available for the wireless device). The reference duration may span the first number of slots of the plurality of slots. If one or more slots of the plurality of slots being configured without PUSCH resources (e.g., acknowledgement feedbacks corresponding to the PUSCH resources may be unavailable for the wireless device), the number of slots, formed into the reference duration, may comprise the one or more slots. If one or more slots of the plurality of slots being configured without PUSCH resources, the aggregated number of uplink resources may not comprise uplink resources of the one or more slots of the plurality of slots.

In an example, as shown in FIG. 33, the wireless device may determine that a duration of an aggregated number of uplink resources in first four slots (e.g., slot 0, 1, 2 and 3 in FIG. 33) of the plurality of slots is equal to or greater than the reference duration threshold (e.g., $\alpha \cdot \frac{1}{2}^{\mu}$ ms). In an example, in response to the determining, the wireless device may form the first four slots into a reference duration. In an example, the aggregated number of uplink resources may comprise PUSCH resources. In an example, If one slot of the plurality of slots being configured without PUSCH resources (e.g., slot 3 being configured without PUSCH resources), the number of slots which are formed into the reference duration, may further comprise slot 4 to meet the requirement that the aggregated number of uplink resources (PUSCH) may have a duration equal to or greater than the reference duration threshold (e.g., $\alpha \cdot \frac{1}{2}^{\mu}$ ms). In an example, if slot 4 is also configured without PUSCH, the number of slots which are formed into the reference duration may further comprise slot 5 until the aggregated number of uplink resources (PUSCH) may have a duration equal to or greater than the reference duration threshold (e.g., $\alpha \cdot \frac{1}{2}^{\mu}$ ms). The same rule may be applied to the following slots (e.g., slot 6, slot 7, etc.) for the wireless device to determine the reference duration. If one or more slots of the plurality of slots are configured without PUSCH in the reference duration, the aggregated number of uplink resources may not comprise the uplink resources of the one or more slots of the plurality of slots.

Figure 34:
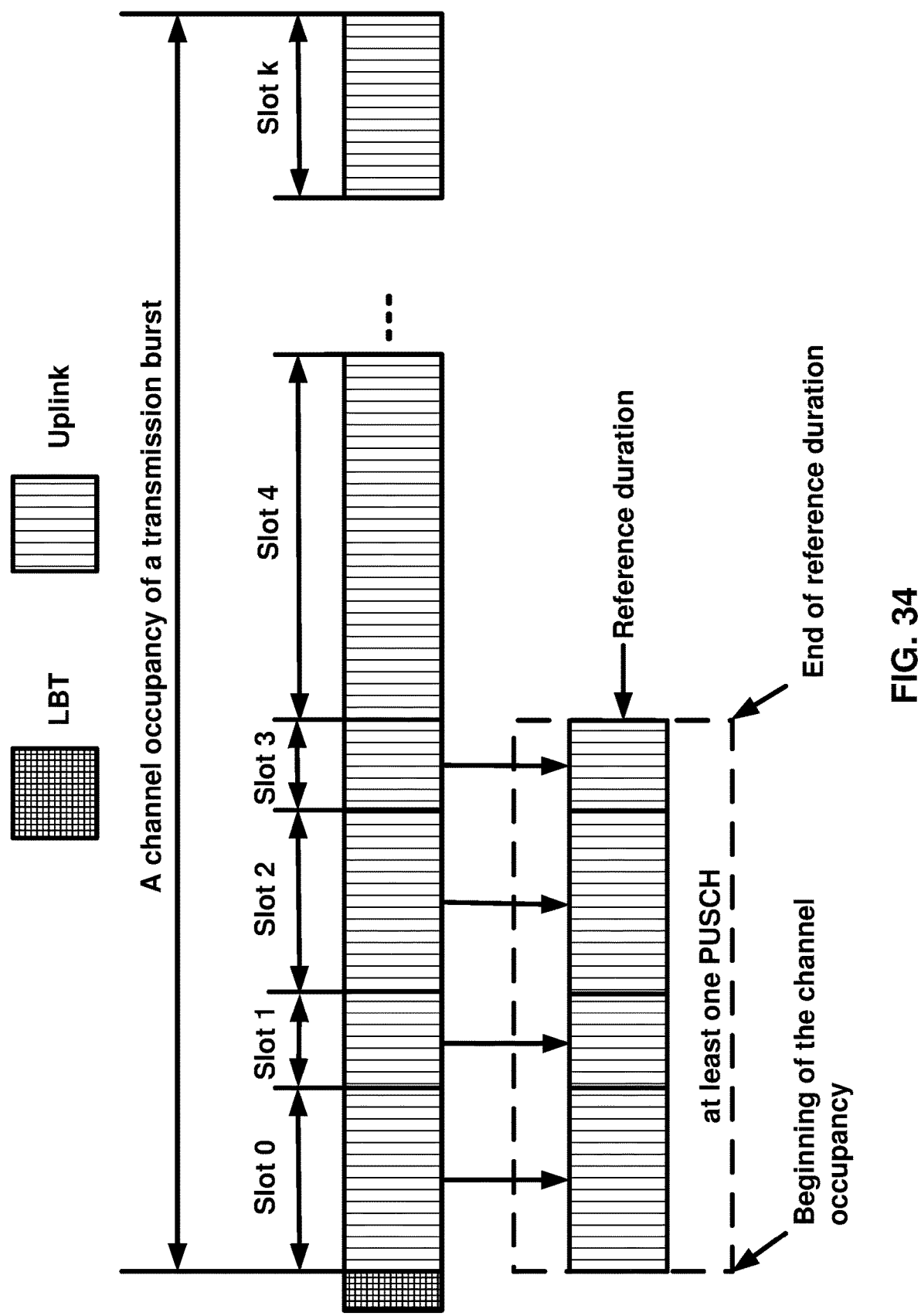
FIG. 34 is a diagram of an example uplink transmission with different numerologies as per an aspect of an embodiment of the present disclosure.

FIG. 34 illustrates uplink transmission burst with different numerologies in accordance with embodiments of the present disclosure. As shown in FIG. 34, a plurality of slots with uplink resources, each associated with a respective index 0, 1, 2, . . . , k, may be transmitted in an MCOT/Burst for NR-U. In an example, k may be a positive integer. The plurality of the slots may be a most recent transmission before a wireless device receives a UL grant to perform a first LBT CAT4. Before transmission of the plurality of slots, the wireless device may perform a second LBT CAT4 and the output of the second LBT CAT4 may indicate an idle channel.

In an example, as shown in FIG. 34, a wireless device may determine a reference duration before performing an LBT CAT4. Based on a numerology and a slot format combination, the wireless device may obtain uplink resources of each slot and a corresponding length in time domain for the uplink resources. In an example, the wireless device may determine a reference duration threshold. The reference duration threshold may be calculated based on a numerology. The plurality of slots may have multiple numerologies as shown in FIG. 34. In an example, the reference duration threshold may be equal to $\alpha \cdot \frac{1}{2}^{\mu^k}$ ms. In an example, $\alpha$ may be a scale factor and determined via the gNB configuration. In an example, $\mu^k$ is 0,1,2,3 or 4, which may depend on gNB configuration. In an example, $\mu^k$ may be a numerology index associated with a numerology with minimum sub-carrier spacing among the multiple configured numerologies for the plurality of slots. The numerology may be defined with a sub-carrier spacing and a cyclic prefix in transmission.

As shown in FIG. 34, a wireless device may determine that a duration of an aggregated number of uplink resources in first four slots (e.g., slot 0, 1, 2 and 3 in FIG. 34) of the plurality of slots is equal to or greater than the reference duration threshold (e.g., $\alpha \cdot \frac{1}{2}^{\mu^k}$ ms). In an example, in response to the determining, the wireless device may form the first four slots (e.g., slot0, slot1, slot2 and slot3) into a reference duration. In an example, the aggregated number of uplink resources may comprise PUSCH resources. If one slot of the plurality of slots being configured without PUSCH resources (e.g., slot 3 being configured without PUSCH resources), the number of slots which may be formed into the reference duration, may further comprise more slots (e.g., slot 4) to meet the requirement that the aggregated number of uplink resources (PUSCH) may have a duration equal to or greater than the reference duration threshold (e.g., $\alpha \cdot \frac{1}{2}^{\mu^k}$ ms). If slot 4 is configured without PUSCH, the number of slots which may be formed into the reference duration may further comprise slot 5 until the aggregated number of uplink resources (PUSCH) may have a duration equal to or greater than the reference duration threshold (e.g., $\alpha \cdot \frac{1}{2}^{\mu^k}$ ms). The same rule may be applied to the following slots (e.g., slot 6, slot 7, etc.) for the wireless device to determine the reference duration. If one or more slots of the plurality of slots being configured without PUSCH resources in the reference duration, the aggregated number of uplink resources (e.g., only with PUSCH) may not comprise the uplink resources of the one or more slots of the plurality of slots.

FIG. 22 illustrates example transmission/reception of RRC messages and downlink control information in accordance with embodiments of the present disclosure. As shown in FIG. 22, a gNB may transmit RRC messages, comprising slot format combination configuration and numerology configuration, to a wireless device. The gNB may transmit downlink control information (DCI) to the wireless device. The DCI may comprise a downlink grant (or downlink assignment), an uplink grant, and\or control information transmitted in a group common PDCCH. In response to receiving the DCI, the wireless device may determine MCOT\Burst structure based on slot format combination indication in the DCI.

As shown in FIG. 31, an example timeline of a procedure of a wireless device determining a reference duration and performing LBT is illustrated in accordance with embodiments of the present disclosure. As shown in FIG. 31, a gNB may transmit to a wireless device, one or more RRC messages comprising parameters of a slot format combination, a numerology indication, and BWPs configuration. The gNB may transmit downlink control information, comprising UL grant, DL grant and group common PDCCH, to the wireless device (e.g., at slot n). The wireless device may transmit a plurality of transport blocks to the gNB on a plurality of slots with one or more BPWs (e.g., at slot n+k). In an example, k may be indicated in downlink control information. In an example, k may be determined by the wireless device capability. In an example, k may be determined by the gNB configuration.

The wireless device may receive HARQ parameters corresponding to the plurality of transport blocks from the gNB. The wireless device may determine a reference duration based on a numerology and a slot format combination as discussed above in FIG. 33 and FIG. 34. The wireless device may determine a number of HARQ parameters for transport blocks of the plurality of transport blocks transmitted in the reference duration. In an example, the number of HARQ parameters may comprise new data indicator (NDI) values in a UL grant for transport blocks of the plurality of transport blocks transmitted in the reference duration. In an example, the number of HARQ parameters may comprise HARQ ACK/NACK feedbacks for transport blocks of the plurality of transport blocks transmitted in the reference duration.

In an example, a wireless device may determine one or more new data indicator (NDI) values in a UL grant corresponding to transport blocks of the plurality of transport blocks with one or more HARQ processes transmitted in the reference duration. In response to determining the number of new data indicator (NDI) values, the wireless device may adjust a contention window value to a minimum value when a new data indicator (NDI) value for at least one HARQ process of the one or more HARQ processes is toggled. The wireless device may adjust a contention window value to a larger value when a new data indicator (NDI) value for the one or more HARQ processes is not toggled. The wireless device may keep a contention window value to constant when a new data indicator (NDI) value for the one or more HARQ processes is not toggled and the contention window value is maximum. The wireless device may perform LBT based on the contention window value. The wireless device may transmit one or more transport blocks in response to the LBT procedure indicating a clear channel. The wireless device may transmit PUCCH, PUSCH and SRS to the gNB on uplink resources of the plurality of slots.

In an example, a wireless device may calculate a ratio of a first HARQ NACK to a sum of a second HARQ ACK and the first HARQ NACK feedbacks, corresponding to transport blocks of the plurality of transport blocks transmitted in the reference duration. In response to calculating the ratio of the first HARQ NACK to the sum of the second HARQ ACK and the first HARQ NACK feedbacks, the wireless device may adjust a contention window value to a larger value when the ratio being equal to or greater than a threshold. In an example, the wireless device may adjust a contention window value to a minimum value when the ratio being less than the threshold. In an example, the wireless device may keep a contention window value constant when the contention window value being a maximum value and the ratio being equal to or greater than the threshold. In an example, the threshold may a percentage value (e.g., 80%). The wireless device may perform LBT based on the contention window value. The wireless device may transmit one or more transport blocks in response to the LBT procedure indicating a clear channel. The wireless device may transmit PUCCH, PUSCH and SRS to the gNB on uplink resources of the plurality of slots.

FIG. 32 illustrates example of a follow chart for a wireless device determining a reference duration and performing LBT in accordance with embodiments of the present disclosure. In an example, as shown in FIG. 32, a wireless device may receive RRC messages to configure a numerology, a slot format combination and a BWP. The wireless device may receive downlink control information comprising DL grant, UL grant and GC-PDCCH from a gNB. The wireless device may transmit a plurality of transport blocks in a plurality of slots to the gNB. The wireless device may receive HARQ parameters, corresponding to the plurality of transport blocks, from the gNB. The wireless device may determine a reference duration based on the numerology and the slot format combination. The wireless device may determine a HARQ parameter value corresponding to one or more transport blocks transmitted in the reference duration. The wireless device may determine a contention window value based on the determined HARQ parameter value corresponding to transport blocks transmitted in the reference duration. The wireless device may perform LBT based on the determined contention window value. The wireless device may transmit transport blocks based on the output of successful LBT.

Figure 35:
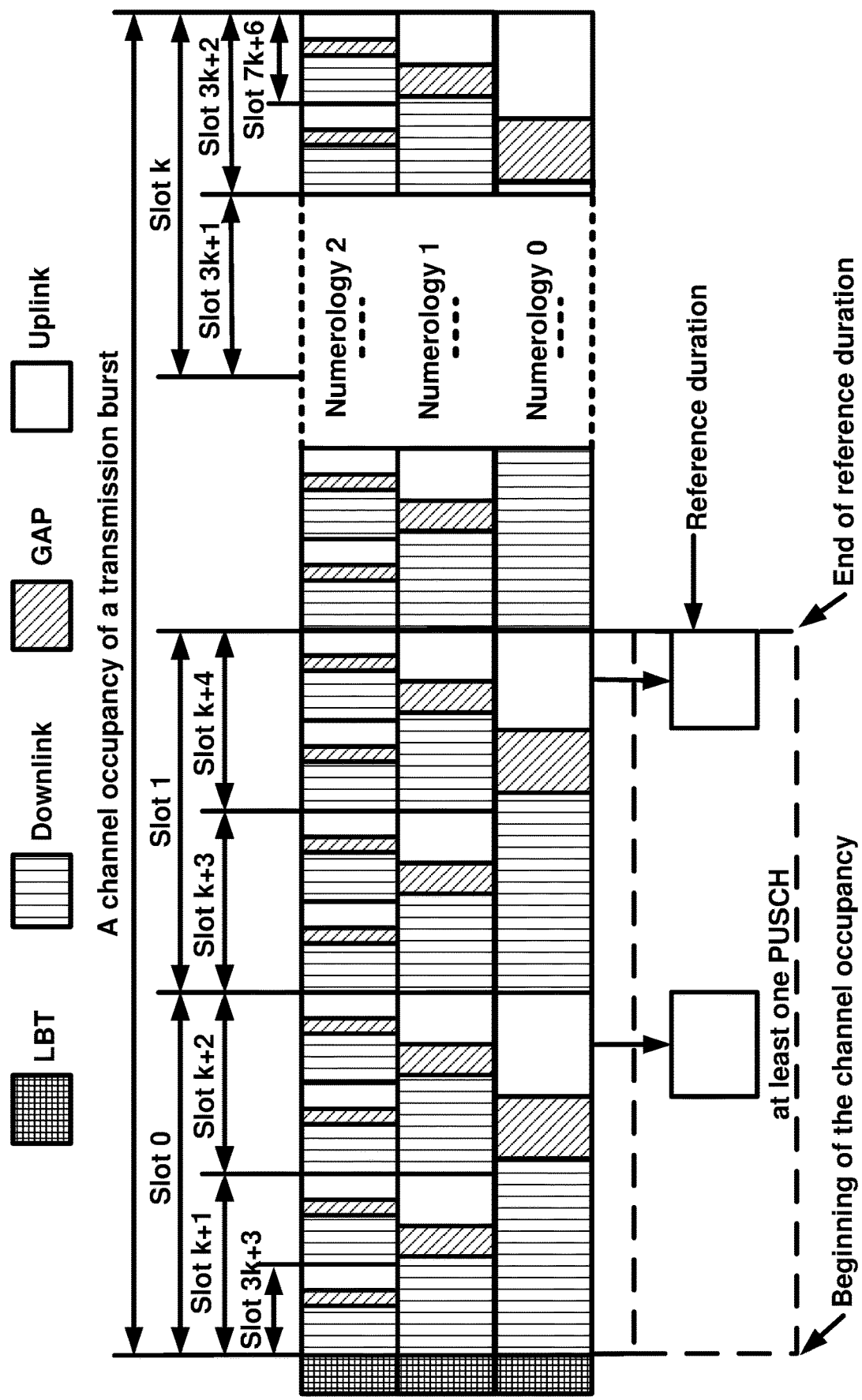
FIG. 35 is a diagram of an example downlink and uplink transmission with different numerologies as per an aspect of an embodiment of the present disclosure.

FIG. 35 illustrates downlink and uplink transmission with a same numerology in time domain and different numerologies in frequency domain in accordance with embodiments of the present disclosure. In an example, as shown in FIG. 35, three different numerologies (e.g., numerology 0, 1 and 2) may be used in three different BWPs/sub-bands and each may be with a different numerology. In an example, a sub-carrier spacing associated with numerology 2 may be larger than that of numerology 1. In an example, a sub-carrier spacing associated with numerology 1 may be larger than that of numerology 0. Numerology 0 may have a minimum sub-carrier spacing among the three configured numerologies. A plurality of slots with self-contained downlink and uplink resources, each associated with a respective index 0, 1, 2, . . . , k, k+1, k+2, k+3, . . . , 3k, 3k+1, 3k+2, 3k+3, . . . , 7k+6, may be transmitted in an MCOT/Burst for NR-U. In an example, k is a positive integer. The plurality of the slots may be a most recent transmission before a wireless device receives a UL grant to perform a first LBT CAT4 on at least one of the three BWPs/sub-bands. Before transmission of the plurality of slots, the wireless device may perform a second LBT CAT4 on at least one of the three BWPs/sub-bands in a gap and the output of the second LBT CAT4, on at least one of the three BWPs/sub-bands, may indicate an idle channel.

In an example, for slots associated with numerology 0 having index 0, 1, 2, . . . , k in the plurality of slots, slot formats of the slots may be same or different. For slots associated with numerology 1 having index k+1, k+2, . . . , 3k+2 in the plurality of slots, slot formats of the slots may be same or different. For slots associated with numerology 2 having index 3k+3, 3k+4, . . . , 7k+6 in the plurality of slots, slot formats of the slots may be same or different. Slot formats of the plurality of slots may depend on gNB configuration. A slot format combination may indicate slot format for each slot of the plurality of slots. A wireless device may receive the slot format combination from a gNB to indicate slot format for each slot of the plurality of slots. A slot format of a slot may indicate a first number of OFDM symbols for a downlink transmission; a second number of OFDM symbols for an uplink transmission; and/or a third number of OFDM symbols for a flexible transmission. A length of the slot format combination in the time domain may be equal to the length of an MCOT in terms of OFDM symbols. In an example, the slot format combination for NR-U may be different from a slot format combination defined for legacy licensed carriers. In an example, the slot format combination for NR-U may be predefined based on a slot format specified for a legacy licensed carrier. In an example, the slot format combination for NR-U may aggregate several slots with a slot format specified for a legacy licensed carrier.

In an example, a gNB may select and aggregate a slot format to form a slot format combination based on channel conditions and/or an interference environment on an unlicensed carrier. In another example, the gNB may select and aggregate several different slot formats to form the slot format combination based on channel conditions and/or an interference environment on an unlicensed carrier. The slot format combination for NR-U may be different from legacy slot format combination defined for licensed carriers. Based on the slot format combination and a numerology of the plurality of slots, a wireless device may determine slot formats of the plurality of slots. The wireless device may determine downlink resources of each slot and length in time domain associated with the downlink resources.

In an example, as shown in FIG. 35, a wireless device may determine a reference duration before performing an LBT CAT4 on at least one of the three configured BWPs/sub-bands. Based on a numerology and a slot format combination, the wireless device may determine uplink resources of each slot and a corresponding length in time domain for the uplink resources. In an example, the wireless device may determine a reference duration threshold. The reference duration threshold may be calculated based on a numerology. In an example, the reference duration threshold may be equal to $\alpha \cdot \frac{1}{2}^\mu$ ms. In an example, a may be a scale factor and determined via the gNB configuration. In an example, $\mu$ is 0,1,2,3 or 4, which may depend on gNB configuration. In an example, $\mu$ may be associated with a numerology, which may indicate a sub-carrier spacing and a cyclic prefix in transmission. In an example, $\mu$ may be a numerology index associated with the numerology with minimum sub-carrier spacing among the multiple configured numerologies. In an example, $\mu$ may be associated with a numerology configured for a BWP/sub-band, on which LBT CAT4 may be performed for transmission of the plurality of slots.

In an example, a wireless device may determine a number of slots from the plurality of slots with one of the three numerologies, wherein a duration of an aggregated number of uplink resources in the number of slots is equal to or greater than the reference duration threshold. In an example, in response to the determining, the wireless device may form the number of slots with one of the three configured numerologies into a reference duration. In an example, the number of slots formed into the reference duration may be slots in a numerology with minimum sub-carrier spacing (e.g., slots with numerology 0). In an example, the one of the three configured numerologies may be a numerology with an LBT CAT4 performed. In an example, the number of slots may be contiguous. In an example, the number of slots may be non-contiguous. In an example, the aggregated number of uplink resources may comprise PUSCH resources (e.g., one or more acknowledgement feedbacks corresponding to the PUSCH resources may be available for the wireless device). The reference duration may span the first number of slots of the plurality of slots with one of the three configured numerologies. If one or more slots of the plurality of slots, with one of the three configured numerologies, being configured without PUSCH resources (e.g., acknowledgement feedbacks corresponding to the PUSCH resources may be unavailable for the wireless device), the number of slots which are formed into the reference duration, may comprise the one or more slots. If one or more slots of the plurality of slots, with one of the three numerologies, being configured without PUSCH resources, the aggregated number of uplink resources may not comprise uplink resources of the one or more slots of the plurality of slots.

In an example, as shown in FIG. 35, a wireless device may determine that a duration of an aggregated number of uplink resources in first two slots (e.g., slot 0 and 1 in FIG. 35) of the plurality of slots, with numerology 0, is equal to or greater than the reference duration threshold (e.g., $\alpha \cdot \frac{1}{2}^\mu$ ms). In an example, the wireless device may form the first two slots with numerology 0 into the reference duration as shown in FIG. 35. In an example, numerology 0 may be associated with a minimum sub-carrier spacing among the multiple configured numerologies. In an example, an LBT CAT4 may be performed on a BPW/sub-band with numerology 0. In an example, the aggregated number of uplink resources may comprise PUSCH resources. If one slot of the two slots being configured without PUSCH resources (e.g., slot 1 being configured without PUSCH resources), the number of slots which are formed into the reference duration, may further comprise slot 2 to meet the requirement that the aggregated number of uplink resources (PUSCH) may have a duration equal to or greater than the reference duration threshold (e.g., $\alpha \cdot \frac{1}{2}^\mu$ ms). If slot 2 is also configured without PUSCH, the number of slots which are formed into the reference duration may further comprise slot 3 (e.g., k is larger than 3) until the aggregated number of uplink resources (PUSCH) may have a duration equal to or greater than the reference duration threshold (e.g., $\alpha \cdot \frac{1}{2}^\mu$ ms). The same rule may be applied to the following slots (e.g., slot 4, slot 5, etc.) for the wireless device to determine the reference duration. If one or more slots of the plurality of slots being configured without PUSCH resources in the reference duration, the aggregated number of uplink resources may not comprise the uplink resources of the one or more slots of the plurality of slots.

Figure 36:
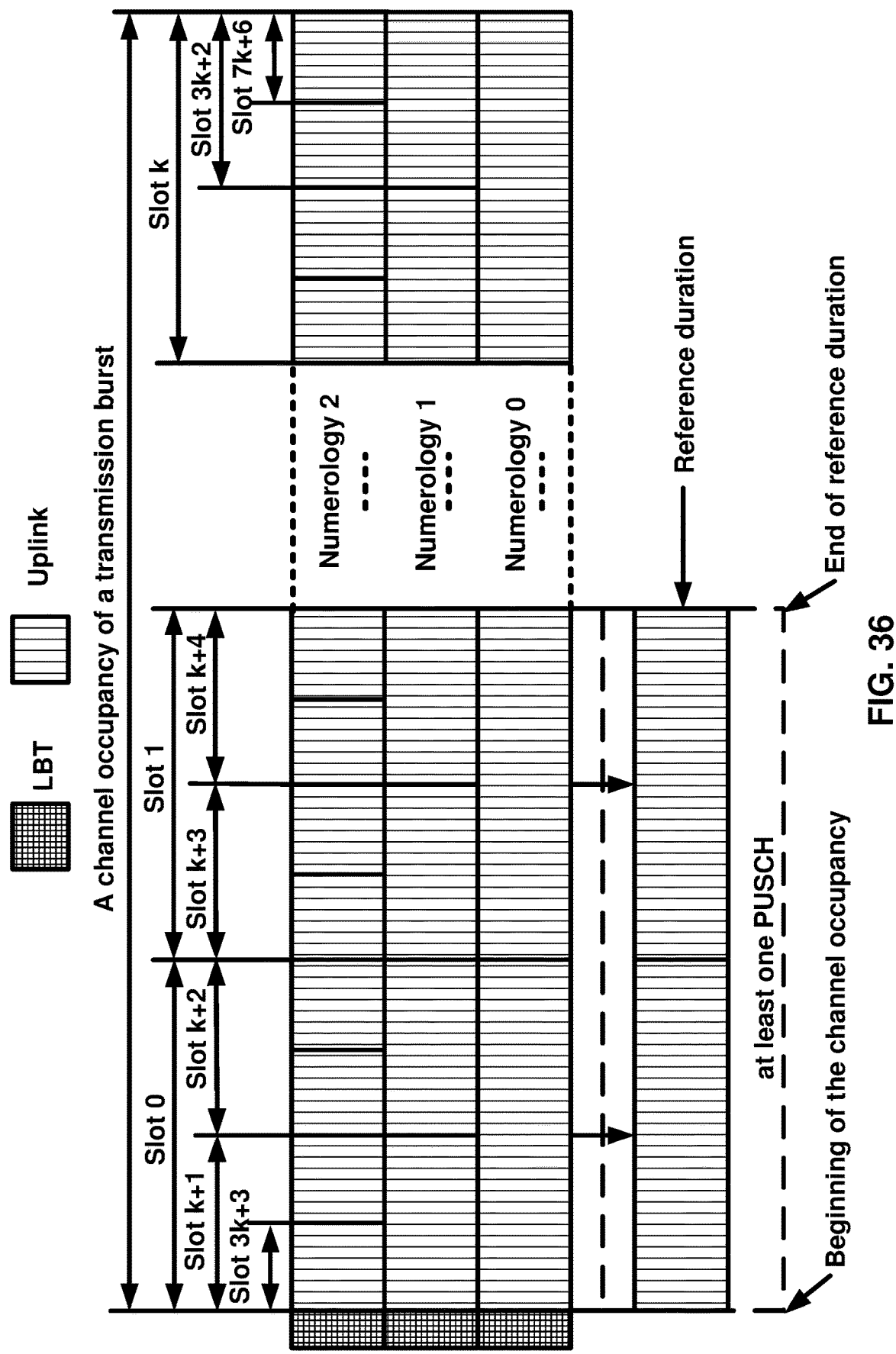
FIG. 36 is a diagram of an example uplink transmission with different numerologies as per an aspect of an embodiment of the present disclosure.

FIG. 36 illustrates uplink transmission burst with a same numerology in time domain and different numerologies in frequency domain in accordance with embodiments of the present disclosure. In an example, as shown in FIG. 36, three different numerologies (e.g., numerology 0, 1 and 2) may be used in three different BWPs/sub-bands and each may be with a different numerology. In an example, a sub-carrier spacing associated with numerology 2 may be larger than that of numerology 1. In an example, a sub-carrier spacing associated with numerology 1 may be larger than that of numerology 0. Numerology 0 may have a minimum sub-carrier spacing among the three configured numerologies. A plurality of slots with uplink resources, each associated with a respective index 0, 1, 2, . . . , k, k+1, k+2, k+3, . . . , 3k, 3k+1, 3k+2, 3k+3, . . . , 7k+6, may be transmitted in an MCOT/Burst for NR-U. In an example, k is a positive integer. The plurality of the slots may be a most recent transmission before a wireless device receives a UL grant to perform a first LBT CAT4 on at least one of the three BWPs/sub-bands. Before transmission of the plurality of slots, the wireless device may perform a second LBT CAT4 on at least one of the three BWPs/sub-bands and the output of the second LBT CAT4, on at least one of the three BWPs/sub-bands, may indicate an idle channel.

In an example, as shown in FIG. 36, a wireless device may determine a reference duration before performing an LBT CAT4 on at least one of the three configured BWPs/sub-bands. Based on a numerology and a slot format combination, the wireless device may determine uplink resources and a corresponding length in time domain for the uplink resources of each slot of the plurality of slots. In an example, the wireless device may determine a reference duration threshold. The reference duration threshold may be calculated based on a numerology. In an example, the reference duration threshold may be equal to $\alpha \cdot \frac{1}{2}^{\mu^k}$ ms. In an example, $\alpha$ may be a scale factor and determined via gNB configuration. In an example, $\mu^k$ is 0,1,2,3 or 4, which may depend on gNB configuration. In an example, $\mu^k$ may be a numerology index associated with a numerology with minimum sub-carrier spacing among the multiple configured numerologies for the plurality of slots. In an example, $\mu^k$ may be associated with a numerology configured for a BWP/sub-band, on which an LBT CAT4 may be performed for transmission of the plurality of slots. The numerology may be defined with a sub-carrier spacing and a cyclic prefix in transmission.

In an example, as shown in FIG. 36, a wireless device may determine that a duration of an aggregated number of uplink resources in first two slots (e.g., slot 0 and 1 in FIG. 36) of the plurality of slots, with numerology 0, is equal to or greater than the reference duration threshold (e.g., $\alpha \cdot \frac{1}{2}^{\mu^k}$ ms). In an example, in response to the determining, the wireless device may form the first two slots (e.g., slot0 and slot1) with numerology 0 into a reference duration. In an example, numerology 0 may have a minimum sub-carrier spacing. In an example, an LBT CAT4 may be performed on a BPW/sub-band with numerology 0. In an example, the aggregated number of uplink resources may comprise PUSCH resources. If one slot of the two slots being configured without PUSCH resources (e.g., slot 1 being configured without PUSCH resources), the number of slots which are formed into the reference duration, may further comprise slot 2 (e.g., k is larger than 2) to meet the requirement that the aggregated number of uplink resources (PUSCH) may have a duration equal to or greater than the reference duration threshold (e.g., $\alpha \cdot \frac{1}{2}^{\mu^k}$ ms). If slot 2 is also configured without PUSCH, the number of slots which are formed into the reference duration may further comprise slot 3 (e.g., k is larger than 3) until the aggregated number of uplink resources (PUSCH) may have a duration equal to or greater than the reference duration threshold (e.g., $\alpha \cdot \frac{1}{2}^{\mu^k}$ ms). The same rule may be applied to the following slots (e.g., slot 4, slot 5, etc.) for the wireless device to determine the reference duration. If one or more slots with numerology 0 of the plurality of slots being configured without PUSCH resources in the reference duration, the aggregated number of uplink resources may not comprise the uplink resources of the one or more slots with numerology 0 of the plurality of slots.

FIG. 22 illustrates example transmission/reception of RRC messages and downlink control information in accordance with embodiments of the present disclosure. FIG. 31 illustrates an example timeline of a procedure of a wireless device determining a reference duration and performing LBT is illustrated in accordance with embodiments of the present disclosure. FIG. 32 illustrates example of a follow chart for a wireless device determining a reference duration and performing LBT in accordance with embodiments of the present disclosure. As discussed above, FIG. 22, FIG. 31 and FIG. 32 are also applied with FIG. 35 and FIG. 36.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 37:
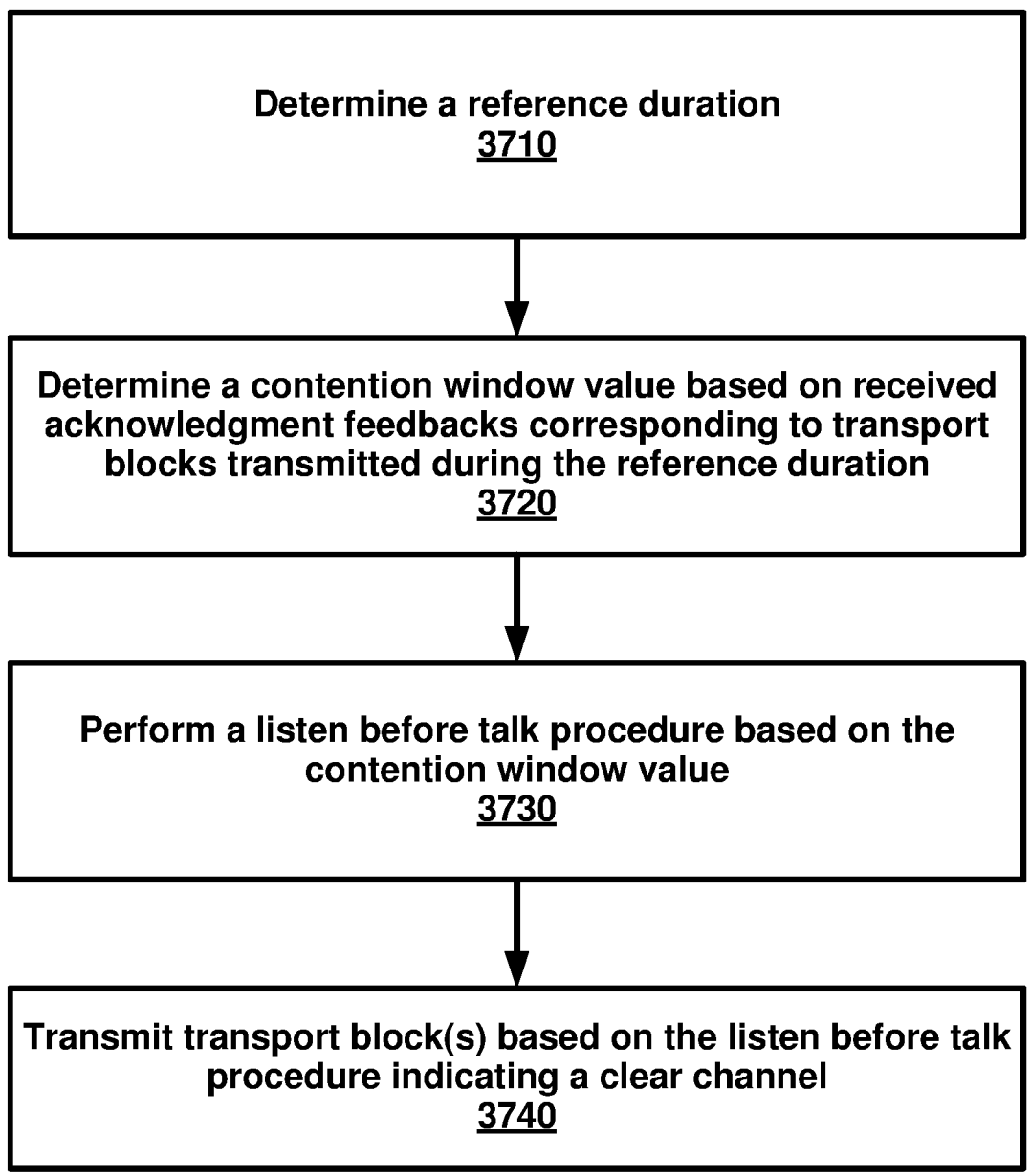
FIG. 37 is a flow diagram of an aspect of an example embodiment of the present disclosure.

FIG. 37 is a flow diagram as per an aspect of an example embodiment of the present disclosure. At 3710, a base station may determine a reference duration. t 3720, the base station may determine a contention window value based on received acknowledgment feedbacks corresponding to transport blocks transmitted during the reference duration. At 3730, the base station may perform a listen before talk procedure based on the contention window value. At 3740, the base station may transmit one or more transport blocks based on the listen before talk procedure indicating a clear channel.

According to an example embodiment, a flow diagram as per an aspect of an example embodiment of the present disclosure. A base station may determine a reference duration. The determination may be based a numerology. The base station may determine a reference duration based a slot format combination of a plurality of slots. The base station may determine a contention window value based on received acknowledgment feedbacks corresponding to transport blocks transmitted during the reference duration. The base station may perform a listen before talk procedure based on the contention window value. The base station may transmit one or more transport blocks based on the listen before talk procedure indicating a clear channel.

Figure 38:
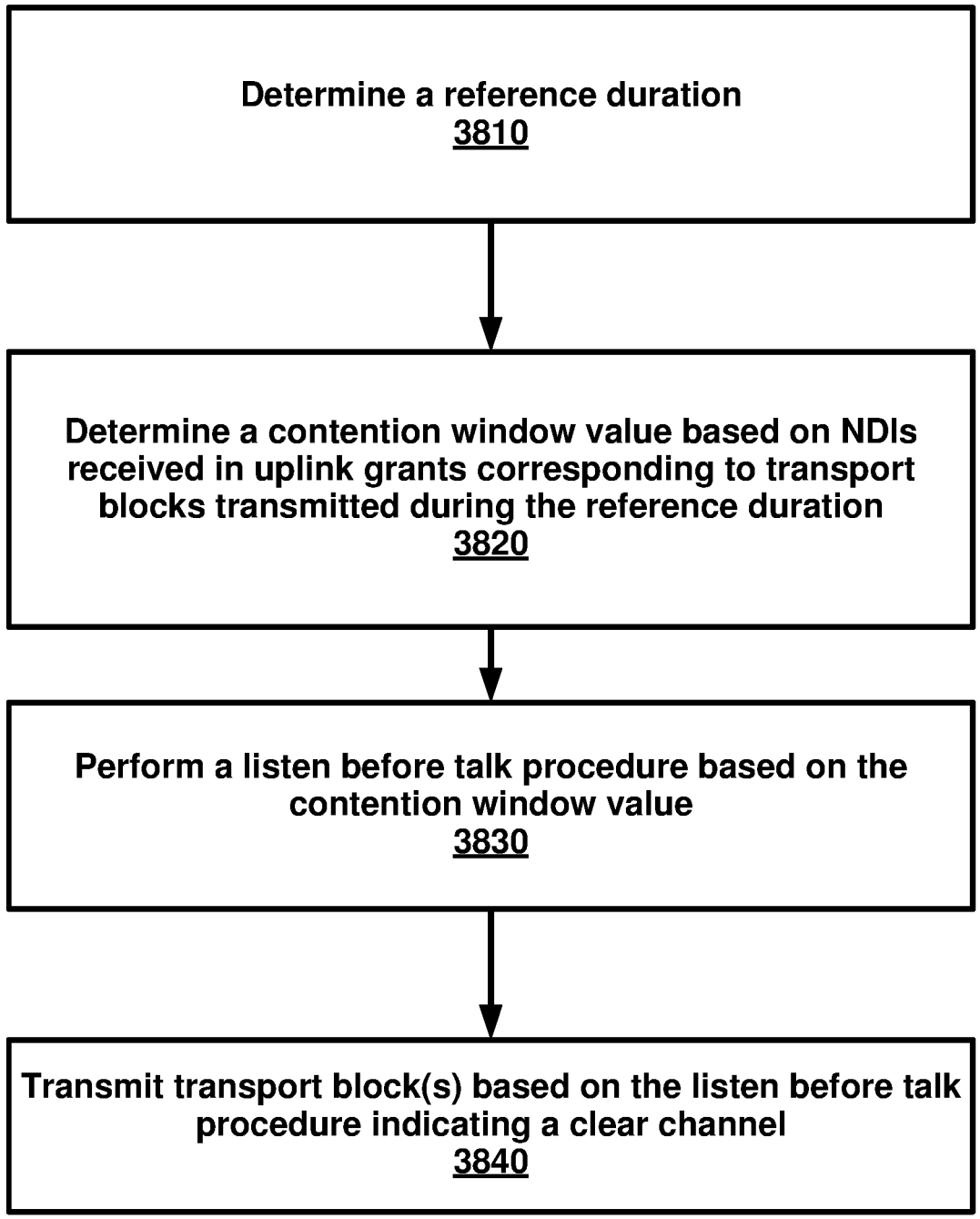
FIG. 38 is a flow diagram of an aspect of an example embodiment of the present disclosure.

FIG. 38 is a flow diagram as per an aspect of an example embodiment of the present disclosure. At 3810, a reference duration for contention window adjustment may be determined. At 3820, a contention window value may be determined based on a plurality of new data indicators (NDIs) received in a plurality of uplink grants corresponding to a plurality of first transport blocks transmitted by the wireless device during the reference duration. At 3830, the wireless device may perform a listen before talk procedure based on the contention window value. At 3840, one or more second transport blocks may be transmitted based on the listen before talk procedure indicating a clear channel.

According to an example embodiment, a wireless device may determine a reference duration. The reference duration may be for a plurality of slots based on a numerology. The wireless device may determine a reference duration for a plurality of slots based on a slot format combination. The wireless device may determine a contention window value based on a plurality of new data indicators (NDIs) received in a plurality of uplink grants corresponding to a plurality of transport blocks transmitted by the wireless device during the reference duration. The wireless device may perform a listen before talk procedure based on the contention window value. The wireless device may transmit one or more transport blocks based on the listen before talk procedure indicating a clear channel.

According to an example embodiment, a base station may determine a reference duration based on a numerology. The base station may determine a reference duration based on a slot format combination of a plurality of slots. The base station may determine a first number of received negative acknowledgment (NACK) feedbacks corresponding to a plurality of transport blocks transmitted during the reference duration. The base station may determine a second number of received positive acknowledgment (ACK) feedbacks corresponding to the plurality of transport blocks transmitted during the reference duration. The base station may determine a contention window value based on the first number of received NACK feedbacks and the second number of received ACK feedbacks. The base station may perform a listen before talk procedure based on the contention window value. The base station may transmit one or more transport blocks based on the listen before talk procedure indicating a clear channel.

According to an example embodiment, the determining the reference duration may comprise determining a reference duration threshold based on the numerology. According to an example embodiment, the determining the reference duration may comprise determining a first number of slots of the plurality of slots with aggregated downlink resources having a duration equal to or greater than the reference duration threshold. According to an example embodiment, the reference duration may span a second number of slots of the plurality of slots. According to an example embodiment, the second number of slots may be multiple contiguous slots from the beginning of the plurality of slots. According to an example embodiment, the determining the contention window value based on the first number of received NACK feedbacks and the second number of received ACK feedbacks may comprise determining the contention window value based on a ratio of the first number of received NACK feedbacks to a sum of the first number of received NACK feedbacks and the second number of received ACK feedbacks. According to an example embodiment, the determining the contention window value based on the ratio may comprise adjusting the contention window value to a larger value in response to the ratio being equal to or greater than a threshold. According to an example embodiment, the determining the contention window value based on the ratio may comprise adjusting the contention window value to a minimum value in response to the ratio being less than a threshold. According to an example embodiment, the determining the contention window value based on the ratio may comprise keeping the contention window value constant in response to: the contention window value being a maximum value, and the ratio being equal to or greater than a threshold. According to an example embodiment, the first number of received NACK feedbacks and the second number of received ACK feedbacks may comprise ACK feedbacks and NACK feedbacks received from one or more wireless devices. According to an example embodiment, the base station may transmit, to a wireless device, one or more messages comprising configuration parameters of a cell. The configuration parameters may indicate at least one of: the numerology, and a plurality of slot format combinations comprising the slot format combination. According to an example embodiment, the numerology may comprise a sub-carrier spacing and a cyclic prefix. According to an example embodiment, the slot format combination may comprise a channel occupancy time (COT) structure. According to an example embodiment, the slot format combination may comprise slot format for each slot in the plurality of slots. According to an example embodiment, the slot format may comprise a slot format with a downlink resource. According to an example embodiment, the slot format may comprise a slot format with an uplink resource. According to an example embodiment, the reference duration may comprise multiple slots of the plurality of slots. According to an example embodiment, the multiple slots may comprise multiple slots. The multiple slots may comprise multiple mini-slots. According to an example embodiment, the base station may receive transport blocks via a physical uplink shared channel based on the slot format combination of the plurality of slots. According to an example embodiment, the first number of received NACK feedbacks and the second number of received ACK feedbacks may comprise NACK feedbacks and ACK feedbacks received via a physical uplink control channel. According to an example embodiment, the first number of received NACK feedbacks and the second number of received ACK feedbacks may comprise NACK feedbacks and ACK feedbacks received via a physical uplink shared channel.

According to an example embodiment, a base station may determine a reference duration based on a numerology. The base station may determine a reference duration based on a slot format combination of a plurality of slots. The base station may determine a contention window value based on a first number of received negative acknowledgment feedbacks and a second number of received positive acknowledgment feedbacks corresponding to a plurality of transport blocks transmitted during the reference duration. The base station may perform a listen before talk procedure based on the contention window value. The base station may transmit one or more transport blocks based on the listen before talk procedure indicating a clear channel.

According to an example embodiment, a base station may determine a reference duration based on a numerology. The base station may determine a reference duration based on a slot format combination of a plurality of slots. The base station may determine a contention window value based on received acknowledgment feedbacks corresponding to transport blocks transmitted during the reference duration. The base station may perform a listen before talk procedure based on the contention window value. The base station may transmit one or more transport blocks based on the listen before talk procedure indicating a clear channel.

According to an example embodiment, a base station may determine a reference duration for a cell with a plurality of numerologies based on a numerology. The base station may determine a reference duration for a cell with a plurality of numerologies based on a slot format combination of a plurality of slots. The numerology may comprise a minimum sub-carrier spacing in the plurality of numerologies. The base station may determine a first number of received negative acknowledgment (NACK) feedbacks and a second number of received positive acknowledgment (ACK) feedbacks corresponding to a plurality of transport blocks transmitted during the reference duration. The base station may determine a contention window value based on the first number of received NACK feedbacks and the second number of received ACK feedbacks. The base station may perform a listen before talk procedure based on the contention window value. The base station may transmit one or more transport blocks based on the listen before talk procedure indicating a clear channel.

According to an example embodiment, the determining the reference duration may comprise determining a reference duration threshold based on the numerology. According to an example embodiment, the determining the reference duration may comprise determining a first number of slots of the plurality of slots with aggregated downlink resources having a duration equal to or greater than the reference duration threshold. According to an example embodiment, the reference duration may span a second number of slots of the plurality of slots. According to an example embodiment, the second number of slots may be multiple contiguous slots from the beginning of the plurality of slots. According to an example embodiment, the determining the contention window value based on the first number of received NACK feedbacks and the second number of received ACK feedbacks may comprise determining the contention window value based on a ratio of the first number of received NACK feedbacks to a sum of the first number of received NACK feedbacks and the second number of received ACK feedbacks. According to an example embodiment, the determining the contention window value based on the ratio may comprise adjusting the contention window value to a larger value in response to the ratio being equal to or greater than a threshold. According to an example embodiment, the determining the contention window value based on the ratio may comprise adjusting the contention window value to a minimum value in response to the ratio being less than a threshold. According to an example embodiment, the determining the contention window value based on the ratio may comprise keeping the contention window value constant in response to: the contention window value being a maximum value, and the ratio being equal to or greater than a threshold. According to an example embodiment, the first number of received NACK feedbacks and the second number of received ACK feedbacks may comprise ACK feedbacks and NACK feedbacks received from one or more wireless devices. According to an example embodiment, the base station may transmit, to a wireless device, one or more messages comprising configuration parameters of a cell. The configuration parameters may indicate at least one of: the numerology, and a plurality of slot format combinations comprising the slot format combination. According to an example embodiment, the numerology may comprise a sub-carrier spacing and a cyclic prefix. According to an example embodiment, the slot format combination may comprise a channel occupancy time (COT) structure. According to an example embodiment, the slot format combination may comprise slot format for each slot in the plurality of slots. According to an example embodiment, the slot format may comprise a slot format with a downlink resource. According to an example embodiment, the slot format may comprise a slot format with an uplink resource. According to an example embodiment, the reference duration may comprise multiple slots of the plurality of slots. According to an example embodiment, the multiple slots may comprise multiple slots. The multiple slots may comprise multiple mini-slots. According to an example embodiment, the base station may receive transport blocks via a physical uplink shared channel based on the slot format combination of the plurality of slots. According to an example embodiment, the first number of received NACK feedbacks and the second number of received ACK feedbacks may comprise NACK feedbacks and ACK feedbacks received via a physical uplink control channel. According to an example embodiment, the first number of received NACK feedbacks and the second number of received ACK feedbacks may comprise NACK feedbacks and ACK feedbacks received via a physical uplink shared channel.

According to an example embodiment, a base station may determine a reference duration for a plurality of cells with a plurality of numerologies based on one or more of: a numerology, and a slot format combination of a plurality of slots. The numerology may comprise a minimum sub-carrier spacing in the plurality of cells with the plurality of numerologies. The base station may determine a first number of received negative acknowledgment (NACK) feedbacks and a second number of received positive acknowledgment (ACK) feedbacks corresponding to a plurality of transport blocks transmitted during the reference duration. The base station may determine a contention window value based on the first number of received NACK feedbacks and the second number of received ACK feedbacks. The base station may perform a listen before talk procedure based on the contention window value. The base station may transmit one or more transport blocks based on the listen before talk procedure indicating a clear channel.

According to an example embodiment, the determining the reference duration may comprise determining a reference duration threshold based on the numerology. According to an example embodiment, the determining the reference duration may comprise determining a first number of slots of the plurality of slots with aggregated downlink resources having a duration equal to or greater than the reference duration threshold. According to an example embodiment, the reference duration may span a second number of slots of the plurality of slots. According to an example embodiment, the second number of slots may be multiple contiguous slots from the beginning of the plurality of slots. According to an example embodiment, the determining the contention window value based on the first number of received NACK feedbacks and the second number of received ACK feedbacks may comprise determining the contention window value based on a ratio of the first number of received NACK feedbacks to a sum of the first number of received NACK feedbacks and the second number of received ACK feedbacks. According to an example embodiment, the determining the contention window value based on the ratio may comprise adjusting the contention window value to a larger value in response to the ratio being equal to or greater than a threshold. According to an example embodiment, the determining the contention window value based on the ratio may comprise adjusting the contention window value to a minimum value in response to the ratio being less than a threshold. According to an example embodiment, the determining the contention window value based on the ratio may comprise keeping the contention window value constant in response to: the contention window value being a maximum value, and the ratio being equal to or greater than a threshold. According to an example embodiment, the first number of received NACK feedbacks and the second number of received ACK feedbacks may comprise ACK feedbacks and NACK feedbacks received from one or more wireless devices. According to an example embodiment, the base station may transmit, to a wireless device, one or more messages comprising configuration parameters of a cell. The configuration parameters may indicate at least one of: the numerology, and a plurality of slot format combinations comprising the slot format combination. According to an example embodiment, the numerology may comprise a sub-carrier spacing and a cyclic prefix. According to an example embodiment, the slot format combination may comprise a channel occupancy time (COT) structure. According to an example embodiment, the slot format combination may comprise slot format for each slot in the plurality of slots. According to an example embodiment, the slot format may comprise a slot format with a downlink resource. According to an example embodiment, the slot format may comprise a slot format with an uplink resource. According to an example embodiment, the reference duration may comprise multiple slots of the plurality of slots. According to an example embodiment, the multiple slots may comprise multiple slots. The multiple slots may comprise multiple mini-slots. According to an example embodiment, the base station may receive transport blocks via a physical uplink shared channel based on the slot format combination of the plurality of slots. According to an example embodiment, the first number of received NACK feedbacks and the second number of received ACK feedbacks may comprise NACK feedbacks and ACK feedbacks received via a physical uplink control channel. According to an example embodiment, the first number of received NACK feedbacks and the second number of received ACK feedbacks may comprise NACK feedbacks and ACK feedbacks received via a physical uplink shared channel.

According to an example embodiment, a wireless device may receive one or more messages comprising configuration parameters of a cell. The configuration parameters may comprise at least one first parameter indicating a numerology for the cell. The configuration parameters may comprise at least one second parameter indicating a plurality of slot format combinations. According to an example embodiment, the wireless device may receive a downlink control information indicating a slot format combination of the plurality of slot format combinations. According to an example embodiment, the wireless device may determine a reference duration for a plurality of slots based on the numerology. The wireless device may determine a reference duration for a plurality of slots based on the slot format combination. The wireless device may determine a contention window value based on a plurality of new data indicators (NDIs) received in a plurality of uplink grants corresponding to a plurality of transport blocks transmitted by the wireless device during the reference duration. The wireless device may perform a listen before talk procedure based on the contention window value. The wireless device may transmit one or more transport blocks based on the listen before talk procedure indicating a clear channel.

According to an example embodiment, the determining the reference duration may comprise determining a reference duration threshold based on the numerology. According to an example embodiment, the determining the reference duration may comprise determining a first number of slots of the plurality of slots with aggregated uplink resources having a duration equal to or greater than the reference duration threshold. According to an example embodiment, the reference duration may span a second number of slots of the plurality of slots. According to an example embodiment, the second number of slots may be multiple contiguous slots from the beginning of the plurality of slots. According to an example embodiment, the NDI may indicate a positive acknowledge (ACK) or a negative acknowledge (NACK). According to an example embodiment, the determining the contention window value based on the plurality of NDIs may comprise determining the contention window value based on a first number of NACK feedbacks and a second number of ACK feedbacks associated with the plurality of NDIs. According to an example embodiment, the determining the contention window value based on the first number of received NACK feedbacks and the second number of received ACK feedbacks may comprise determining the contention window value based on a ratio of the first number of received NACK feedbacks to a sum of the first number of received NACK feedbacks and the second number of received ACK feedbacks. According to an example embodiment, the determining the contention window value based on the ratio may comprise adjusting the contention window value to a larger value in response to the ratio being equal to or greater than a threshold. According to an example embodiment, the determining the contention window value based on the ratio may comprise adjusting the contention window value to a minimum value in response to the ratio being less than a threshold. According to an example embodiment, the determining the contention window value based on the ratio may comprise keeping the contention window value constant in response to: the contention window value being a maximum value, and the ratio being equal to or greater than a threshold. According to an example embodiment, the numerology may comprise a sub-carrier spacing and a cyclic prefix. According to an example embodiment, the slot format combination may comprise a channel occupancy time (COT) structure. According to an example embodiment, the slot format combination may comprise slot format for each slot in the plurality of slots. According to an example embodiment, the slot format may comprise a slot format with a downlink resource. The slot format may comprise a slot format with an uplink resource. According to an example embodiment, the reference duration may comprise multiple slots of the plurality of slots. According to an example embodiment, the multiple slots may comprise multiple slots. The multiple slots may comprise multiple mini-slots. According to an example embodiment, the wireless device may receive transport blocks via a physical downlink shared channel based on the slot format combination. According to an example embodiment, the plurality of uplink grants may be transmitted via a physical downlink control channel of a plurality of slots with downlink resources. According to an example embodiment, the performing the listen before talk procedure based on the contention window value may comprise performing the listen before talk procedure with a contention window size as the contention window value.

According to an example embodiment, a wireless device may receive a downlink control information indicating a slot format combination of a plurality of slot format combinations. According to an example embodiment, the wireless device may determine a reference duration for a plurality of slots based on one or more of: a numerology, and the slot format combination. The wireless device may determine a contention window value based on a plurality of new data indicators (NDIs) received in a plurality of uplink grants corresponding to a plurality of transport blocks transmitted by the wireless device during the reference duration. The wireless device may perform a listen before talk procedure based on the contention window value. The wireless device may transmit one or more transport blocks based on the listen before talk procedure indicating a clear channel.

According to an example embodiment, the wireless device may determine a reference duration for a plurality of slots based on one or more of: a numerology, and a slot format combination. The wireless device may determine a contention window value based on a plurality of new data indicators (NDIs) received in a plurality of uplink grants corresponding to a plurality of transport blocks transmitted by the wireless device during the reference duration. The wireless device may perform a listen before talk procedure based on the contention window value. The wireless device may transmit one or more transport blocks based on the listen before talk procedure indicating a clear channel.

According to an example embodiment, a wireless device may receive one or more messages comprising configuration parameters of a cell. The configuration parameters may comprise at least one first parameter indicating a plurality of numerologies for the cell, and at least one second parameter indicating a plurality of slot format combinations. According to an example embodiment, the wireless device may receive a downlink control information indicating a slot format combination of the plurality of slot format combinations. According to an example embodiment, the wireless device may determine a reference duration for a plurality of slots based on one or more of: the numerology, and the slot format combination. The numerology may comprise a minimum sub-carrier spacing in the plurality of numerologies of the cell. The wireless device may determine a contention window value based on a plurality of new data indicators (NDIs) received in a plurality of uplink grants corresponding to a plurality of transport blocks transmitted by the wireless device during the reference duration. The wireless device may perform a listen before talk procedure based on the contention window value. The wireless device may transmit one or more transport blocks based on the listen before talk procedure indicating a clear channel.

According to an example embodiment, the determining the reference duration may comprise determining a reference duration threshold based on the numerology. According to an example embodiment, the determining the reference duration may comprise determining a first number of slots of the plurality of slots with aggregated uplink resources having a duration equal to or greater than the reference duration threshold. According to an example embodiment, the reference duration may span a second number of slots of the plurality of slots. According to an example embodiment, the second number of slots may be multiple contiguous slots from the beginning of the plurality of slots. According to an example embodiment, the NDI may indicate a positive acknowledge (ACK) or a negative acknowledge (NACK). According to an example embodiment, the determining the contention window value based on the plurality of NDIs may comprise determining the contention window value based on a first number of NACK feedbacks and a second number of ACK feedbacks associated with the plurality of NDIs. According to an example embodiment, the determining the contention window value based on the first number of received NACK feedbacks and the second number of received ACK feedbacks may comprise determining the contention window value based on a ratio of the first number of received NACK feedbacks to a sum of the first number of received NACK feedbacks and the second number of received ACK feedbacks. According to an example embodiment, the determining the contention window value based on the ratio may comprise adjusting the contention window value to a larger value in response to the ratio being equal to or greater than a threshold. According to an example embodiment, the determining the contention window value based on the ratio may comprise adjusting the contention window value to a minimum value in response to the ratio being less than a threshold. According to an example embodiment, the determining the contention window value based on the ratio may comprise keeping the contention window value constant in response to: the contention window value being a maximum value, and the ratio being equal to or greater than a threshold. According to an example embodiment, the numerology may comprise a sub-carrier spacing and a cyclic prefix. According to an example embodiment, the slot format combination may comprise a channel occupancy time (COT) structure. According to an example embodiment, the slot format combination may comprise slot format for each slot in the plurality of slots. According to an example embodiment, the slot format may comprise a slot format with a downlink resource. The slot format may comprise a slot format with an uplink resource. According to an example embodiment, the reference duration may comprise multiple slots of the plurality of slots. According to an example embodiment, the multiple slots may comprise multiple slots. The multiple slots may comprise multiple mini-slots. According to an example embodiment, the wireless device may receive transport blocks via a physical downlink shared channel based on the slot format combination. According to an example embodiment, the plurality of uplink grants may be transmitted via a physical downlink control channel of a plurality of slots with downlink resources. According to an example embodiment, the performing the listen before talk procedure based on the contention window value may comprise performing the listen before talk procedure with a contention window size as the contention window value.

According to an example embodiment, a wireless device may receive one or more messages comprising configuration parameters of a plurality of cells. The configuration parameters may comprise at least one first parameter indicating a plurality of numerologies for the plurality of cells. The configuration parameters may comprise at least one second parameter indicating a plurality of slot format combinations. According to an example embodiment, the wireless device may receive at least one downlink control information indicating one or more slot format combinations of the plurality of slot format combinations for the plurality of cells. According to an example embodiment, the wireless device may determine a reference duration for a plurality of slots based on one or more of: a numerology, and one of the one or more slot format combinations. The numerology may comprise a minimum sub-carrier spacing in the plurality of numerologies for the plurality of cells. The one of the one or more slot format combinations may be associated with a cell configured with the numerology. The wireless device may determine a contention window value based on a plurality of new data indicators (NDIs) received in a plurality of uplink grants corresponding to a plurality of transport blocks transmitted by the wireless device during the reference duration. The wireless device may perform a listen before talk procedure based on the contention window value. The wireless device may transmit one or more transport blocks based on the listen before talk procedure indicating a clear channel.

According to an example embodiment, the determining the reference duration may comprise determining a reference duration threshold based on the numerology. According to an example embodiment, the determining the reference duration may comprise determining a first number of slots of the plurality of slots with aggregated uplink resources having a duration equal to or greater than the reference duration threshold. According to an example embodiment, the reference duration may span a second number of slots of the plurality of slots. According to an example embodiment, the second number of slots may be multiple contiguous slots from the beginning of the plurality of slots. According to an example embodiment, the NDI may indicate a positive acknowledge (ACK) or a negative acknowledge (NACK). According to an example embodiment, the determining the contention window value based on the plurality of NDIs may comprise determining the contention window value based on a first number of NACK feedbacks and a second number of ACK feedbacks associated with the plurality of NDIs. According to an example embodiment, the determining the contention window value based on the first number of received NACK feedbacks and the second number of received ACK feedbacks may comprise determining the contention window value based on a ratio of the first number of received NACK feedbacks to a sum of the first number of received NACK feedbacks and the second number of received ACK feedbacks. According to an example embodiment, the determining the contention window value based on the ratio may comprise adjusting the contention window value to a larger value in response to the ratio being equal to or greater than a threshold. According to an example embodiment, the determining the contention window value based on the ratio may comprise adjusting the contention window value to a minimum value in response to the ratio being less than a threshold. According to an example embodiment, the determining the contention window value based on the ratio may comprise keeping the contention window value constant in response to: the contention window value being a maximum value, and the ratio being equal to or greater than a threshold. According to an example embodiment, the numerology may comprise a sub-carrier spacing and a cyclic prefix. According to an example embodiment, the slot format combination may comprise a channel occupancy time (COT) structure. According to an example embodiment, the slot format combination may comprise slot format for each slot in the plurality of slots. According to an example embodiment, the slot format may comprise a slot format with a downlink resource. The slot format may comprise a slot format with an uplink resource. According to an example embodiment, the reference duration may comprise multiple slots of the plurality of slots. According to an example embodiment, the multiple slots may comprise multiple slots. The multiple slots may comprise multiple mini-slots. According to an example embodiment, the wireless device may receive transport blocks via a physical downlink shared channel based on the slot format combination. According to an example embodiment, the plurality of uplink grants may be transmitted via a physical downlink control channel of a plurality of slots with downlink resources. According to an example embodiment, the performing the listen before talk procedure based on the contention window value may comprise performing the listen before talk procedure with a contention window size as the contention window value.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device, one or more messages comprising configuration parameters of a cell;

determining, based on the configuration parameters, a reference duration for contention window adjustment, wherein the reference duration is from a beginning of a channel occupancy of a first transmission burst and until an end of a first slot where at least one physical uplink shared channel (PUSCH) is transmitted;

determining a contention window value based on a plurality of new data indicators (NDIs) received in a plurality of uplink grants corresponding to a plurality of first transport blocks transmitted by the wireless device during the reference duration;

performing, by the wireless device, a listen before talk procedure based on the contention window value; and transmitting one or more second transport blocks based on the listen before talk procedure indicating a clear channel.

2. The method of claim 1, wherein the beginning of the channel occupancy is based on when a listen before talk (LBT) procedure indicates a clear channel.

3. The method of claim 2, wherein the determining the reference duration is further based on one or more fields of one or more DCIs.

4. The method of claim 3, wherein the one or more fields of the one or more DCIs indicate one or more slot format combinations for the cell.

5. The method of claim 4, wherein the slot format combination comprises a structure of a channel occupancy time (COT).

6. The method of claim 4, wherein the slot format combination comprises a slot format for each slot in a plurality of slots.

7. The method of claim 6, wherein the slot format comprises a slot format with at least one of: a downlink resource; and an uplink resource.

8. The method of claim 1, wherein a length of the reference duration is based on a numerology of the cell.

9. The method of claim 8, wherein the configuration parameters indicate the numerology of the cell.

10. The method of claim 9, wherein the determining the reference duration comprises determining a reference duration threshold based on the numerology of the cell.

11. The method of claim 10, wherein the determining the reference duration comprises determining a first number of slots with aggregated uplink resources having a duration equal to or greater than the reference duration threshold.

12. The method of claim 1, wherein the reference duration comprises multiple contiguous slots from the beginning of a transmission burst or a channel occupancy time.

13. The method of claim 9, wherein the numerology comprises a sub-carrier spacing and a cyclic prefix.

14. The method of claim 1, wherein the NDI indicates a positive acknowledge (ACK) or a negative acknowledge (NACK).

15. The method of claim 1, wherein the determining the contention window value based on the plurality of NDIs comprises determining the contention window value based on a first number of NACK feedbacks and a second number of ACK feedbacks associated with the plurality of NDIs.

16. The method of claim 15, wherein the determining the contention window value based on the first number of NACK feedbacks and the second number of ACK feedbacks comprises determining the contention window value based on a ratio of the first number of NACK feedbacks to a sum of the first number of NACK feedbacks and the second number of ACK feedbacks.

17. The method of claim 16, wherein the determining the contention window value based on the ratio comprises adjusting the contention window value to a larger value in response to the ratio being equal to or greater than a threshold.

18. The method of claim 16, wherein the determining the contention window value based on the ratio comprises adjusting the contention window value to a minimum value in response to the ratio being less than a threshold.

19. The method of claim 16, wherein the determining the contention window value based on the ratio comprises keeping the contention window value constant in response to:
   the contention window value being a maximum value; and
   the ratio being equal to or greater than a threshold.

20. The method of claim 1, wherein the reference duration ends at the first slot:
   where the at least one PUSCH is transmitted; and
   for which one or more acknowledgement feedbacks, based on the plurality of NDIs, are available for the at least one PUSCH.

* * * * *